(12) United States Patent
Nakaoka et al.

(10) Patent No.: US 8,899,697 B2
(45) Date of Patent: Dec. 2, 2014

(54) HYDRAULIC BRAKE SYSTEM FOR VEHICLE

(75) Inventors: Hiroshi Nakaoka, Okazaki (JP); Tetsuya Miyazaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 371 days.

(21) Appl. No.: 13/322,971

(22) PCT Filed: Apr. 29, 2010

(86) PCT No.: PCT/JP2010/057636
§ 371 (c)(1),
(2), (4) Date: Nov. 29, 2011

(87) PCT Pub. No.: WO2011/135707
PCT Pub. Date: Nov. 3, 2011

(65) Prior Publication Data
US 2012/0068529 A1 Mar. 22, 2012

(51) Int. Cl.
*B60T 8/40* (2006.01)
*B60T 8/32* (2006.01)

(52) U.S. Cl.
CPC .............. *B60T 8/4081* (2013.01); *B60T 8/321* (2013.01)
USPC ........ 303/116.2; 303/11; 303/155; 303/119.1

(58) Field of Classification Search
CPC .............................. B60T 8/321; B60T 8/4081
USPC ........... 303/113.1, 113.2, 10, 11, 155, 113.4, 303/116.1, 116.2, 20, 119.1, 157, 1, 58
See application file for complete search history.

(56) References Cited

U.S. PATENT DOCUMENTS 5,310,251 A * 5/1994 Towers et al. .................. 303/11
5,951,118 A * 9/1999 Soejima ..................... 303/113.1
(Continued)

FOREIGN PATENT DOCUMENTS

JP   2007 137281   6/2007
JP   2008 162562   7/2008
(Continued)

OTHER PUBLICATIONS

International Search Report Issued Aug. 3, 2010 in PCT/JP10/057636 Filed Apr. 29, 2010.

*Primary Examiner* — Robert A Siconolfi
*Assistant Examiner* — Charles Poon
(74) *Attorney, Agent, or Firm* — Oblon, Spivak, McClelland, Maier & Neustadt, L.L.P.

(57) ABSTRACT

A system including: a liquid-pressure source device that can supply working fluid to a brake device; and an ABS valve device. The system executes a first control in which a supply pressure of the working fluid becomes a target supply pressure and a second control for making the supply pressure fall within the target range. In this system, when the valve device is not being operated, the first control is executed. When the valve device is being operated, the second control is normally operated, and when the supply pressure is higher than a threshold value, the first control is executed. Where completion of the operation of the valve device is estimated, the system performs at least one of reducing the threshold value, reducing an upper limit value of the target range, increasing an electric power supplied to a pressure-reduce linear valve during the first control when the valve device is being operated, and reducing the target supply pressure.

13 Claims, 25 Drawing Sheets

(56) References Cited

U.S. PATENT DOCUMENTS

| | | | |
|---|---|---|---|
| 5,984,432 A * | 11/1999 | Otomo et al. | 303/119.2 |
| 6,206,489 B1 * | 3/2001 | Schmidt et al. | 303/122.08 |
| 6,899,403 B2 * | 5/2005 | Isono et al. | 303/11 |
| 2002/0180262 A1 * | 12/2002 | Hara et al. | 303/119.1 |
| 2006/0220453 A1 * | 10/2006 | Saito et al. | 303/152 |
| 2007/0114842 A1 * | 5/2007 | Ohkubo et al. | 303/115.1 |
| 2007/0252428 A1 * | 11/2007 | Okano et al. | 303/113.1 |
| 2008/0150352 A1 * | 6/2008 | Nakamura et al. | 303/20 |
| 2008/0255743 A1 * | 10/2008 | Tanaka et al. | 701/70 |
| 2009/0302675 A1 * | 12/2009 | Nakaoka et al. | 303/115.2 |
| 2010/0270854 A1 * | 10/2010 | Okano et al. | 303/3 |
| 2011/0285198 A1 * | 11/2011 | Nakata et al. | 303/3 |
| 2012/0126610 A1 * | 5/2012 | Nakata et al. | 303/9.63 |

FOREIGN PATENT DOCUMENTS

| | | |
|---|---|---|
| JP | 2009 61816 | 3/2009 |
| JP | 2009 292176 | 12/2009 |

* cited by examiner

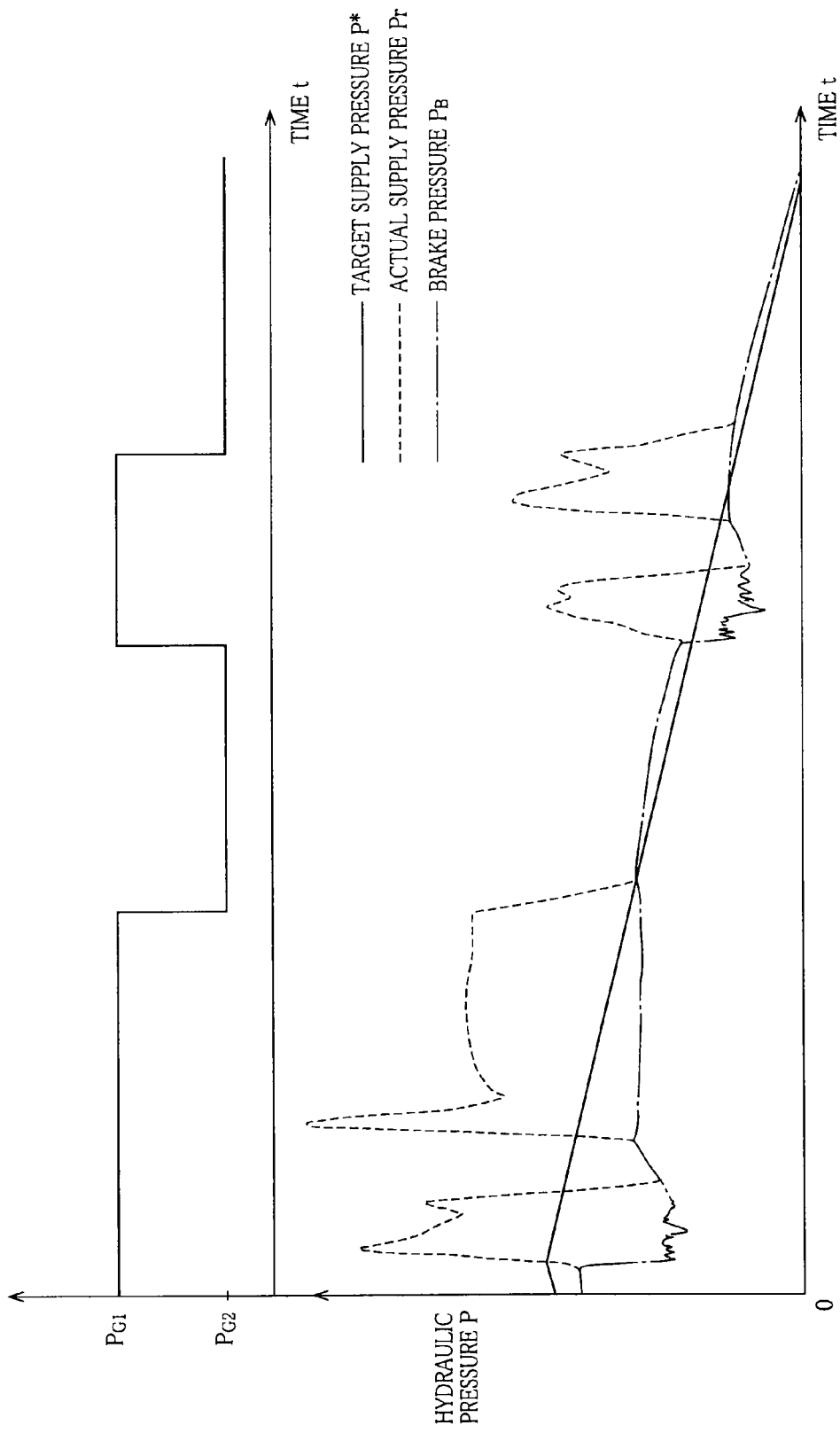

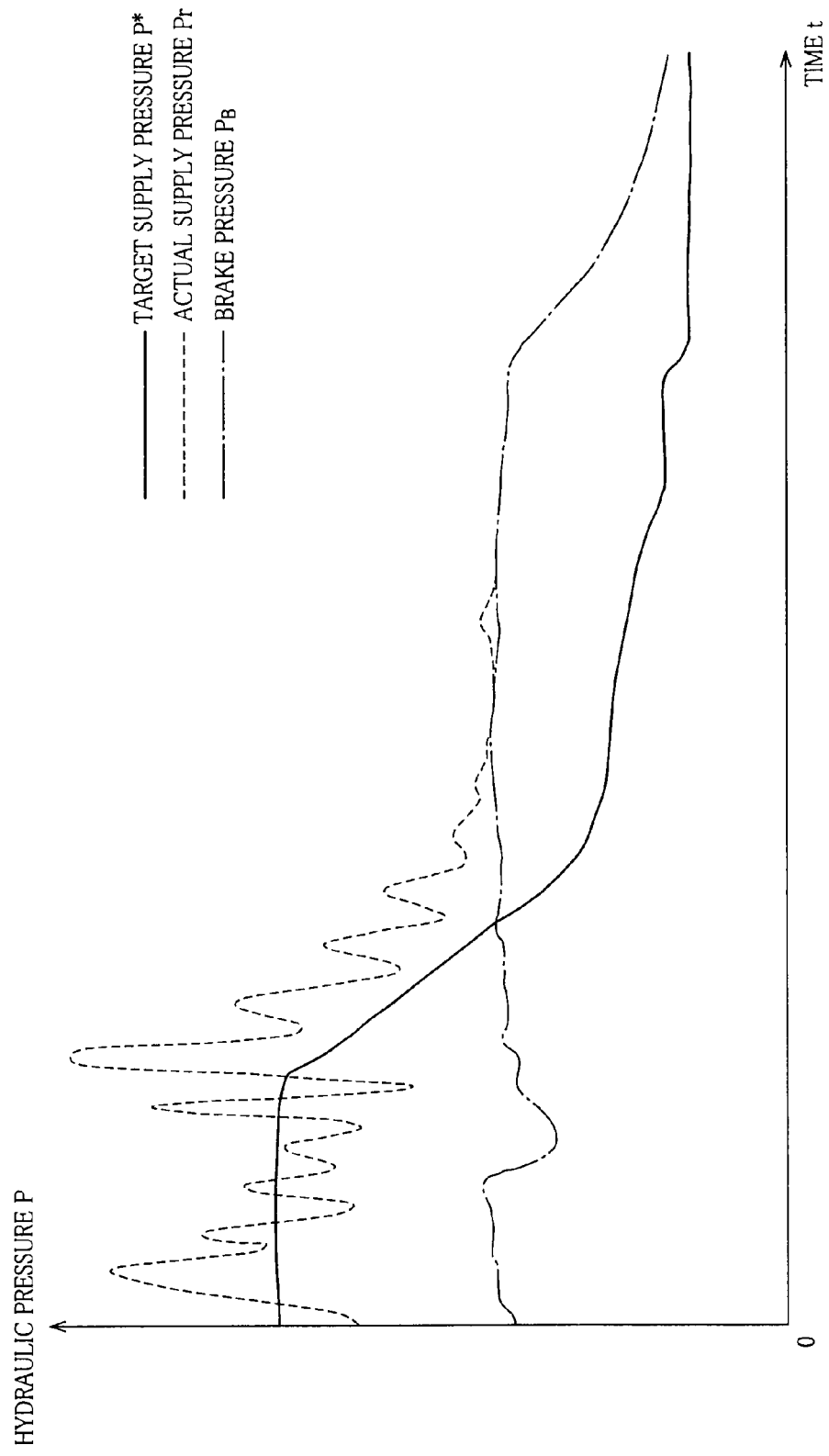

HYDRAULIC BRAKE SYSTEM FOR VEHICLE

TECHNICAL FIELD

The present invention relates to a hydraulic brake system for a vehicle which includes a liquid-pressure source device and which is configured to generate a braking force by depending on working fluid supplied by the liquid-pressure source device.

BACKGROUND ART

A hydraulic brake system mounted on a vehicle includes a system configured to generate a braking force depending on working fluid supplied by a liquid-pressure source device that can regulate a hydraulic pressure of the working fluid without depending on an operational force applied to a brake member by a driver. In such a system, an electric power supplied to the liquid-pressure source device is controlled to change a supply pressure that is the hydraulic pressure of the working fluid supplied by the liquid-pressure source device, which allows generation of an appropriate braking force based on the braking operation of the driver. The hydraulic brake system includes another type of system equipped with the ABS valve device in order to restrain locks, skids, and the like of wheels. Patent Documents described below disclose one example of the brake system including the liquid-pressure source device and the ABS valve device.

PRIOR ART DOCUMENTS

Patent Documents

Patent Document 1: JP-A-2009-61816
Patent Document 2: JP-A-2009-292176
Patent Document 3: JP-A-2007-137281

DISCLOSURE OF THE INVENTION

(A) Summary of the Invention

In the brake system that can generate the braking force by depending on the working fluid supplied by the liquid-pressure source device, in order to generate the appropriate braking force based on the braking operation of the driver, a target-supply-pressure control is executed in which a target supply pressure that is a target of the supply pressure is determined on the basis of the braking operation of the driver, and the electric power supplied to the liquid-pressure source device is controlled such that the supply pressure becomes the target supply pressure. Specifically, in the target-supply-pressure control, where the supply pressure is higher than the target supply pressure, an electric power according to a difference between the supply pressure and the target supply pressure is supplied to a pressure-reduce linear valve of the liquid-pressure source device, and on the other hand, where the supply pressure is lower than the target supply pressure, the electric power according to the difference between the supply pressure and the target supply pressure is supplied to a pressure-increase linear valve of the liquid-pressure source device. As thus described, the supply pressure can be made equal to the target supply pressure by executing the target-supply-pressure control.

However, there is a risk that when the ABS valve device is activated during the target-supply-pressure control, the supply pressure is fluctuated considerably, and thus open and closed states of the pressure-reduce linear valve and the pressure-increase linear valve are frequently changed in order to make the supply pressure follow the target supply pressure. In order to solve this problem, in the system described in the above-described Patent Document 1, a control different from the target-supply-pressure control is normally executed when the ABS valve device is being operated. Specifically, a target range control is executed in which a range having a margin with respect to the target supply pressure is determined as the target range, and the electric power supplied to the liquid-pressure source device is controlled in the operation of the ABS valve device such that the supply pressure falls within the target range. In the target range control, the electric power for opening the pressure-reduce linear valve is supplied to the pressure-reduce linear valve where the supply pressure is equal to or higher than an upper limit value, and the electric power for opening the pressure-increase linear valve is supplied to the pressure-increase linear valve where the supply pressure is equal to or lower than a lower limit value. Since the liquid-pressure source device is controlled in the operation of the ABS valve device such that the supply pressure falls within the target range, it is possible to prevent the open and closed states of the pressure-reduce linear valve and the pressure-increase linear valve from being changed frequently. However, even in the operation of the ABS valve device, where the supply pressure has been greatly deviated from the target range, specifically, where the supply pressure has become higher than a pressure obtained by adding a pressure-reducing threshold-value determination additional value to the target supply pressure, the target-supply-pressure control is executed in order to make the supply pressure equal to the target supply pressure quickly.

By selectively performing the two controls as described above, it is possible to prevent the open and closed states of the pressure-reduce linear valve and the pressure-increase linear valve from being changed frequently when the ABS valve device is being operated, and it is possible to generate the appropriate braking force based on the braking operation of the driver when the ABS valve device is not being operated. However, the supply pressure is often different from the target supply pressure when the ABS valve device is being operated, in particular, the supply pressure is often higher than the target supply pressure where an upper-limit determining additional value is set at a relatively large value in order to maintain the supply pressure at a relatively high pressure in the target range control. When the supply pressure is higher than the target supply pressure in some degree, there is a risk that a braking force larger than that expected by the driver is generated, giving discomfort to the driver, for example. In order to solve this problem, the supply pressure is desirably reduced quickly in a situation in which completion of the operation of the ABS valve device is estimated, for example. This invention has been developed in view of the above-described situations, and it is an object of the present invention to provide a brake system that can selectively perform the target-supply-pressure control and the target range control and that can satisfactorily deal with the completion of the operation the ABS valve device.

In order to solve the above-described problems, in the situation in which the completion of the operation of the ABS valve device is estimated, the hydraulic brake system of the present invention performs, as a dealing control for dealing with the situation, at least one of (A) reducing the above-described pressure-reducing threshold-value determination additional value; (B) reducing the above-described upper-limit determining additional value; (C) increasing the electric power being supplied to the pressure-reduce linear valve where the target-supply-pressure control is being performed at a point in time when the completion of the operation of the ABS valve device has been estimated; and (D) reducing the target supply pressure.

In the hydraulic brake system of the present invention, in the situation in which the completion of the operation of the ABS valve device is estimated (hereinafter may be abbreviated as "in the operation-completion situation"), reducing the pressure-reducing threshold-value determination additional value facilitates performing the target-supply-pressure control instead of the target range control, making it possible to reduce the difference between the supply pressure and the target supply pressure. Further, in the operation-completion situation, reducing the upper-limit determining additional value allows the upper limit value of the target range to be reduced when the target range control is performed, making it possible to reduce the difference between the supply pressure and the target supply pressure. Further, in the operation-completion situation, increasing the electric power being supplied to the pressure-reduce linear valve where the target-supply-pressure control is being performed at the point in time when the completion of the operation of the ABS device has been estimated allows the supply pressure to be lowered to the target supply pressure quickly, making it possible to reduce the difference between the supply pressure and the target supply pressure. Further, in the operation-completion situation, reducing the target supply pressure allows a pressure reducing effect by the liquid-pressure source device to be enhanced as explained in detain later, making it possible to reduce the difference between the supply pressure and the target supply pressure. Therefore, according to the hydraulic brake system of the present invention, executing the dealing control can reduce the difference between the supply pressure and the target supply pressure at the completion of the operation of the ABS valve device, making it possible to satisfactorily deal with the completion of the operation of the ABS valve device.

(B) Forms of the Invention

There will be described various forms of an invention which is considered claimable (hereinafter referred to as "claimable invention" where appropriate). Each of the forms of the invention is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following descriptions of the various forms and the embodiment. It is to be further understood that any form in which one or more elements is/are added to or deleted from any one of the following forms may be considered as one form of the claimable invention.

It is noted that a form in which the technical features of the forms (3), (5), (7), and (9) are added to the form (1) corresponds to claim 1. A form in which the technical features of the forms (4), (6), (8), and (10) are added to claim 1 corresponds to claim 2. A form in which the technical features of the forms (11) and (12) are added to claim 1 or 2 corresponds to claim 3. A form in which the technical features of the forms (11) and (13) are added to any one of claims 1-3 corresponds to claim 4. A form in which the technical features of the forms (11) and (14) are added to any one of claims 1-4 corresponds to claim 5. A form in which the technical features of the forms (11) and (15) are added to any one of claims 1-5 corresponds to claim 6. A form in which the technical features of the forms (11) and (16) are added to any one of claims 1-6 corresponds to claim 7. A form in which the technical features of the forms (11) and (17) are added to any one of claims 1-7 corresponds to claim 8. A form in which the technical features of the forms (11) and (18) are added to any one of claims 1-8 corresponds to claim 9. A form in which the technical features of the form (19) are added to claim 9 corresponds to claim 10. A form in which the technical features of the form (20) are added to claim 9 corresponds to claim 11. A form in which the technical features of the form (21) are added to claim 11 corresponds to claim 12. A form in which the technical features of the form (22) are added to any one of claims 9-12 corresponds to claim 13.

(1) A hydraulic brake system for a vehicle, comprising:

a braking operation member operable by a driver;

a brake device provided on a wheel and configured to generate a braking force according to a pressure supplied to the brake device, a liquid-pressure source device including: an electromagnetic pressure-increase linear valve configured to increase a pressure of working fluid in accordance with an electric power supplied to the pressure-increase linear valve; and an electromagnetic pressure-reduce linear valve configured to reduce the pressure of the working fluid in accordance with an electric power supplied to the pressure-reduce linear valve, the liquid-pressure source device being configured to supply the working fluid whose pressure has been regulated by the pressure-increase linear valve and the pressure-reduce linear valve;

an ABS valve device disposed between the liquid-pressure source device and the brake device; and a controller configured to control the electric power supplied to the pressure-increase linear valve to control the operation of the pressure-increase linear valve and configured to control the electric power supplied to the pressure-reduce linear valve to control the operation of the pressure-reduce linear valve, wherein the controller includes:

a target-supply-pressure determining section configured to, on the basis of the operation of the braking operation member, determine a target supply pressure as a target of a supply pressure that is a hydraulic pressure of the working fluid supplied by the liquid-pressure source device;

a supply-pressure-control executing section configured to selectively perform (a) a first control for making the supply pressure equal to the target supply pressure determined by the target-supply-pressure determining section, by supplying an electric power according to a difference between the supply pressure and the target supply pressure to the pressure-reduce linear valve where the supply pressure is higher than the target supply pressure and by supplying the electric power according to the difference between the supply pressure and the target supply pressure to the pressure-increase linear valve where the supply pressure is lower than the target supply pressure, and (b) a second control for making the supply pressure fall within a target range whose upper limit value is determined to be a value obtained by adding an upper-limit determining additional value to the target supply pressure and whose lower limit is determined to be a value obtained by reducing a lower-limit determining reduction value from the target supply pressure, by continuing to supply an electric power for opening the pressure-reduce linear valve to the pressure-reduce linear valve where the supply pressure is equal to or higher than the upper limit value, and by continuing to supply an electric power for opening the pressure-increase linear valve to the pressure-increase linear valve where the supply pressure is equal to or lower than the lower limit; and a control selecting section configured to, (i) where the ABS valve device is not being operated, select the first control as the control to be performed by the supply-pressure-control executing section and, (ii) where the ABS valve device is being operated, select the second control as the control to be performed by the supply-pressure-control executing section where the supply pressure is equal to or higher than the target supply pressure and is equal to or lower than a pressure obtained by adding a pressure-reducing threshold-value determination additional value greater than the upper-limit determining additional value to the target supply pressure, and select the first control as the control to be performed by the supply-pressure-control executing section where the supply pressure is higher than the pressure obtained by adding the pressure-reducing threshold-value determination additional value to the target supply pressure, wherein the controller further includes an ABS-valve-device operation-completion dealing section configured to perform a dealing control for dealing with a situation in the situation in which the completion of the operation of the ABS valve device is estimated.

In the hydraulic brake system including the liquid-pressure source device and the ABS valve device, when the ABS valve device is activated where the first control as the above-described target-supply-pressure control is being performed, there is a risk that the supply pressure that is the hydraulic pressure of the working fluid supplied by the liquid-pressure source device is fluctuated considerably, and the open and closed states of the pressure-reduce linear valve and the pressure-increase linear valve are frequently changed in order to make the supply pressure follow the target supply pressure. In order to solve this problem, there is a system in which, when the ABS valve device is being operated, the second control as the above-described target range control is performed instead of the target-supply-pressure control. However, even in the operation of the ABS valve device, where the supply pressure has risen to a pressure higher than the pressure-reducing threshold value, specifically, where the supply pressure has become higher than the pressure obtained by adding the pressure-reducing threshold-value determination additional value to the target supply pressure, for example, the target-supply-pressure control is performed in order to quickly make the supply pressure equal to the target supply pressure.

By selectively performing the two controls as described above, it is possible to prevent the open and closed states of the pressure-reduce linear valve and the pressure-increase linear valve from being changed frequently when the ABS valve device is being operated, and it is possible to generate the appropriate braking force based on the braking operation of the driver when the ABS valve device is not being operated. However, the supply pressure is often different from the target supply pressure when the ABS valve device is being operated, in particular, the supply pressure is often higher than the target supply pressure where the upper-limit determining additional value is set at a relatively large value in order to maintain the supply pressure at a relatively high pressure in the target range control. When the supply pressure is higher than the target supply pressure in some degree, there is a risk that a braking force larger than that expected by the driver is generated, giving discomfort to the driver, for example. In order to solve this problem, the supply pressure is desirably reduced quickly in the situation in which completion of the operation of the ABS valve device is estimated, for example.

Thus, in the hydraulic brake system described in the present form, in the situation in which the completion of the operation of the ABS valve device is estimated, the dealing control for satisfactorily dealing with the situation is performed. The dealing control only needs to be a control capable of satisfactorily dealing with the situation in which the completion of the operation of the ABS valve device is estimated. For example, the dealing control may be a control for enhancing the pressure reducing effect of the supply pressure and may be a control capable of quickly reducing the supply pressure. By performing the dealing control, it becomes possible to reduce the difference between the supply pressure and the target supply pressure at the completion of the operation of the ABS valve device, and it becomes possible to reduce the discomfort given to the braking operation of the driver at the completion of the operation of the ABS valve device, for example.

The "ABS valve device" described in the present form only needs to have a construction capable of raising and lowering the brake pressure that is the pressure of the working fluid supplied to the brake device in order to restrain the locks, the skids, spin of the wheel, and the like. For example, the ABS valve device may include: an ABS holding valve configured to change a state in which the working fluid supplied by the liquid-pressure source device is permitted to flow into the brake device and a state in which the working fluid supplied by the liquid-pressure source device is inhibited from flowing into the brake device to each other; an ABS pressure-reduce valve configured to change a state in which the working fluid supplied to the brake device is permitted to flow into the reservoir and a state in which the working fluid supplied to the brake device is inhibited from flowing into the reservoir to each other, and may have a construction in which the brake pressure is increased by opening the ABS holding valve and closing the ABS pressure-reduce valve, and the brake pressure is reduced by closing the ABS holding valve and opening the ABS pressure-reduce valve. Further, the "case where the ABS valve device is being operated" described in the present form means a case where the open and closed states of the ABS holding valve or the ABS pressure-reduce valve are being frequently changed, and the "case where the ABS valve device is not being operated" means a case where a state in which the ABS holding valve is open, and the ABS pressure-reduce valve is closed is maintained.

Each of the "upper-limit determining additional value" and the "pressure-reducing threshold-value determination additional value" described in the present form is set at a positive value, and the "lower-limit determining reduction value" may be a positive value and may be zero or a negative value in order to maintain the supply pressure at a relatively high pressure when the target range control is performed. That is, where the lower-limit determining reduction value is set at the positive value, the target range contains the target supply pressure. Where the lower-limit determining reduction value is set at zero, the lower limit of the target range becomes the target supply pressure, and where the lower-limit determining reduction value is set at a negative value, the lower limit of the target range becomes a pressure higher than the target supply pressure, making it possible to make the supply pressure at a relatively high pressure with respect to the target supply pressure when the target range control is performed. It is noted that, where the lower-limit determining reduction value is set at a negative value, the upper-limit determining additional value is desirably set at a value greater than an absolute value of the lower-limit determining reduction value, and where the lower-limit determining reduction value is set at the positive value, the upper-limit determining additional value is desirably set at a value greater than the absolute value of the lower-limit determining reduction value.

(2) The hydraulic brake system according to the above form (1), wherein the dealing control is a control for reducing the difference between the supply pressure and the target supply pressure at the completion of the operation of the ABS valve device.

In the system described in the present form, it is possible to smoothly change the control of the liquid-pressure source device when the ABS valve device is being operated to the control of the liquid-pressure source device when the ABS valve device is not being operated, thereby reducing the discomfort given to the braking operation of the driver at the completion of the operation of the ABS valve device.

(3) The hydraulic brake system according to the above form (1) or (2), wherein the ABS-valve-device operation-completion dealing section is configured to reduce the pressure-reducing threshold-value determination additional value as the dealing control.

Even where the ABS valve device is being operated, when the supply pressure has become so much higher than the target supply pressure, specifically, when the supply pressure has become higher than the pressure obtained by adding the pressure-reducing threshold-value determination additional value to the target supply pressure, the target-supply-pressure control is performed instead of the target range control in order to quickly reduce the supply pressure to the target supply pressure. That is, the larger the pressure-reducing threshold-value determination additional value, the harder the target-supply-pressure control is performed instead of the target range control in the operation of the ABS valve device, causing a risk of increase in the difference between the supply pressure and the target supply pressure. Thus, there is a risk that the larger the pressure-reducing threshold-value determination additional value, the larger the discomfort given to the braking operation of the driver at the completion of the operation of the ABS valve device becomes. In the system described in the present form, the pressure-reducing threshold-value determination additional value is reduced in the situation in which the completion of the operation of the ABS valve device is estimated, which facilitates performing the target-supply-pressure control instead of the target range control. Accordingly, in the system described in the present form, the difference between the supply pressure and the target supply pressure can be reduced in the situation in which the completion of the operation of the ABS valve device is estimated, making it possible to reduce the discomfort given to the braking operation of the driver at the completion of the operation of the ABS valve device.

(4) The hydraulic brake system according to the above form (3), wherein the ABS-valve-device operation-completion dealing section is configured to use one of a running velocity of a vehicle equipped with the hydraulic brake system and the target supply pressure as a parameter, and the lower the parameter, the smaller the pressure-reducing threshold-value determination additional value is made.

The higher the running velocity of the vehicle (hereinafter may be referred to as "vehicle velocity"), the skids of the wheels are more likely to occur, and the lower the vehicle velocity, the skids of the wheels are less likely to occur. Further, the higher the target supply pressure, the locks of the wheels are more likely to occur, and the lower the target supply pressure, the locks of the wheels are less likely to occur. Thus, the lower the vehicle velocity or the target supply pressure, the smaller the difference between the supply pressure and the target supply pressure is desirably made for the completion of the operation of the ABS valve device. In the system described in the present form, the lower the vehicle velocity or the target supply pressure, the smaller the pressure-reducing threshold-value determination additional value is made, thereby reducing the difference between the supply pressure and the target supply pressure.

(5) The hydraulic brake system according to any one of the above forms (1)-(4), wherein the ABS-valve-device operation-completion dealing section is configured to reduce the upper-limit determining additional value as the dealing control.

(6) The hydraulic brake system according to the above form (5), wherein the ABS-valve-device operation-completion dealing section is configured to use one of the running velocity of the vehicle equipped with the hydraulic brake system and the target supply pressure as a parameter, and the lower the parameter, the smaller the upper-limit determining additional value is made.

Where the upper limit value of the target range in the target range control, i.e., the upper-limit determining additional value is relatively large, there is a risk that the difference between the supply pressure and the target supply pressure becomes large in the target range control. Thus, there is a risk that the larger the upper-limit determining additional value, the larger the discomfort given to the braking operation of the driver at the completion of the operation of the ABS valve device becomes. Accordingly, in the system described in the above two forms, by reducing the upper-limit determining additional value in the situation in which the completion of the operation of the ABS valve device is estimated, the difference between the supply pressure and the target supply pressure in the operation of the target range control can be reduced, making it possible to reduce the discomfort given to the braking operation of the driver at the completion of the operation of the ABS valve device. Further, in the system described in the latter form, the lower the vehicle velocity or the target supply pressure, the smaller the upper-limit determining additional value is made. This further reduces the difference between the supply pressure and the target supply pressure, making it possible to further reduce the discomfort given to the braking operation of the driver at the completion of the operation of the ABS valve device.

(7) The hydraulic brake system according to any one of the above forms (1)-(6), wherein the ABS-valve-device operation-completion dealing section is configured to, as the dealing control, increase the electric power being supplied to the pressure-reduce linear valve where the first control is being performed at the point in time when the completion of the operation of the ABS valve device has been estimated.

(8) The hydraulic brake system according to the above form (7), wherein the ABS-valve-device operation-completion dealing section is configured to use one of the running velocity of the vehicle equipped with the hydraulic brake system and the target supply pressure as a parameter, and the lower the parameter, the greater amount the electric power being supplied to the pressure-reduce linear valve is increased by.

Where the target-supply-pressure control is being performed in the operation of the ABS valve device, the supply pressure is considerably higher than the target supply pressure. If the operation of the ABS valve device is completed in this case, there is a risk that great discomfort is given to the driver with the braking operation because the difference between the supply pressure and the target supply pressure is considerably large. In the system described in the above two forms, the electric power supplied to the pressure-reduce linear valve where the target-supply-pressure control is being performed in the situation in which the completion of the operation of the ABS valve device is estimated is increased, making it possible to make the supply pressure quickly follow the target supply pressure. Accordingly, in the system described in the above two forms, the difference between the supply pressure and the target supply pressure can be reduced in the situation in which the completion of the operation of the ABS valve device is estimated, making it possible to reduce the discomfort given to the braking operation of the driver at the completion of the operation of the ABS valve device. Further, in the system described in the latter form, the lower the vehicle velocity or the target supply pressure, the larger the electric power supplied to the pressure-reduce linear valve is made, whereby the difference between the supply pressure and the target supply pressure is further reduced, making it possible to further reduce the discomfort given to the braking operation of the driver at the completion of the operation of the ABS valve device.

(9) The hydraulic brake system according to any one of the above forms (1)-(8), wherein the ABS-valve-device operation-completion dealing section is configured to reduce the target supply pressure determined by the target-supply-pressure determining section as the dealing control.

(10) The hydraulic brake system according to the above form (9), wherein the ABS-valve-device operation-completion dealing section is configured to use one of the running velocity of the vehicle equipped with the hydraulic brake system and the target supply pressure as a parameter, and the lower the parameter, the greater amount the target supply pressure is reduced by.

A threshold value for judging the change between the target-supply-pressure control and the target range control in the operation of the ABS valve device is set at the value obtained by adding the pressure-reducing threshold-value determination additional value to the target supply pressure. Thus, reducing the target supply pressure instead of reducing the pressure-reducing threshold-value determination additional value can also reduce the threshold value, which facilitates performing the target-supply-pressure control instead of the target range control in the operation of the ABS valve device. Further, the upper limit value of the target range is set at the value obtained by adding the upper-limit determining additional value to the target supply pressure. Thus, lowering the target supply pressure instead of reducing the upper-limit determining additional value can also reduce the upper limit value of the target range, making it possible to reduce the difference between the supply pressure and the target supply pressure in the operation of the target range control. Further, where the supply pressure is higher than the target supply pressure in the target-supply-pressure control, an electric power according to a pressure difference obtained by reducing the supply pressure from the target supply pressure is supplied to the pressure-reduce linear valve. Thus, by lowering the target supply pressure, the electric power supplied to the pressure-reduce linear valve in the target-supply-pressure control can be increased, making it possible to make the supply pressure quickly follow the target supply pressure.

Accordingly, the system described in the above two forms has all the effects obtained by reducing the pressure-reducing threshold-value determination additional value, by reducing the upper-limit determining additional value, and by increasing the electric power supplied to the pressure-reduce linear valve as the dealing controls, making it possible to reduce the discomfort given to the braking operation of the driver at the completion of the operation of the ABS valve device. Further, in the system described in the latter form, the lower the vehicle velocity or the target supply pressure, the lower the target supply pressure is made. This further reduces the difference between the supply pressure and the target supply pressure, making it possible to further reduce the discomfort given to the braking operation of the driver at the completion of the operation of the ABS valve device.

It is noted that, as the dealing controls, the four forms of reducing the pressure-reducing threshold-value determination additional value, reducing the upper-limit determining additional value, increasing the electric power supplied to the pressure-reduce linear valve, and reducing the target supply pressure have been explained, but performing at least one of the four forms as the dealing control can reduce the discomfort given to the braking operation of the driver at the completion of the operation of the ABS valve device. That is, this hydraulic brake system may be configured such that only one of the four forms can be performed and may be configured such that two or more of the four forms can be performed. Where the hydraulic brake system is configured such that two or more of the four forms can be performed, the forms may be performed at the same time as the dealing controls, and one of the forms may be performed alone as the dealing control. Specifically, where reducing the pressure-reducing threshold-value determination additional value and reducing the upper-limit determining additional value are employed as the dealing controls, the pressure-reducing threshold-value determination additional value and the upper-limit determining additional value may be reduced at the same time, and the pressure-reducing threshold-value determination additional value and the upper-limit determining additional value may be selectively reduced.

(11) The hydraulic brake system according to any one of the above forms (1)-(10), wherein the ABS-valve-device operation-completion dealing section includes an ABS-valve-device operation-completion estimating section configured to estimate the completion of the operation of the ABS valve device, and the dealing control is performed on the basis of the estimation of the ABS-valve-device operation-completion estimating section.

In the system described in the present form, the completion of the operation of the ABS valve device can be estimated, making it possible to perform the above-described dealing control at an appropriate timing.

(12) The hydraulic brake system according to the above form (11), wherein the ABS-valve-device operation-completion estimating section is configured to estimate the completion of the operation of the ABS valve device when the supply pressure has been stabilized.

The ABS valve device is configured to raise and lower the brake pressure in order to restrain the locks, the skids, and the like of the wheels and when the ABS valve device is frequently operated, the supply pressure repeatedly rises and lowers in accordance with the rising and lowering of the brake pressure without being stabilized. On the other hand, when the frequency of the operation of the ABS valve device has been lowered, the supply pressure does not rise and lower considerably, and a degree of the fluctuation of the supply pressure decreases. That is, the supply pressure does not change considerably and is stabilized. Accordingly, in the system described in the present form, the completion of the operation of the ABS valve device can be estimated appropriately, making it possible to perform the dealing control at an appropriate timing.

The "ABS-valve-device operation-completion estimating section" described in the present form can judge stability of the supply pressure by using a difference between a maximum value and a minimum value of the supply pressure per unit time, an amount of change of an average value of the supply pressure per unit time, a least squares method, and so on. Specifically, for example, where the difference between the maximum value and the minimum value of the supply pressure per unit time has become equal to or smaller than a set difference, the ABS-valve-device operation-completion estimating section may judge that the supply pressure has been stabilized, and where a coefficient of determination calculated in the least squares method is equal to or larger than a set value, the ABS-valve-device operation-completion estimating section may judge that the supply pressure has been stabilized.

(13) The hydraulic brake system according to the above form (11) or (12), wherein the ABS-valve-device operation-completion estimating section is configured to estimate the completion of the operation of the ABS valve device when the supply pressure has increased even though the target supply pressure has not increased.

Where the ABS valve device is not being operated, the supply pressure increases in accordance with the increase in the target supply pressure, but where the ABS valve device is being operated, the supply pressure lowers by the operation of the ABS valve device. Thus, the supply pressure may not increase even where the target supply pressure has increased. That is, where the supply pressure does not increase even though the target supply pressure is increasing, it is possible to consider that there is an extremely high possibility that the ABS valve device is frequently operated. On the other hand, in a case reverse to the case where the supply pressure does not increase even though the target supply pressure is increasing, that is, when the supply pressure has increased even though the target supply pressure is not increasing, there is an extremely low possibility that the ABS valve device is being operated. Accordingly, in the system described in the present form, the completion of the operation of the ABS valve device can be estimated appropriately, making it possible to perform the dealing control at an appropriate timing.

(14) The hydraulic brake system according to any one of the above forms (11)-(13), wherein the ABS-valve-device operation-completion estimating section is configured to estimate the completion of the operation of the ABS valve device when the target supply pressure has lowered.

Where the target supply pressure has been increased by the driver depressing the brake pedal, there is a high possibility that the locks, the skids, and the like of the wheels occur, but where the target supply pressure decreases by the stop of the depression of the brake pedal by the driver, the possibility that the locks, the skids, and the like of the wheels occur lowers. Accordingly, in the system described in the present form, the completion of the operation of the ABS valve device can be estimated appropriately, making it possible to perform the dealing control at an appropriate timing.

The "ABS-valve-device operation-completion estimating section" described in the present form may judge the lowering of the target supply pressure on the basis of a change rate, a change amount, a change speed, and the like of the target supply pressure and may judge the lowering of the target supply pressure on the basis of an operational amount, an operational speed, and the like of the brake pedal. Specifically, where the change rate of the target supply pressure has become equal to or smaller than a set change rate, for example, the ABS-valve-device operation-completion estimating section may judge that the target supply pressure has been lowered, and where a lowered amount of the target supply pressure has become equal to or larger than a set amount, the ABS-valve-device operation-completion estimating section may judge that the target supply pressure has been lowered.

(15) The hydraulic brake system according to any one of the above forms (11)-(14), wherein the ABS-valve-device operation-completion estimating section is configured to estimate the completion of the operation of the ABS valve device when the target supply pressure has become equal to or lower than a set pressure.

Where the target supply pressure is relatively high, the brake pressure is also high. Thus, there is a high possibility that the locks, the skids, and the like of the wheels occur. On the other hand, when the target supply pressure has lowered, the brake pressure also lowers. The possibility that the locks, the skids, and the like of the wheels occur lowers. Accordingly, in the system described in the present form, the completion of the operation of the ABS valve device can be estimated appropriately, making it possible to perform the dealing control at an appropriate timing.

(16) The hydraulic brake system according to any one of the above forms (11)-(15), wherein the ABS-valve-device operation-completion estimating section is configured to estimate the completion of the operation of the ABS valve device where the running velocity of the vehicle equipped with the hydraulic brake system has become equal to or lower than a set velocity.

Where the vehicle velocity is relatively high, there is a high possibility that the skids and the like of the wheels occur. On the other hand, where the vehicle velocity is relatively low, the possibility that the skids and the like of the wheels occur is low. Accordingly, in the system described in the present form, the completion of the operation of the ABS valve device can be estimated appropriately, making it possible to perform the dealing control at an appropriate timing.

(17) The hydraulic brake system according to any one of the above forms (11)-(16), wherein the ABS-valve-device operation-completion estimating section is configured to estimate the completion of the operation of the ABS valve device when the operation of the ABS valve device has been continued for equal to or longer than a set time.

The ABS valve device is activated when restraining the locks, the skids, and the like of the wheels and seldom continues to be driven for a long time. Accordingly, in the system described in the present form, the completion of the operation of the ABS valve device can be estimated appropriately, making it possible to perform the dealing control at an appropriate timing.

(18) The hydraulic brake system according to any one of the above forms (11)-(17), wherein the ABS-valve-device operation-completion estimating section is configured to estimate the completion of the operation of the ABS valve device where a difference between a judgment pressure as one of the supply pressure and the target supply pressure and a brake pressure that is a pressure of the working fluid being supplied to the brake device has become equal to or smaller than a set difference.

Where the ABS valve device is not being operated, the working fluid supplied by the liquid-pressure source device is applied to the brake device. Thus, the supply pressure and the brake pressure become equal to each other. On the other hand, where the ABS valve device is being operated, the brake pressure rises and lowers in order to prevent the locks of the wheels, etc., and thus the supply pressure and the brake pressure are frequently different from each other. That is, where the difference between the supply pressure and the brake pressure is relatively small, it is possible to consider that the frequency of the operations of the ABS valve device has lowered. Further, since the supply pressure and the target supply pressure rise and lower generally in a similar manner, also in a case where a difference between the target supply pressure and the brake pressure is relatively small, it is possible to consider that the frequency of the operations of the ABS valve device has lowered. Accordingly, in the system described in the present form, the completion of the operation of the ABS valve device can be estimated appropriately, making it possible to perform the dealing control at an appropriate timing.

It is noted that the seven forms have been explained as sections for estimating the completion of the operation of the ABS valve device, but the above-described dealing control can be performed at an appropriate timing by estimating the completion of the operation of the ABS valve device by at least one of the seven forms. That is, the hydraulic brake system may be configured such that only one of the seven forms can be performed, and may be configured such that two or more of the seven forms can be performed. Where the hydraulic brake system is configured such that two or more of the seven forms can be performed, the completion of the operation of the ABS valve device may be estimated on condition that one of the plurality of the forms is satisfied, and may be estimated on condition that two or more of the plurality of forms are satisfied at the same time. Specifically, for example, in a case where the form depending on the vehicle velocity and the form depending on a duration time of the operation of the ABS valve device are employed as sections for estimating the completion of the operation of the ABS valve device is estimated, the completion of the operation of the ABS valve device may be estimated where the vehicle velocity has become equal to or lower than the set velocity, the completion of the operation of the ABS valve device may be estimated where the operation of the ABS valve device has continued for equal to or longer than the set time, and the completion of the operation of the ABS valve device may be estimated where the vehicle velocity has become equal to or lower than the set velocity and the operation of the ABS valve device has continued for equal to or longer than the set time.

(19) The hydraulic brake system according to the above form (18), further comprising four brake devices each as the brake device and respectively corresponding to four wheels, wherein the ABS-valve-device operation-completion estimating section is configured to determine a single brake pressure, on the basis of a brake pressure of each of at least one of the four brake devices, for judging a difference between the judgment pressure and the single brake pressure, and is configured to estimate the completion of the operation of the ABS valve device when a difference between the determined single brake pressure and the judgment pressure has become equal to or smaller than the set difference.

Four brake pressures respectively corresponding to the four brake devices provided so as to correspond to the respective four wheels are normally different from one another in the operation of the ABS valve device. Thus, in the system described in the present form, the single brake pressure is determined in order to judge the difference between the above-described judgment pressure and the brake pressures, and then the completion of the operation of the ABS valve device is estimated on the basis of the determined difference between the determined single brake pressure and the judgment pressure. The "ABS-valve-device operation-completion estimating section" described in the present form may determine the single brake pressure on the basis of one of the four brake pressures or a value obtained by calculation using two or more of the four brake pressures, specifically, determine the single brake pressure on the basis of an average value of the four brake pressures, a maximum value, a second or third largest value, a value obtained by assigning weights to the respective four brake pressures and calculating the brake pressures, or the like, for example. Further, the ABS valve device normally includes four pairs of the electromagnetic valves which respectively correspond to the four wheels, and all the four pairs of the electromagnetic valves are not always activated in the operation of the ABS valve device. That is, in some cases, at least one pair of the electromagnetic valves are not activated. In such cases, a brake pressure of a wheel corresponding to one of the at least one pair of the electromagnetic valves not being activated may be determined as the single brake pressure for the difference between the brake pressure and the judgment pressure.

(20) The hydraulic brake system according to the above form (18), further comprising four brake devices each as the brake device and respectively corresponding to four wheels, wherein the ABS-valve-device operation-completion estimating section is configured to judge a difference between the judgment pressure and a brake pressure of each of the four brake devices, and is configured to estimate the completion of the operation of the ABS valve device when the difference between the brake pressure of even one of the four brake devices and the judgment pressure has become equal to or smaller than the set difference.

(21) The hydraulic brake system according to the above form (20), wherein the ABS-valve-device operation-completion dealing section is configured to perform, as the dealing control, at least one of (A) reducing the pressure-reducing threshold-value determination additional value;

(B) reducing the upper-limit determining additional value;

(C) increasing the electric power being supplied to the pressure-reduce linear valve where the first control is being performed at a point in time when the completion of the operation of the ABS valve device has been estimated; and (D) reducing the target supply pressure determined by the target-supply-pressure determining section, and wherein the ABS-valve-device operation-completion dealing section is configured to:

(A) where the pressure-reducing threshold-value determination additional value is reduced as the dealing control, perform a control in which the larger the number of brake devices in each of which the difference between the brake pressure and the judgment pressure is equal to or smaller than the set difference among the four brake devices, the smaller the pressure-reducing threshold-value determination additional value is made;

(B) where the upper-limit determining additional value is reduced as the dealing control, perform a control in which the larger the number of brake devices in each of which the difference between the brake pressure and the judgment pressure is equal to or smaller than the set difference among the four brake devices, the smaller the upper-limit determining additional value is made;

(C) where the electric power being supplied to the pressure-reduce linear valve is increased where the first control is being performed at the point in time when the completion of the operation of the ABS valve device has been estimated as the dealing control, perform a control in which the larger the number of brake devices in each of which the difference between the brake pressure and the judgment pressure is equal to or smaller than the set difference among the four brake devices, the larger amount the electric power being supplied to the pressure-reduce linear valve is increased by; and (D) where the target supply pressure determined by the target-supply-pressure determining section is reduced as the dealing control, perform a control in which the larger the number of brake devices in each of which the difference between the brake pressure and the judgment pressure is equal to or smaller than the set difference among the four brake devices, the larger amount the target supply pressure is reduced by.

In the system described in the above two forms, the difference between each of the four brake pressures and the judgment pressure is calculated in order to estimate the completion of the operation of the ABS valve device. In the system described in the latter form, the additional value, the target supply pressure, the supply electric power, and so on are changed in accordance with the number of the four brake pressures in each of which the difference between the brake pressure and the judgment pressure is equal to or lower than the set difference among the four brake pressures. Where the difference between each of all the brake pressures and the judgment pressure is equal to or smaller than the set difference, it is possible to consider that a frequency of the operations of the four pairs of the electromagnetic valves provided so as to respectively correspond to all the wheels are lowered, and on the other hand, where the difference between each of all the brake pressures and the judgment pressure is larger than the set difference, it is possible to consider that the four pairs of the electromagnetic valves are frequently operated. Accordingly, in the system described in the latter form, the larger the number of the pairs of the electromagnetic valves whose operational frequency has been lowered among the four pairs of the electromagnetic valves, the smaller the difference between the supply pressure and the target supply pressure can be made.

(22) The hydraulic brake system according to any one of the above forms (18)-(21), wherein the ABS-valve-device operation-completion estimating section includes a brake-pressure estimating section configured to estimate the brake pressure on the basis of an operational condition of the ABS valve device after a start of the operation of the ABS valve device, the ABS-valve-device operation-completion estimating section being configured to estimate the completion of the operation of the ABS valve device on the basis of the brake pressure estimated by the brake-pressure estimating section.

As described above, the ABS valve device normally includes the four pairs of the electromagnetic valves corresponding to the respective four wheels. Each pair of the electromagnetic valves are constituted by the ABS holding valve capable of raising the brake pressure and the ABS pressure-reduce valve capable of lowering the brake pressure. When the ABS holding valve is opened and the ABS pressure-reduce valve is closed, the brake pressure is raised. On the other hand, when the ABS pressure-reduce valve is opened and the ABS holding valve is closed, the brake pressure is lowered. Thus, a change amount of the brake pressure can be calculated on the basis of the operational condition of the ABS valve device, i.e., an operational history of each of the ABS holding valve and the ABS pressure-reduce valve, specifically, a length of time for which each of the ABS holding valve and the ABS pressure-reduce valve is open from the activation of the ABS valve device and so on. Further, where the ABS valve device is not being operated, that is, where the four pairs of the electromagnetic valves are not being operated, each of the four brake pressures is equal to the supply pressure. Accordingly, the change amount of the brake pressure calculated on the basis of the operational history of each of the ABS holding valve and the ABS pressure-reduce valve is reduced from a supply pressure just before the ABS valve device is activated, thereby making it possible to appropriately estimate the brake pressure in the operation of the ABS valve device.

(23) The hydraulic brake system according to any one of the above forms (1)-(22), wherein, where the ABS valve device is being operated, the control selecting section selects the second control where the supply pressure is lower than the target supply pressure and equal to or higher than a pressure obtained by reducing a pressurizing threshold-value determination reduction value from the target supply pressure, and select the first control where the supply pressure is lower than the pressure obtained by reducing the pressurizing threshold-value determination reduction value from the target supply pressure.

(24) The hydraulic brake system according to the above form (23), wherein the pressure-reducing threshold-value determination additional value is a value larger than the pressurizing threshold-value determination reduction value.

In the system described in the above two forms, even in the operation of the ABS valve device, when the supply pressure has become too low with respect to the target supply pressure, the target-supply-pressure control is performed. Accordingly, in the system described in the above two forms, even where the supply pressure has sharply lowered, the supply pressure can be increased quickly to the target supply pressure. Further, in the system described in the latter form, when the supply pressure has lowered below the target supply pressure, the target-supply-pressure control is easily performed instead of the target range control, making it possible to maintain the supply pressure at a relatively high pressure in the operation of the ABS valve device.

(25) The hydraulic brake system according to any one of the above forms (1)-(24), further comprising:

a liquid passage for supplying the working fluid from the liquid-pressure source device to the ABS valve device; and a detector provided on the liquid passage and configured to detect the hydraulic pressure of the working fluid in the liquid passage, wherein the controller is configured to regard the hydraulic pressure detected by the detector as the supply pressure.

In the system described in the present form, the hydraulic pressure of the working fluid in the liquid passage is used as the supply pressure. Thus, in the system described in the present form, the supply pressure can be detected appropriately.

BRIEF DESCRIPTION OF THE DRAWINGS

FIG. 6 is a chart generally showing changes of a pressure-reducing threshold-value determination additional value, a target supply pressure, an actual supply pressure, and a brake pressure with lapse of time when a dealing control is executed.

FIG. 10 is a chart generally showing changes of the target supply pressure, the actual supply pressure, and the brake pressure with lapse of time where the actual supply pressure has been stabilized after being changed considerably.

BEST MODE FOR CARRYING OUT THE INVENTION

There will be described an embodiment of the claimable invention, by reference to the accompanying drawings. It is to be understood that the claimable invention is not limited to the following embodiment, and may be otherwise embodied with various changes and modifications, such as those described in the foregoing "FORMS OF THE INVENTION" which may occur to those skilled in the art.

Embodiment

<Construction of Vehicle>

Figure 1:
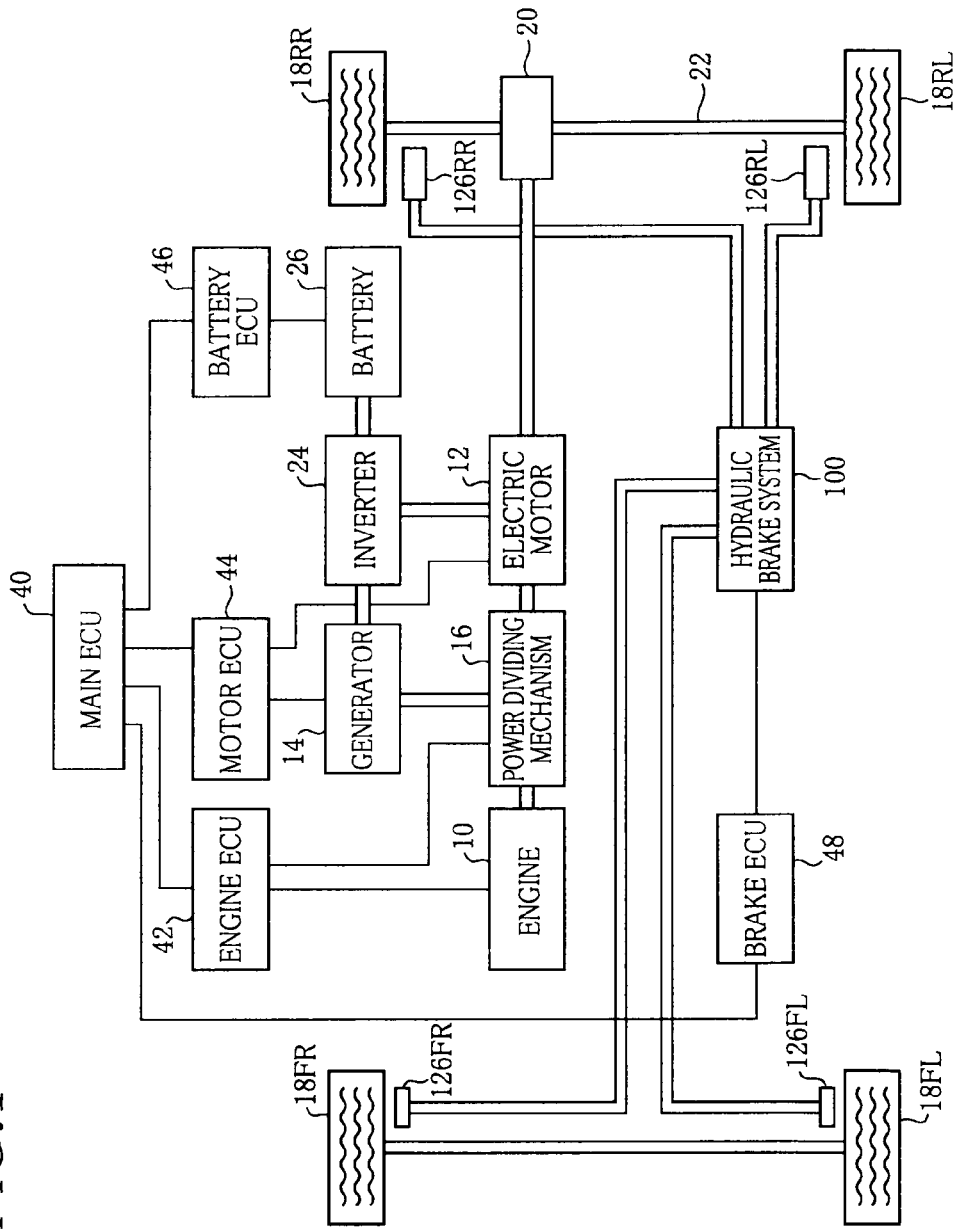
FIG. 1 is a schematic view showing a drive system and a braking system of a hybrid vehicle equipped with a hydraulic brake system for a vehicle as an embodiment of a claimable invention.

FIG. 1 schematically shows a drive system and a braking system of a hybrid vehicle equipped with a hydraulic brake system for a vehicle as an embodiment. The vehicle is equipped with an engine 10 and an electric motor 12 as power sources and also equipped with a generator 14 for generating electricity by an output power of the engine 10. The engine 10, the electric motor 12, and the generator 14 are connected to one another by a power dividing mechanism 16. Controlling this power dividing mechanism 16 enables the output power of the engine 10 to be divided into a power for activating the generator 14 and a power for rotating a wheel or wheels of four wheels 18 as a drive wheel or wheels, and enables the power from the electric motor 12 to be transmitted to the drive wheel(s). That is, the power dividing mechanism 16 functions as a speed changing mechanism for a drive power transferred to the drive wheel(s) via a decelerator 20 and a drive shaft 22. It is noted that some elements such as "the wheels 18" are collectively referred, but where it is necessary to distinguish the four wheels from each other, for example, there are attached suffixes "FL", "FR", "RL", and "RR" respectively indicating a front left wheel, a front right wheel, a rear left wheel, and a rear right wheel. According to this notation system, drive wheels of the present vehicle are the wheel 18RL and the wheel 18RR.

The electric motor 12 is an alternating-current synchronous motor which is driven by alternating current. The vehicle includes an inverter 24 which can convert current from direction current to alternating current or from alternating current to direction current. Thus, the inverter 24 is controlled to convert electricity from alternating current outputted by the generator 14 to electricity from direct current which is to be stored into a battery 26, and the inverter 24 is controlled to convert electricity from direct current which is to be stored in the battery 26 to electricity from alternating current for driving the electric motor 12. The generator 14 has a construction as the alternating-current synchronous motor like the electric motor 12. That is, it can be considered that the vehicle as the present embodiment includes the two alternating-current synchronous motors mounted thereon, and one of the alternating-current synchronous motors is used as the electric motor 12 mainly to output the drive power while the other of the alternating-current synchronous motors is used as the generator 14 mainly to generate electricity by the output power of the engine 10.

The electric motor 12 can use rotations of the wheels 18RL, 18RR during running of the vehicle to generate electricity (i.e., regeneration of electricity). In this regeneration, the electric motor 12 connected to the wheels 18RL, 18RR generates an electric power and a resistance force for restraining the rotation of the electric motor 12. Thus, the resistance force can be used as a braking force for braking the vehicle. That is, the electric motor 12 is used as a means of a regenerative brake for braking the vehicle while generating the electric power. Thus, the present vehicle is braked by controlling the regenerative brake together with the engine brake and a hydraulic brake which will be described below.

In the present vehicle, various controls of the vehicle such as the above-described control of the brake are executed by a plurality of electronic control units (ECUs). The plurality of ECUs include a main ECU 40 which has a function for exercising control over the controls. For example, the hybrid vehicle is enabled to run by a drive of the engine 10 and a drive of an electric motor 12, and these drives are controlled by the main ECU 40. Specifically, the main ECU 40 determines a distribution of output powers of the engine 10 and the electric motor 12 to output commands on the basis of the determined distribution to an engine ECU 42 for controlling the engine 10 and a motor ECU 44 for controlling the electric motor 12 and the generator 14. To the main ECU 40 is also connected a battery ECU 46 for controlling the battery 26.

To the main ECU 40 is also connected a brake ECU 48 for controlling the brake. The vehicle is provided with a brake member which is operated by a driver. The brake ECU 48 determines a target braking force on the basis of an amount of the operation of the brake member and outputs the determined target braking force to the main ECU 40. The main ECU 40 outputs this target braking force to the motor ECU 44 The motor ECU 44 then controls the regenerative brake on the basis of the target braking force and outputs to the main ECU 40 an applied value of the regenerative brake, i.e., a regenerative braking force being generated. The main ECU 40 then reduces the regenerative braking force from the target braking force to determine, based on this reduction, a target hydraulic braking force to be generated by a hydraulic brake system 100 mounted on the vehicle. The main ECU 40 outputs the target hydraulic braking force to the brake ECU 48, and the brake ECU 48 normally controls the hydraulic brake system 100 such that a hydraulic braking force generated by the hydraulic brake system 100 becomes equal to the target hydraulic braking force.

<Configuration of Hydraulic Brake System for Vehicle>

Figure 2:
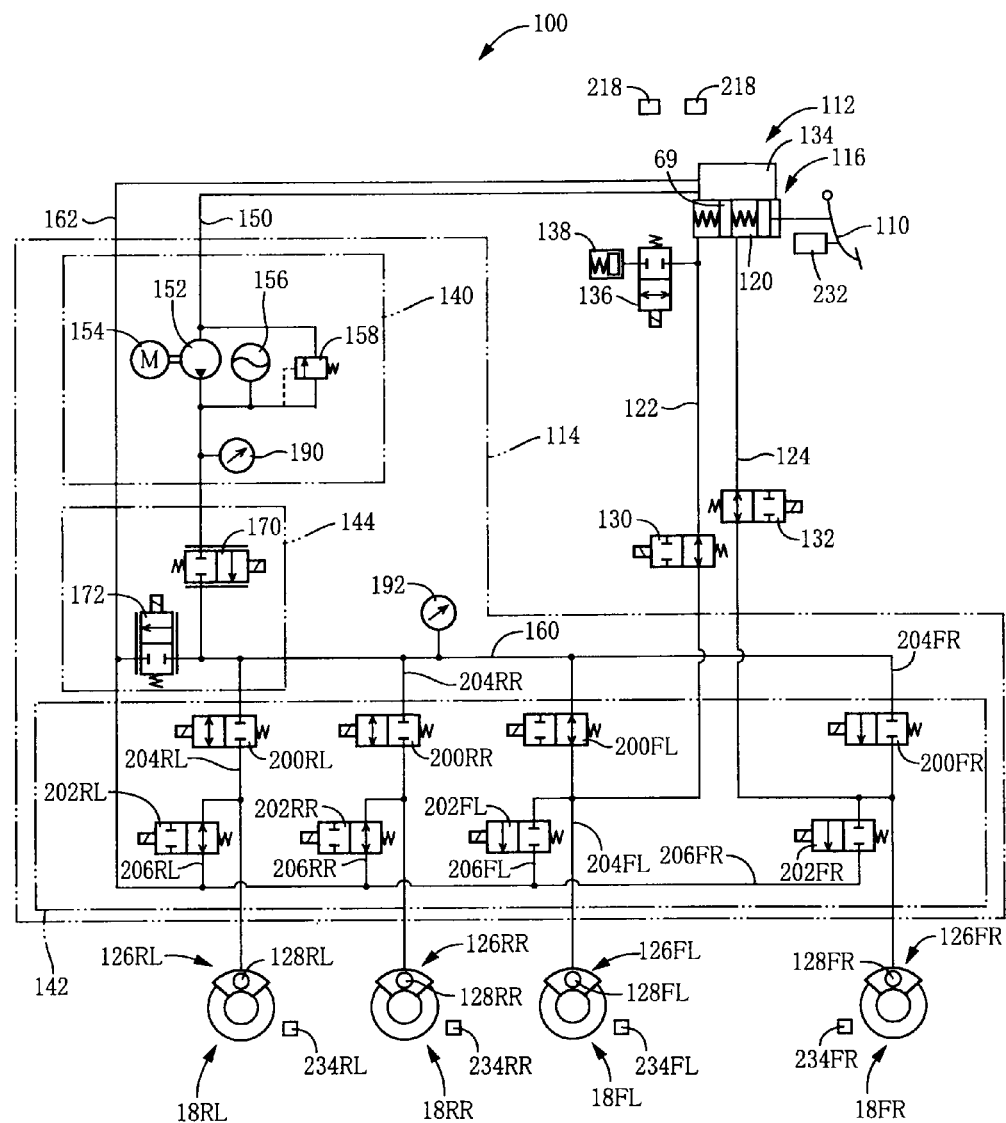
FIG. 2 is a schematic view showing the hydraulic brake system as the embodiment of the claimable invention.

FIG. 2 schematically shows the hydraulic brake system 100 of the vehicle. The present hydraulic brake system 100 includes a brake pedal 110 as the brake member, a master cylinder device 112, and a brake actuator 114. The master cylinder device 112 includes a master cylinder 116 for pressurizing working fluid (brake fluid) on the basis of depression of the brake pedal 110. The master cylinder 116 includes two pressure chambers 118, 120 which are respectively connected to one end of a main liquid passage 122 and one end of a main liquid passage 124. The other end of the main liquid passage 122 is connected to a brake cylinder 128FL of a brake device 126FL for restraining the rotation of the front left wheel 18FL, and the other end of the main liquid passage 124 is connected to a brake cylinder 128FR of a brake device 126FR for controlling the rotation of the front right wheel 18FR.

A master cutoff valve 130 is provided in the main liquid passage 122, and a master cutoff valve 132 is provided in the main liquid passage 124. Each of the master cutoff valves 130, 132 is a normally open electromagnetic valve which takes an open state to permit the working fluid to flow from the master cylinder 116 to a corresponding one of the brake cylinders 128 and which takes a closed state to inhibit the working fluid from flowing from the master cylinder 116 to a corresponding one of the brake cylinders 128. Further, the master cylinder device 112 is provided with a reservoir 134 for storing the working fluid therein at an atmospheric pressure, and the working fluid is supplied from the reservoir 134 to the pressure chambers 118, 120 of the master cylinder 116. It is noted that a stroke simulator 138 is connected to the main liquid passage 122 via a simulator control valve 136 which is a normally closed electromagnetic valve.

The brake actuator 114 is configured to control hydraulic pressures of the above-described brake cylinders 128FL, 128FR; a wheel cylinder 128RL of a brake device 126RL for controlling the rotation of the rear left wheel 18RL; and a wheel cylinder 128RR of a brake device 126RR for controlling the rotation of the rear right wheel 18RR. The brake actuator 114 includes a high-pressure source device 140, an ABS valve device 142, and a liquid-pressure source device 144.

The high-pressure source device 140 is provided on a high-pressure passage 150 whose one end is connected to the reservoir 134. The high-pressure source device 140 includes: a pump 152 that pumps up the working fluid from the reservoir 134 via the high-pressure passage 150; an electric motor 154 that drives the pump 152; an accumulator 156 that accumulates the working fluid discharged from the pump 152 in a state in which the working fluid is pressurized; and a relief valve 158 that limits a discharge pressure of the pump 152 to or under a predetermined value. The other end of the high-pressure passage 150 is connected to a common passage 160, allowing high pressure working fluid generated by the high-pressure source device 140 to flow into the common passage 160. To the common passage 160 is connected one end of a low-pressure passage 162 whose the other end is connected to the reservoir 134. This construction allows the working fluid in the common passage 160 to flow to the reservoir 134 through the low-pressure passage 162.

The liquid-pressure source device 144 includes: a normally closed electromagnetic linear valve 170 (hereinafter may be referred to as "pressure-increase linear valve") provided on a downstream side of the high-pressure source device 140 provided on the high-pressure passage 150; a normally closed electromagnetic linear valve 172 (hereinafter may be referred to as "pressure-reduce linear valve") provided on the low-pressure passage 162. The pressure-increase linear valve 170 is enabled to control a flow of the high pressure working fluid generated by the high-pressure source device 140 into the common passage 160, while the pressure-reduce linear valve 172 is enabled to control a flow of the working fluid in the common passage 160 into the reservoir 134. In each of the pressure-increase linear valve 170 and the pressure-reduce linear valve 172, there is a predetermined relationship between a supply current and a hydraulic pressure difference between the high pressure working fluid and low pressure working fluid, enabling a valve opening pressure to be changed according to increase and decrease in the supply current. Accordingly, by controlling the supply current, each of the pressure-increase linear valve 170 and the pressure-reduce linear valve 172 can successively change a supply pressure that is a hydraulic pressure supplied from the liquid-pressure source device 144 to the common passage 160, thereby easily controlling the supply pressure at a desired pressure.

Figure 3:
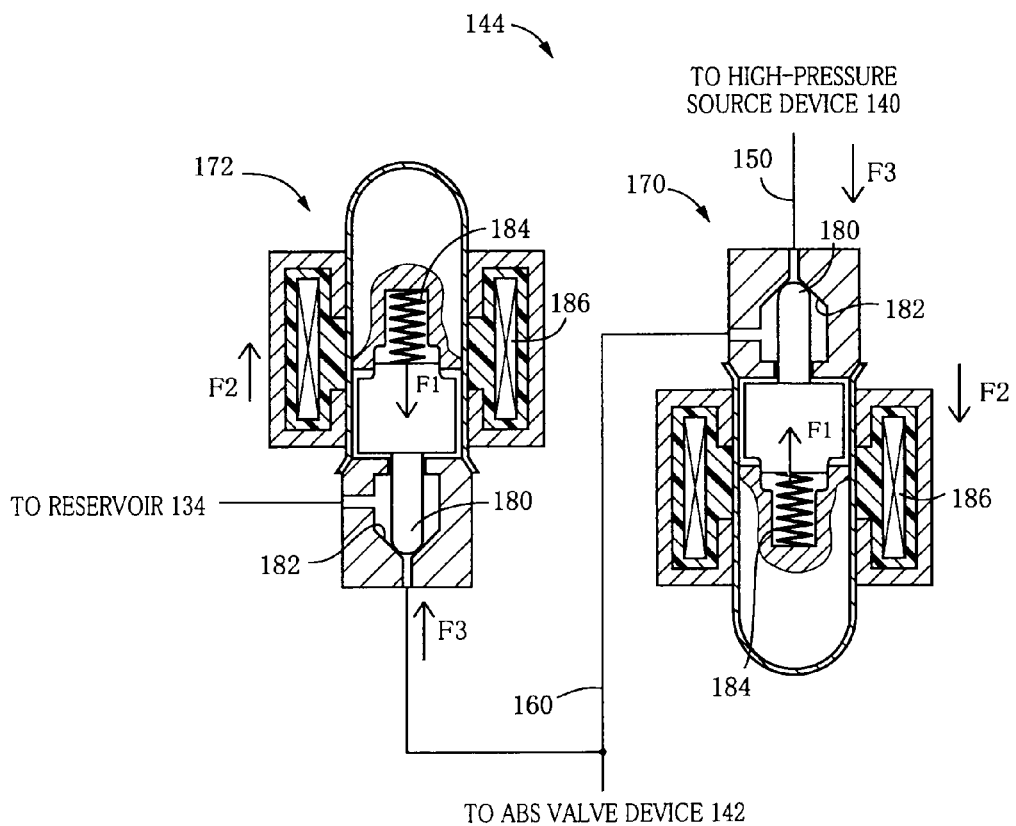
FIG. 3 is a cross-sectional view generally showing a pressure-increase linear valve and a pressure-reduce linear valve shown in FIG. 2.

Specifically, as shown in FIG. 3, each of the pressure-increase linear valve 170 and the pressure-reduce linear valve 172 includes; (a) a seating valve having a valve member 180 and a valve seat portion 182; a spring 184; and a solenoid 186. An urging force F1 of the spring 184 is exerted in a direction in which the valve member 180 is moved toward the valve seat portion 182. When the current has been supplied to the solenoid 186, a drive power F2 is exerted in a direction in which the valve member 180 is moved away from the valve seat portion 182. In the pressure-increase linear valve 170, a differential pressure force F3 determined by a differential pressure between the supply pressure and a hydraulic pressure of the working fluid pressurized by the high-pressure source device 140 is exerted in the direction in which the valve member 180 is moved away from the valve seat portion 182. In the pressure-reduce linear valve 172, a differential pressure force F3 determined by a hydraulic pressure of the working fluid stored in the reservoir 134, i.e., a differential pressure between the atmospheric pressure and the supply pressure is exerted in the direction in which the valve member 180 is moved away from the valve seat portion 182. Thus, in each of the pressure-increase linear valve 170 and the pressure-reduce linear valve 172, the differential pressure force F3 can be controlled by controlling an amount of the current supplied to the solenoid 186, enabling the control of the valve opening pressures of the pressure-increase linear valve 170 and the pressure-reduce linear valve 172. That is, the pressure-increase linear valve 170 and the pressure-reduce linear valve 172 are used so as to function as differential pressure valves, making it possible to change the supply pressure controllably.

Further, each of the pressure-increase linear valve 170 and the pressure-reduce linear valve 172 can also be used so as to function as a flow-amount regulating valve for controlling the supply pressure. In this case, an actual supply pressure is changed as follows to a target supply pressure that is a target of the supply pressure; where a difference between the target supply pressure and the actual supply pressure is relatively large, a flow amount of the working fluid from a high-pressure side to a low-pressure side is increased by increasing the amount of the current supplied to the solenoid 186, and the smaller the difference between the target supply pressure and the actual supply pressure, the less current is supplied to the solenoid 186. That is, an electric power according to the difference between the target supply pressure and the actual supply pressure is supplied to the solenoid 186, making it possible to make the actual supply pressure equal to the target supply pressure.

Between the pump 152 of the high-pressure passage 150 and the pressure-increase linear valve 170, there is provided a high-pressure-source hydraulic sensor 190 that detects the hydraulic pressure of the high-pressure working fluid pressurized by the high-pressure source device 140. In the common passage 160, there is provided a common-passage hydraulic sensor 192 as a detector that detects the hydraulic pressure of the working fluid, i.e., the supply pressure in the common passage 160 as a liquid passage.

The above-described four brake cylinders 128 are connected to the common passage 160 via the ABS valve device 142. For respective wheels, the ABS valve device 142 includes: (a) ABS holding valves 200 respectively for increasing or keeping a hydraulic pressure in the brake cylinders 128; and (b) ABS pressure-reduce valves 202 respectively for reducing the hydraulic pressure in the brake cylinders 128. The ABS holding valves 200 are electromagnetic valves respectively provided in individual channels 204 which are connected to the respective brake cylinders 128 and the common passage 160. The ABS holding valve 200FL corresponding to the front left wheel 18FL is provided by a normally open valve, and the other three ABS holding valves 200FR, RL, RR are provided by normally closed valves. The ABS pressure-reduce valves 202 are electromagnetic valves respectively provided in individual low-pressure passages 206 which are connected to the low-pressure passage 162 and the respective individual channels 204 on downstream sides of the respective ABS holding valves 200. The two ABS pressure-reduce valves 202FL, FR respectively corresponding to the front wheels 18FL, FR are provided by normally closed valves, and the two ABS pressure-reduce valves 202RL, RR respectively corresponding to the rear wheels 18RL, RR are provided by normally open valves.

Figure 28:
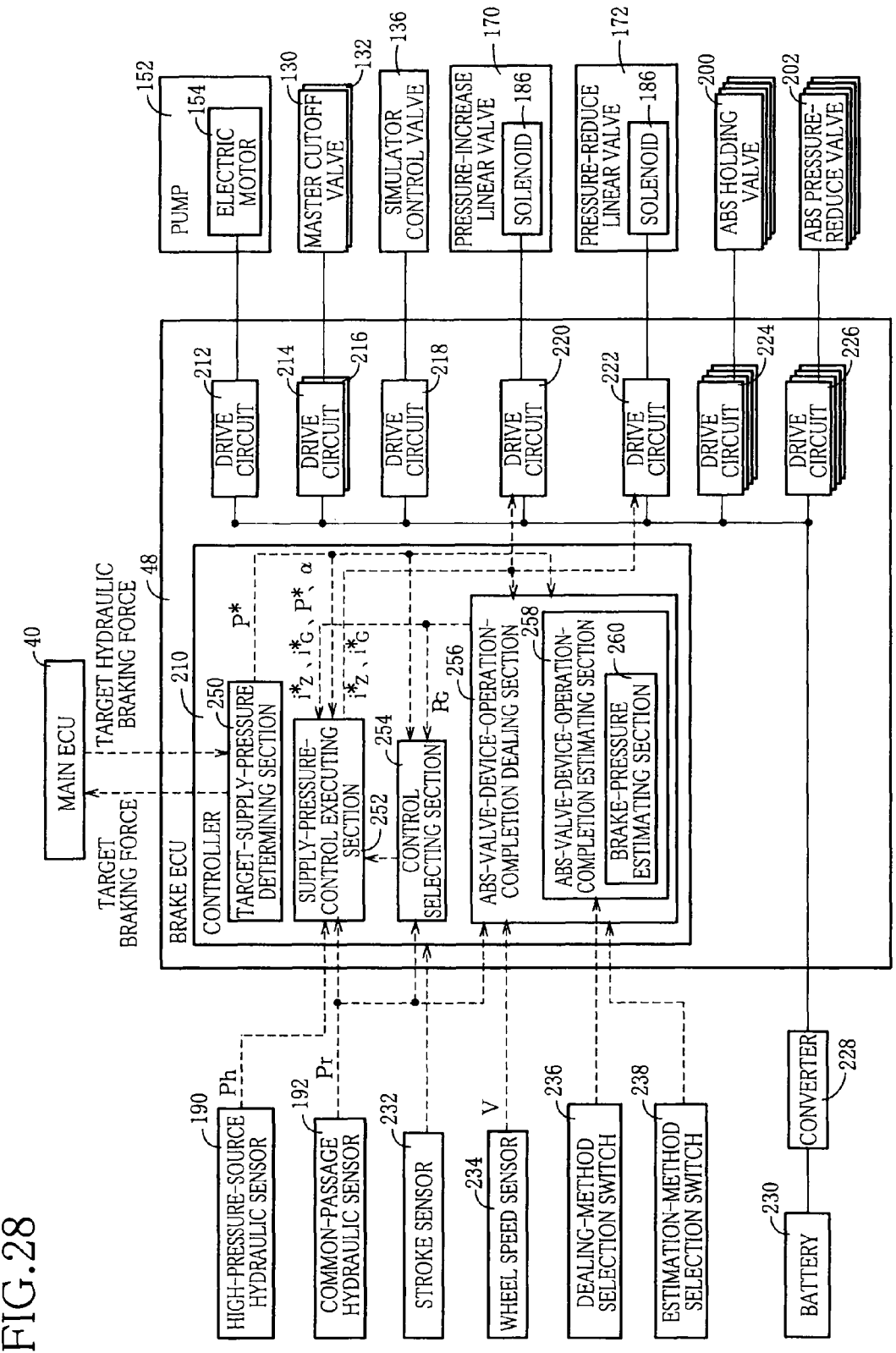
FIG. 28 is a block diagram showing functions of a controller configured to control controls of the hydraulic brake system.

As shown in FIG. 1, the brake ECU 48 is provided in the present system. The brake ECU 48 is a controller that controls the operations of the electromagnetic valves 130, 132, 136, 170, 172, 200, and 202, and the pump 152 and controls the hydraulic pressures of the working fluid applied to the brake cylinders 128 of the respective brake devices 126. As shown in FIG. 28, the brake ECU 48 includes: (a) a controller 210 mainly constituted by a computer having a CPU, a ROM, a RAM and the like; (b) a drive circuit 212 corresponding to the electric motor 154 for driving the pump 152; and (c) a plurality of drive circuits 214, 216, 218, 220, 222, 224, and 226 respectively corresponding to the electromagnetic valves 130, 132, 136, 170, 172, 200, and 202. A battery 230 is connected to the plurality of the drive circuits 212, etc., via a converter 228 so as to supply electric powers to the electric motor 154 and the control valves 130, etc.

Further, the controller 210 is connected to the plurality of the drive circuits 212, etc., so as to transmit control signals to the plurality of the drive circuits 212, etc. Specifically, the controller 210 transmits a motor drive signal to the drive circuit 212 of the electric motor 154 and transmits, to the respective drive circuits 214, 216, 218 of the master cutoff valves 130, 132 and the simulator control valve 136, control signals for opening and closing the electromagnetic valves. Further, the controller 210 transmits, to the respective drive circuits 220, 222 of the pressure-increase linear valve 170 and the pressure-reduce linear valve 172, current control signals for controlling magnetic forces generated by the solenoids 186 of the respective linear valves 170, 172. Further, the controller 210 transmits, to the respective drive circuits 224, 226 of the ABS holding valves 200 and the ABS pressure-reduce valves 202, current control signals for controlling an open time and a closed time of each electromagnetic valve. As thus described, the controller 210 transmits the control signals to the drive circuits 212, etc., to control the operations of the electric motor 154 and the electromagnetic valves 130, etc. In addition to the above-described high-pressure-source hydraulic sensor 190 and common-passage hydraulic sensor 192, to the controller 210 are connected (a) a stroke sensor 232 for detecting an amount of the operation of the brake pedal 110; (b) wheel speed sensors 234, respectively attached to the wheels 18, for detecting rotational speeds of the respective wheels; (c) a dealing-method selection switch 236 for selecting a dealing method in a dealing control which will be described below; (d) an estimation-method selection switch 238 for selecting an estimation method that is for estimating a completion (end) of the operation of the ABS valve device 142 in the dealing control; and so on. Detection values detected by the sensors and switches are used in a control of the brake system 100 which will be explained below.

<Control of Hydraulic Brake System for Vehicle>

In this brake system 100, the above-described construction allows production of the braking force in the following manner: when the brake pedal 110 has been operated by the driver, a force applied to the brake pedal 110 pressurizes the working fluid in the pressure chambers 118, 120 of the master cylinder 116, and the brake cylinders 128 of the respective brake devices 126 are operated by depending on the pressurized working fluid to produce the braking force. However, in this system 100, an electric braking control for activating the brake cylinders 128 of the respective brake devices 126 is normally executed by depending on the working fluid regulated by the liquid-pressure source device 144 without depending on the working fluid pressurized by the master cylinder 116.

In the electric braking control, the master cutoff valves 130, 132 are energized to be closed such that the working fluid pressurized by the master cylinder 116 does not influence the brake cylinders 128. Then, in order to activate the brake cylinders 128 by depending on the working fluid whose pressure has been regulated by the liquid-pressure source device 144, the ABS holding valve 200FL corresponding to the front left wheel 18FL is deenergized, and the other three ABS holding valves 200FR, RL, RR are energized, whereby all the ABS holding valves 200 are opened. Further, the two ABS pressure-reduce valves 202FL, FR respectively corresponding to the front wheels 18FL, FR are deenergized, and the two ABS pressure-reduce valves 202RL, RR respectively corresponding to the rear wheels 18RL, RR are energized, whereby all the ABS pressure-reduce valves 202 are closed. As thus described, the control of the electromagnetic valves enables the brake cylinders 128 to be activated by the working fluid supplied from the liquid-pressure source device 144. That is, the supply pressure that is the hydraulic pressure of the working fluid supplied from the liquid-pressure source device 144 becomes the brake pressure that is the hydraulic pressure of the working fluid supplied to the brake cylinders 128.

i) Target-Supply-Pressure Control

The target hydraulic braking force to be generated by the brake devices 126 in the electric braking control is calculated by the above-described main ECU 40 as described above, and the controller 210 of the brake ECU 48 calculates a supply pressure that can produce the target hydraulic braking force, as a target supply hydraulic-pressure P*. The controller 210 then compares the calculated target supply pressure P* and an actual supply pressure Pr detected by the above-described common-passage hydraulic sensor 192 with each other. Where the actual supply pressure Pr is higher than the target supply pressure P*, the liquid-pressure source device 144 is controlled to reduce the actual supply pressure Pr, while where the actual supply pressure Pr is lower than the target supply pressure P*, the liquid-pressure source device 144 is controlled to increase the actual supply pressure Pr. That is, in the electric braking control, the target-supply-pressure control is executed for controlling the operation of the liquid-pressure source device 144 such that the actual supply pressure Pr becomes the target supply pressure P.

Specifically, in the target-supply-pressure control, where the actual supply pressure Pr is higher than the target supply pressure P*, the pressure-increase linear valve 170 is deenergized in order to close the pressure-increase linear valve 170. That is, the amount of the current supplied to the solenoid 186 of the pressure-increase linear valve 170 is set at zero. The amount of the current supplied to the solenoid 186 of the pressure-reduce linear valve 172 is then controlled such that the actual supply pressure Pr is lowered to the target supply pressure P. In this system 100, the amount of the current supplied to the solenoid 186 of the pressure-reduce linear valve 172 is determined on the basis of an absolute value of a supply pressure difference ΔP that is the difference between the target supply pressure P* and the actual supply pressure Pr, by using a method of a feedback control based on the absolute value of the supply pressure difference ΔP. Specifically, the supply pressure difference ΔP is initially calculated, and then a target supply current $i^*_G$ supplied to the solenoid 186 of the pressure-reduce linear valve 172 is determined according to the following formula by using the supply pressure difference ΔP as a parameter:

$$i^*_G = i_{G0} + K_G \cdot |\Delta P|$$

Here, "$K_G$" represents a proportional gain corresponding to the pressure-reduce linear valve 172, and "$i_{G0}$" represents a differential pressure between the actual supply pressure Pr applied to the valve member 180 of the pressure-reduce linear valve 172 and the hydraulic pressure of the working fluid stored in the reservoir 134, i.e., a valve opening current $i_{GK}$ for the pressure-reduce linear valve 172 which is determined according to the actual supply pressure Pr. The valve opening current $i_{GK}$ for the pressure-reduce linear valve 172 has a fixed relationship with a supply pressure Pk and is determined according to the following formula:

$$i_{GK} = f(Pk)$$

Figure 4:
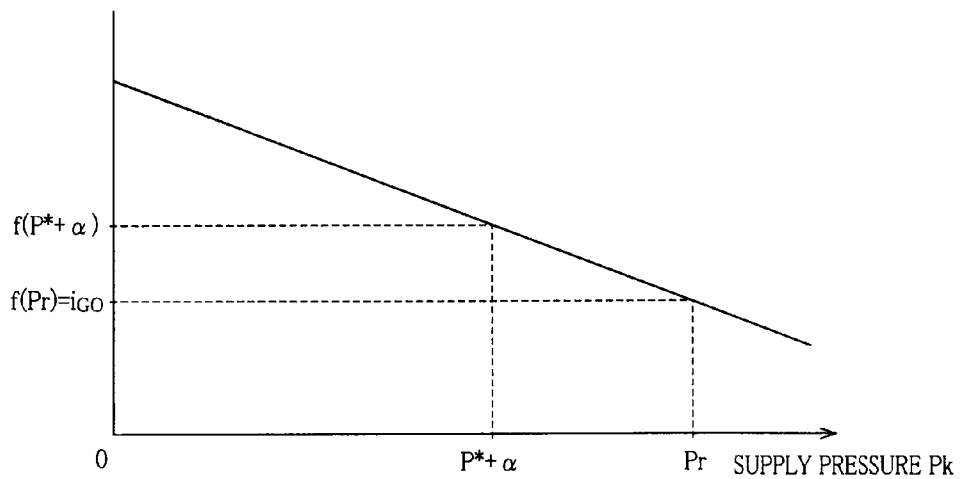
FIG. 4 is a graph showing a relationship between a supply pressure and a valve opening current for the pressure-reduce linear valve.

Here, "f(Pk)" is a function that depends on the supply pressure Pk and, as shown in FIG. 4, decreases linearly in accordance with an increase in the supply pressure Pk.

On the other hand, where the actual supply pressure Pr is lower than the target supply pressure P*, the amount of the current supplied to the solenoid 186 of the pressure-reduce linear valve 172 is set at zero in order to close the pressure-reduce linear valve 172. The amount of the current supplied to the solenoid 186 of the pressure-increase linear valve 170 is then controlled such that the actual supply pressure Pr is increased to the target supply pressure P*. An amount of the target supply current $i^*_Z$ supplied to the solenoid 186 of the pressure-increase linear valve 170 is determined according to the following formula:

$$i^*_Z = i_{Z0} + K_Z \cdot |\Delta P|$$

Here, "$K_Z$" represents a proportional gain corresponding to the pressure-increase linear valve 170, and "$i_{Z0}$" represents a valve opening current $i_{ZK}$ for the pressure-increase linear valve 170 determined according to a differential pressure (Ph−Pr) between the actual supply pressure Pr and the hydraulic pressure of the high-pressure working fluid generated by the high-pressure source device 140, i.e., a high-pressure source pressure Ph detected by the high-pressure-source hydraulic sensor 190. The valve opening current $i_{ZK}$ for the pressure-increase linear valve 170 has a fixed relationship with a differential pressure (Ph−Pk) between the high-pressure source pressure Ph and the supply pressure Pk and is determined according to the following formula:

$$i_{ZK} = g(Ph-Pk)$$

Figure 5:
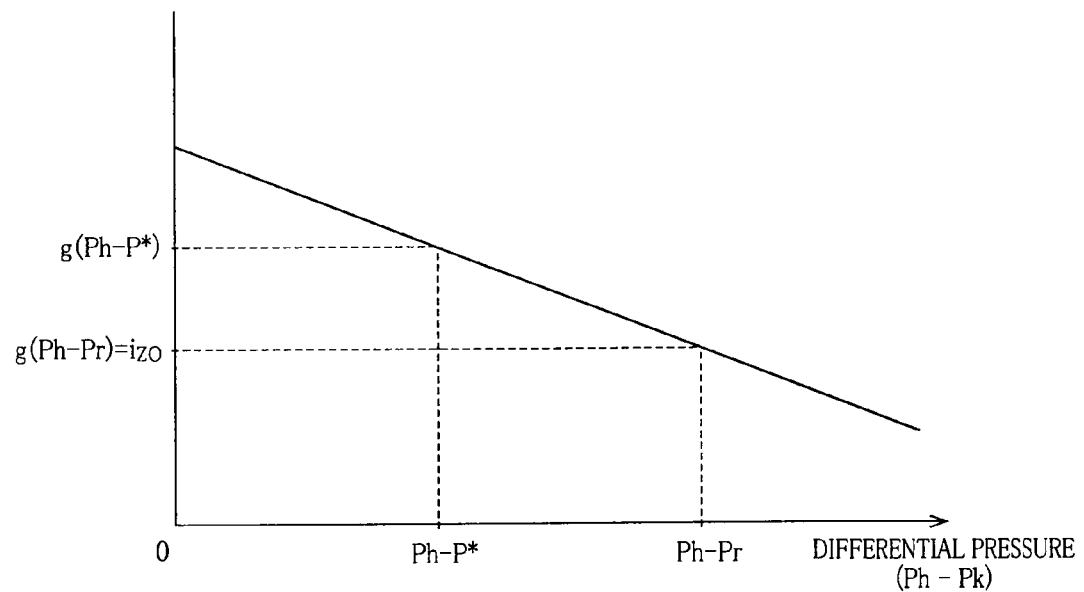
FIG. 5 is a graph showing a relationship between (i) a differential pressure between a high-pressure source pressure and the supply pressure and (ii) the valve opening current for the pressure-increase linear valve.

Here, "g(Ph−Pk)" is a function that depends on the differential pressure (Ph−Pk) between the high-pressure source pressure Ph and the supply pressure Pk and, as shown in FIG. 5, decreases linearly in accordance with an increase in the differential pressure (Ph−Pk).

It is noted that, where the actual supply pressure Pr and the target supply pressure P* are generally equal to each other, each of the amount of the current supplied to the solenoid 186 of the pressure-increase linear valve 170 and the amount of the current supplied to the solenoid 186 of the pressure-reduce linear valve 172 is set at zero in order to maintain the actual supply pressure Pr. As thus described, in the target-supply-pressure control, the amount of the current supplied to the solenoid 186 of each of the pressure-increase linear valve 170 and the pressure-reduce linear valve 172 is controlled, making it possible to set the supply pressure at the target supply pressure and making it possible to set the braking force produced by each brake device 126 at the target hydraulic braking force.

ii) Control of ABS Valve Device

Further, in this brake system 100, by controlling the operation of the ABS valve device 142, controls for stabilizing behavior of the vehicle are performed such as an ABS (Antilock Brake System) control, a VSC (Vehicle Stability Control), and a TRC (Traction Control). The ABS control is a control for preventing the wheels from locking up in the case of, e.g., a sudden braking. The VSC is a control for restraining skids of the wheels in turning of the vehicle. The TRC is a control for restraining spin of the drive wheels in the case of start of the vehicle, sudden acceleration, or the like.

In the ABS control, the VSC, and the TRC, the brake pressures of the respective brake devices 126 are individually controlled by controlling the ABS holding valves 200 and the ABS pressure-reduce valves 202 provided in correspondence with the respective brake devices 126. The ABS control and the like are well known in the art and thus will be explained simply. Initially, the controller 210 of the brake ECU 48 calculates a duty ratio for each of the four ABS holding valves 200 and the four ABS pressure-reduce valves 202 on the basis of the rotational speed and a slip rate of each wheel and so on. The electric power is then supplied to each of the ABS holding valves 200 and each of the ABS pressure-reduce valves 202 such that each ABS holding valve 200 and each ABS pressure-reduce valve 202 is opened or closed according to the duty ratio. In a state in which the ABS holding valves 200 are open while the ABS pressure-reduce valves 202 are closed, the brake pressure can be increased to the supply pressure. In a state in which the ABS holding valves 200 are closed while the ABS pressure-reduce valves 202 are open, the brake pressure can be reduced to the atmospheric pressure. As thus described, by controlling the ABS valve device 142, the lock, the skids, the spin, and so on of the wheels are restrained.

However, when the ABS control and/or the like has been performed during the above-described target-supply-pressure control, each ABS holding valve 200 and each ABS pressure-reduce valve 202 are opened or closed, whereby a volume of the liquid passage such as the common passage 160 into which the working fluid supplied by the liquid-pressure source device 144 flows may be changed considerably, making it difficult for the supply pressure to follow the target supply pressure. Further, when the ABS pressure-reduce valves 202 have been opened, the working fluid flows out from the brake devices 126 into the reservoir 134, and when the ABS holding valves 200 are opened, the working fluid in the common passage 160 flows into the brake devices 126. During the ABS control and/or the like, the ABS holding valves 200 and the ABS pressure-reduce valves 202 are opened and closed frequently. Thus, there may be a risk that the working fluid in the common passage 160, that is, the working fluid supplied from the liquid-pressure source device 144 is discharged to the reservoir 134 via the brake devices 126 more frequently, making it more difficult for the supply pressure to be kept at a high pressure. Further, since the supply pressure is considerably changed by the discharge of the working fluid (supplied from the liquid-pressure source device 144) to the reservoir 134, the energizing state of the pressure-increase linear valve 170 and the pressure-reduce linear valve 172 may be changed frequently.

iii) Target Range Control

To address these problems, in this brake system 100, where the ABS control and/or the like is being performed, a target range control as a first control for controlling the liquid-pressure source device 144 such that the supply pressure falls within a target range is performed instead of the target-supply-pressure control. In the target range control as a second control, the supply pressure is kept within the target range by supplying the electric power to the pressure-increase linear valve 170 and the pressure-reduce linear valve 172 such that, when the supply pressure has become equal to or higher than an upper limit value of the target range, the pressure-reduce linear valve 172 is opened, and on the other hand, when the supply pressure has become equal to or lower than a lower limit of the target range, the pressure-increase linear valve 170 is opened. That is, the electric power causing a pressure corresponding to the upper limit value of the target range to become the valve opening pressure of the pressure-reduce linear valve 172 is supplied to the pressure-reduce linear valve 172, and the electric power causing a pressure corresponding to the lower limit of the target range to become the valve opening pressure of the pressure-increase linear valve 170 is supplied to the pressure-increase linear valve 170, whereby the pressure-increase linear valve 170 and the pressure-reduce linear valve 172 are used so as to function as the differential pressure valves to maintain the supply pressure within the target range.

The target range in the target range control is set such that the upper limit value is a value obtained by adding an upper-limit determining additional value $\alpha$ to the target supply pressure P* and such that the lower limit is a value obtained by reducing the lower-limit determining reduction value $\beta$ from the target supply pressure P*. Since the target range control is the control performed in a situation in which the working fluid in the common passage 160 is frequently discharged to the reservoir 134 via the brake devices 126, the upper-limit determining additional value $\alpha$ is set at a value larger than the lower-limit determining reduction value B in order to maintain the supply pressure at a relatively high pressure. It is noted that the lower-limit determining reduction value B in this system 100 is set at 0 (zero), so that the supply pressure is maintained at a value equal to or higher than the target supply pressure.

The target supply current $i^*_G$ supplied to the solenoid 186 of the pressure-reduce linear valve 172 in the target range control is determined such that the pressure-reduce linear valve 172 is opened at the pressure corresponding to the value obtained by adding the upper-limit determining additional value $\alpha$ to the target supply pressure P*. Specifically, the target supply current $i^*_G$ is determined according to the function shown in FIG. 4 that represents the relationship between the valve opening current $i_{GK}$ for the pressure-reduce linear valve 172 and the supply pressure Pk. That is, the target supply current $i^*_G$ is the valve opening current $i_{GK}$ corresponding to the value (P*+$\alpha$) obtained by adding the upper-limit determining additional value $\alpha$ to the target supply pressure P* and determined according to the following formula:

$$i^*_G = f(P^* + \alpha)$$

The target supply current $i^*_Z$ supplied to the solenoid 186 of the pressure-increase linear valve 170 is determined such that the pressure-increase linear valve 170 is opened at the target supply pressure P* because the lower-limit determining reduction value $\beta$ is zero, and determined according to the function shown in FIG. 5 that represents the relationship between (a) the differential pressure (Ph−Pk) between the high-pressure source pressure Ph and the supply pressure Pk and (b) the valve opening current $i_{ZK}$ for the pressure-increase linear valve 170. Specifically, the target supply current $i^*_Z$ is the valve opening current $i_{ZK}$ corresponding to a differential pressure (Ph−P*) between the high-pressure source pressure Ph and the target supply pressure P* and determined according to the following formula:

$$i^*_Z = g(Ph - P^*)$$

As described above, in the target range control, it is possible to make the supply pressure fall within the target range by controlling the amount of the current supplied to the solenoid 186 of each of the pressure-increase linear valve 170 and the pressure-reduce linear valve 172. Thus, in a situation in which the ABS holding valves 200 and the ABS pressure-reduce valves 202 are frequently opened and closed by the ABS control and/or the like, it is possible to restrain the frequent changes of the energizing state of the pressure-increase linear valve 170 and the pressure-reduce linear valve 172 without making the supply pressure follow the target supply pressure on purpose. Further, the supply pressure can fall within the range set to be equal to or higher than the target supply pressure, making it possible to maintain the supply pressure at a relatively high pressure.

However, the supply pressure sometimes deviates from the target range by sudden changes of the target supply pressure P*, sudden reduction of the brake pressure, or the like. In this case, the supply pressure is preferably changed so as to fall within the target range quickly by increasing an amount of the working fluid flowing from the high-pressure source device 140 into the common passage 160 per unit time or increasing an amount of the working fluid flowing from the common passage 160 into the reservoir 134 per unit time. Thus, in this system 100, even in the case where the ABS control and/or the like is being performed, when the supply pressure has greatly deviated from the target range, the target-supply-pressure control for controlling the pressure-increase linear valve 170 and the pressure-reduce linear valve 172 to function as the flow-amount regulating valves is performed. Specifically, even where the ABS control and/or the like is being performed, when the supply pressure has become higher than a pressure-reducing threshold value set at a pressure relatively higher than the target supply pressure, a control for reducing the supply pressure in the target-supply-pressure control is performed, and when the supply pressure has become lower than a pressurizing threshold value set at a pressure relatively lower than the target supply pressure, a control for increasing the supply pressure in the target-supply-pressure control is performed. It is noted that the pressure-reducing threshold value is set at a value (P*+P$_G$) obtained by adding a pressure-reducing threshold-value determination additional value P$_G$ to the target supply pressure P*, and the pressurizing threshold value is set at a value (P*−P$_Z$) obtained by reducing a pressurizing threshold-value determination reduction value P$_Z$ from the target supply pressure P*. It is noted that the pressure-reducing threshold-value determination additional value P$_G$ is larger than the above-described upper-limit determining additional value α.

iv) Dealing Control

As described above, in this system 100, where the ABS valve device 142 is being operated, the target range control is normally performed, and where the ABS valve device 142 is not being performed, the target-supply-pressure control is performed. Since the target range control is a control in which it is acceptable if the supply pressure falls within the target range, the supply pressure deviates from the target supply pressure frequently in the target range control. Where a width of the target range is set to be relatively wide, the supply pressure may deviate from the target supply pressure greatly. Thus, when the target-supply-pressure control is performed instead of the target range control after the end of the operation of the ABS valve device 142, it may be difficult for the supply pressure to follow the target supply pressure, giving a discomfort to the driver during his or her braking operation. Further, where the target-supply-pressure control is being performed during the operation of the ABS valve device 142, the supply pressure deviates from the target supply pressure greatly. Thus, when the operation of the ABS valve device 142 is finished, a discomfort may be given to the driver with his or her braking operation.

In view of the above, in this system 100, in a situation in which it is estimated that the operation of the ABS valve device 142 is completed, a dealing control for dealing with the situation is performed. The dealing control is a control for reducing a difference between the supply pressure and the target supply pressure at a time of the completion of the operation of the ABS valve device 142 and for reducing the discomfort in the braking operation of the driver at a time of the completion of the operation of the ABS valve device 142. It is noted that, since the target range control performed in the operation of the ABS valve device is a control for changing the supply pressure so as to fall within the target range set to be equal to or higher than the target supply pressure, the supply pressure is mostly equal to or higher than the target supply pressure in the operation of the ABS valve device. That is, the dealing control is a control for causing the supply pressure that is higher than the target supply pressure, to approach the target supply pressure, and for enhancing a pressure reducing effect. In this system 100, in the situation in which it is estimated that the operation of the ABS valve device 142 is completed, the difference between the supply pressure and the target supply pressure can be reduced by various methods. That is, in this system 100, the dealing control to be performed has various variations. There will be explained variations of the dealing control below.

a) Dealing Control depending on Pressure-Reducing Threshold-Value Determination Additional Value From a viewpoint of restraining the frequent changes of the energizing state of the pressure-increase linear valve 170 and the pressure-reduce linear valve 172, the pressure-reducing threshold value for switching between the target-supply-pressure control and the target range control during the operation of the ABS valve device 142 is preferably set at a relatively higher value than the target supply pressure. However, there is a risk that it becomes more difficult to change from the target range control to the target supply pressure control as the pressure-reducing threshold value is set at a higher value than the target supply pressure, resulting in a larger difference between the supply pressure and the target supply pressure in a state in which the supply pressure is higher than the target supply pressure.

In order to solve this problem, in this system 100, in the situation in which it is estimated that the operation of the ABS valve device 142 is completed, the pressure-reducing threshold-value determination additional value P$_G$ for setting the pressure-reducing threshold value is reduced to a smaller value. Specifically, the pressure-reducing threshold-value determination additional value P$_G$ is normally set at P$_{G1}$, and in the situation in which it is estimated that the operation of the ABS valve device 142 is completed, the pressure-reducing threshold-value determination additional value P$_G$ is changed to P$_{G2}$ that is smaller than P$_{G1}$. As thus described, by reducing the pressure-reducing threshold-value determination additional value P$_G$, the target range control is easily changed to the target supply pressure control, making it possible to reduce the difference between the supply pressure and the target supply pressure at the time of the completion of the operation of the ABS valve device 142. That is, it is possible to reduce the discomfort given to the driver at the time of the completion of the operation of the ABS valve device by changing the pressure-reducing threshold-value determination additional value $P_G$ to a smaller value as the dealing control.

FIG. 6 shows a change of the target supply pressure P*, the actual supply pressure Pr, and the brake pressure $P_B$ with lapse of time and a change of the pressure-reducing threshold-value determination additional value $P_G$ with lapse of time where the dealing control depending on the pressure-reducing threshold-value determination additional value $P_G$ is being performed. As shown in the figure, where the pressure-reducing threshold-value determination additional value $P_G$ is a small value, that is, where the pressure-reducing threshold-value determination additional value $P_G$ is $P_{G2}$, the dealing control is performed, and the difference between the target supply pressure P* (a solid line) and the actual supply pressure Pr (a broken line) can be small. It is noted that, where the actual supply pressure Pr (the broken line) and the brake pressure $P_B$ (a one-dot chain line) coincide with each other in FIG. 6 and the following figures, the actual supply pressure Pr and the brake pressure $P_B$ are indicated by a one-dot chain line.

b) Dealing Control depending on Upper-Limit Determining Additional Value

From a viewpoint of maintaining the supply pressure at a relatively high pressure during the operation of the ABS valve device 142, the upper limit value of the target range, i.e., the upper-limit determining additional value α is desirably set at a relatively large value. However, the larger value the upper-limit determining additional value α is set to, the larger a difference between the valve opening pressure of the pressure-reduce linear valve 172 and the target supply pressure becomes. Thus, there is a risk that the difference between the supply pressure and the target supply pressure becomes large in the state in which the supply pressure is higher than the target supply pressure.

In order to solve this problem, in this system 100, in the situation in which it is estimated that the operation of the ABS valve device 142 is completed, the upper-limit determining additional value α is changed to a smaller value. Specifically, the upper-limit determining additional value α is normally set at $α_1$, and the upper-limit determining additional value α is changed to $α_2$ that is smaller than $α_1$ in the situation in which it is estimated that the operation of the ABS valve device 142 is completed. As thus described, by reducing the upper-limit determining additional value α, the difference between the valve opening pressure of the pressure-reduce linear valve 172 and the target supply pressure is made smaller, making it possible to reduce the difference between the supply pressure and the target supply pressure at the time of the completion of the operation of the ABS valve device 142. That is, it is possible to reduce the discomfort given to the driver at the time of the completion of the operation of the ABS valve device by changing the upper-limit determining additional value α to a smaller value as the dealing control.

Figure 7A:
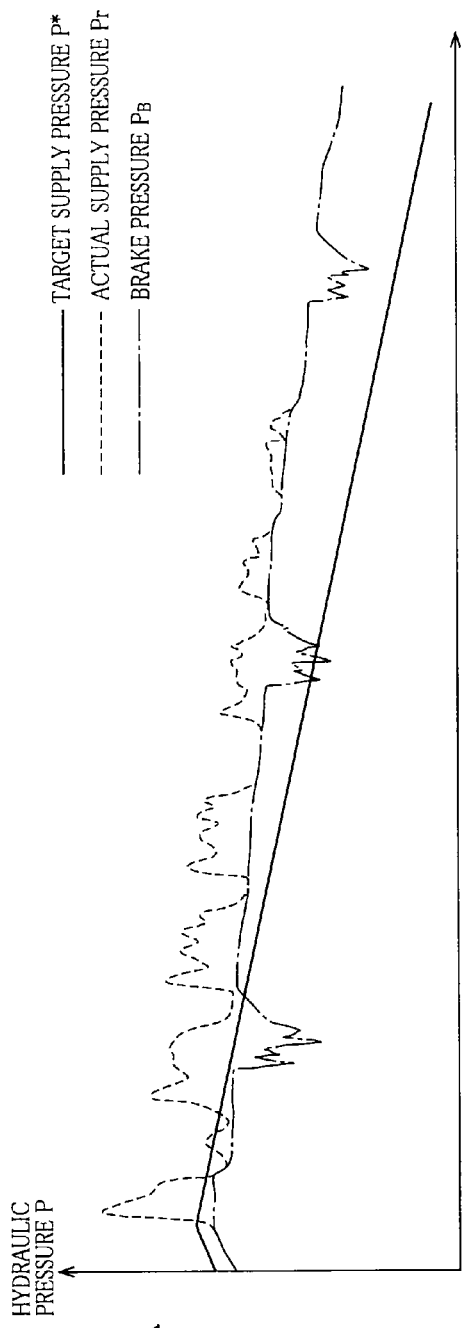
FIG. 7A is a chart generally showing changes of the target supply pressure, the actual supply pressure, and the brake pressure with lapse of time when the dealing control is not executed.
Figure 7B:
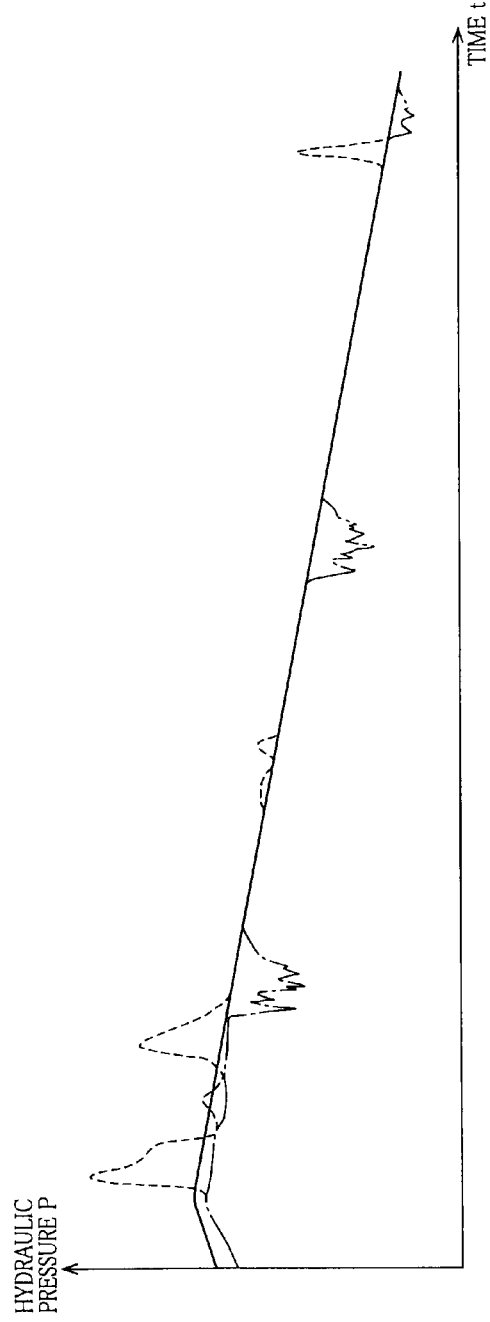
FIG. 7B is a chart generally showing changes of the target supply pressure, the actual supply pressure, and the brake pressure with lapse of time when the dealing control is executed.

FIG. 7A shows a change of the target supply pressure P*, the actual supply pressure Pr, and the brake pressure $P_B$ with lapse of time where the dealing control is not being performed, and FIG. 7B shows a change of the target supply pressure P*, the actual supply pressure Pr, and the brake pressure $P_B$ with lapse of time where the dealing control depending on the upper-limit determining additional value α is being performed. As shown in the figures, in the case where the dealing control is not being performed (FIG. 7A), even where the target supply pressure P* (a solid lines) is lowered, the actual supply pressure Pr (a broken line) is kept at a high pressure, and the difference between the target supply pressure P* and the actual supply pressure Pr is large. On the other hand, in the case where the dealing control is being performed (FIG. 7B), the actual supply pressure Pr follows the change of the target supply pressure P*, whereby the difference between the target supply pressure P* and the actual supply pressure Pr can be made smaller. It is noted that, where the target supply pressure P*, the actual supply pressure Pr, and the brake pressure $P_B$ coincide with one another in FIG. 7 and the following figures, the three hydraulic pressure P*, Pr, $P_B$ are indicated by a solid line.

c) Dealing Control depending on Target Supply Current of Pressure-Reduce Linear Valve In some cases, the target-supply-pressure control is performed during the operation of the ABS valve device 142, but in these cases, the supply pressure is greatly different from the target supply pressure. In order to quickly reduce the difference between the supply pressure and the target supply pressure, a control using the feedback control is performed. In the feedback control, a component of the target supply current supplied to the solenoid 186 is determined according to the difference between the actual supply pressure and the target supply pressure, and the pressure reducing effect or the pressurizing effect varies according to a feedback gain used when the component is determined. Specifically, when a component of the target supply current $i^*_G$ supplied to the solenoid 186 of the pressure-reduce linear valve 172 is determined, a proportional gain $K_G$ corresponding to the pressure-reduce linear valve 172 is used. The higher the proportional gain $K_G$, the greater the pressure reducing effect becomes, and the lower the proportional gain $K_G$, the less the pressure reducing effect becomes.

Thus, in this system 100, where the target-supply-pressure control is being performed in the situation in which it is estimated that the operation of the ABS valve device 142 is completed, the proportional gain $K_G$ corresponding to the pressure-reduce linear valve 172 is made higher. Specifically, the proportional gain $K_G$ is normally set at $K_{G1}$, and the proportional gain $K_G$ is changed to $K_{G2}$ that is higher than $K_{G1}$ in the situation in which it is estimated that the operation of the ABS valve device 142 is completed. As thus described, the pressure reducing effect is made larger by making the proportional gain $K_G$ higher, making it possible to reduce the difference between the supply pressure and the target supply pressure at the time of the completion of the operation of the ABS valve device 142. That is, it is possible to reduce the discomfort given to the driver at the time of the completion of the operation of the ABS valve device by increasing the electric power supplied to the pressure-reduce linear valve 172 by making the proportional gain $K_G$ corresponding to the pressure-reduce linear valve 172 higher as the dealing control.

d) Dealing Control depending on Target Supply Pressure

As described above, it is possible to reduce the discomfort given to the driver at the time of the completion of the operation of the ABS valve device by performing at least one of reducing the pressure-reducing threshold value, reducing the upper limit value of the target range, and increasing the target supply current $i^*_G$ of the pressure-reduce linear valve 172. The pressure-reducing threshold value is set at the value (P*+$P_G$) obtained by adding the pressure-reducing threshold-value determination additional value $P_G$ to the target supply pressure P*, and thus the pressure-reducing threshold value can be reduced also by reducing the target supply pressure P* instead of reducing the pressure-reducing threshold-value determination additional value $P_G$. Further, the upper limit value of the target range is set at the value (P*+α) obtained by adding the upper-limit determining additional value α to the target supply pressure P*, and thus the upper limit value can be reduced also by reducing the target supply pressure P* instead of reducing the upper-limit determining additional value α. The target supply current $i^*_G$ of the pressure-reduce linear valve 172 is determined according to the following formula:

$$i^*_G = i_{G0} + K_G \cdot |\Delta P|$$

It is noted that the supply pressure difference ΔP is the difference between the actual supply pressure Pr and the target supply pressure P*, and when the supply pressure is reduced, the actual supply pressure Pr is higher than the target supply pressure P*. Thus, the above-described formula can be converted to the following formula:

$$i^*_G = i_{G0} + K_G \cdot (Pr - P^*)$$

As shown in this formula, the target supply current $i^*_G$ of the pressure-reduce linear valve 172 is increased also by increasing the difference between the actual supply pressure Pr and the target supply pressure P* (Pr–P*) instead of increasing the proportional gain $K_G$. That is, the difference between the actual supply pressure Pr and the target supply pressure P* (Pr–P*) is increased also by reducing the target supply pressure P*, making it possible to increase the target supply current $i^*_G$ of the pressure-reduce linear valve 172.

Accordingly, by reducing the target supply pressure P* used for the control, it is possible to reduce the pressure-reducing threshold value, reduce the upper limit value of the target range, and increase the target supply current $i^*_G$ of the pressure-reduce linear valve 172. Thus, in this system 100, in the situation in which it is estimated that the operation of the ABS valve device 142 is completed, the target supply pressure P* used for the control is reduced as the dealing control. Specifically, each control is normally performed using the target supply hydraulic-pressure P* corresponding to the above-described target hydraulic braking force, and in the situation in which it is estimated that the operation of the ABS valve device 142 is completed, each control is performed using a pressure (P*–γ) obtained by reducing a set reduction value γ (>0) from the target supply hydraulic-pressure P* corresponding to the above-described target hydraulic braking force. As thus described, it is possible to reduce the discomfort given to the driver at the time of the completion of the operation of the ABS valve device by reducing the target supply hydraulic-pressure P* as the dealing control.

v) Estimation of Completion of Operation of ABS Valve Device

Whether the operation of the ABS valve device 142 is soon to be completed or not needs to be estimated to perform the above-described dealing control. The ABS valve device 142 is controlled for restraining the lock, skids, spin, and so on of the wheels. Thus, by judging whether the lock of the wheels and/or the like is likely to occur or not, the completion of the operation of the ABS valve device 142 can be estimated. Further, since the brake pressure, the supply pressure, and the like change in accordance with the operation of the ABS valve device 142, the completion of the operation of the ABS valve device 142 can be estimated also on the basis of, e.g., a history of the changes of the brake pressure, the supply pressure, and the like, and a relationship between the brake pressure and the supply pressure. As thus described, the completion of the operation of the ABS valve device 142 can be estimated on the basis of, e.g., the brake pressure, the supply pressure, and factors of the lock of the wheels, etc, and in this system 100, the completion of the operation of the ABS valve device 142 is estimated by various methods. There will be next explained variations of the estimation methods for estimating the completion of the operation of the ABS valve device 142.

a) Estimation of Completion of Operation of ABS Valve Device based on Difference between Supply Pressure and Brake Pressure During the operation of the ABS valve device 142, the brake pressure $P_B$ is frequently lower than the actual supply pressure Pr by the operation of the ABS pressure-reduce valves 202. That is, when the open states and the closed states of the ABS pressure-reduce valves 202 are frequently changed, a difference between the brake pressure $P_B$ and the actual supply pressure Pr is relatively large, and when the open states of the ABS pressure-reduce valves 202 become less frequent, the difference between the brake pressure $P_B$ and the actual supply pressure Pr is relatively small. Where the open states of the ABS pressure-reduce valves 202 become less frequent, the lock of the wheels, etc., are usually restrained in some degree, and thus the operation of the ABS valve device 142 is often soon to be completed. Thus, in this system 100, the completion of the operation of the ABS valve device 142 is estimated on the basis of the difference between the actual supply pressure Pr and the brake pressure $P_B$, and when the difference between the actual supply pressure Pr as a judgment pressure and the brake pressure $P_B$ has become equal to or smaller than a set difference $P_1$, it is estimated that the operation of the ABS valve device 142 is soon to be completed.

The actual supply pressure Pr is controlled so as to follow the target supply hydraulic-pressure P* in the target-supply-pressure control, and in the target range control, the actual supply pressure Pr is controlled so as to be a pressure near the target supply hydraulic-pressure P. Thus, when the completion of the operation of the ABS valve device 142 is estimated, the target supply hydraulic-pressure P* can be used instead of the actual supply pressure Pr. Thus, in this system 100, the completion of the operation of the ABS valve device 142 is estimated also on the basis of the difference between the target supply hydraulic-pressure P* and the brake pressure $P_B$, and when the difference between the target supply hydraulic-pressure P* as the judgment pressure and the brake pressure $P_B$ becomes equal to or smaller than a set difference $P_2$, it is estimated that the operation of the ABS valve device 142 is soon to be completed.

It is noted that, in this system 100, the brake pressure $P_B$ is estimated on the basis of an operational condition of the ABS valve device 142. A method of estimating the brake pressure $P_B$ is well known in the art and thus will be explained simply. Initially, an amount of the change of the brake pressure $P_B$ from the start of the operation of the ABS valve device 142 is calculated on the basis of the duty ratio of each of the ABS holding valves 200 and the ABS pressure-reduce valves 202. The calculated amount of the change of the brake pressure $P_B$ is then reduced from the actual supply pressure Pr just before the ABS valve device 142 is operated, thereby estimating the brake pressure $P_B$. The brake pressure $P_B$ is estimated for each of the brake devices 126, and accordingly four brake pressures $P_B$ are estimated for the respective four brake devices 126.

Figure 8:
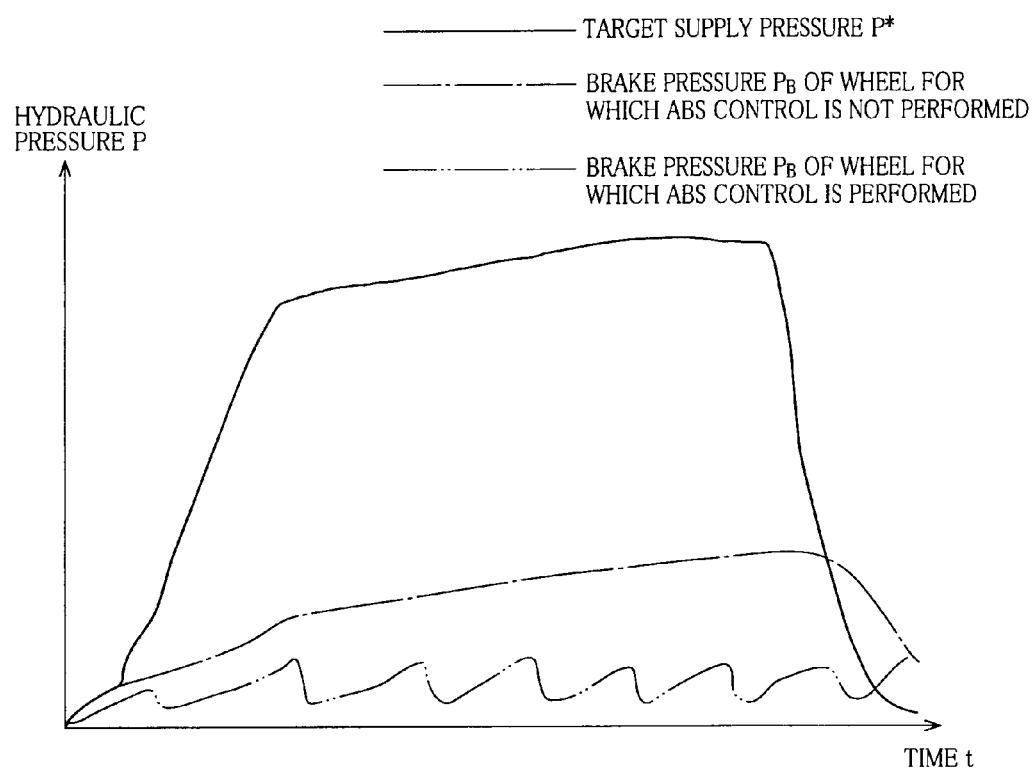
FIG. 8 is a chart generally showing changes of the target supply pressure, a brake pressure of a wheel for which an ABS control is not executed, and a brake pressure of a wheel for which the ABS control is executed, with lapse of time.

The ABS control and/or the like is the control that is for restraining the lock, the skids, and the like of the wheels and is not performed for wheel(s) in which the lock, the skids, and/or the like does not occur. When comparing the brake pressure $P_B$ of wheel(s) for which the ABS control is performed with the brake pressure $P_B$ of wheel(s) for which the ABS control is not performed, as shown in FIG. 8, the brake pressure $P_B$ (a one-dot chain line) of the wheel(s) for which the ABS control is not performed changes so as to generally follow the target supply hydraulic-pressure P* (a solid line). On the other hand, the brake pressure $P_B$ (a two-dot chain line) of the wheel(s) for which the ABS control is performed changes independently of the target supply hydraulic-pressure P* (the solid line). Thus, in this system 100, when the completion of the operation of the ABS valve device 142 is estimated, the difference between the target supply hydraulic-pressure P* and the brake pressure $P_B$ is calculated using the brake pressure(s) $P_B$ of the brake device(s) 126 for which the ABS control and/or the like is not performed among the four brake pressure $P_B$. However, where the ABS control and/or the like is performed for all the wheels, an average value of the four brake pressure $P_B$ is used for calculating the difference between the target supply hydraulic-pressure P* and the brake pressure $P_B$.

When the completion of the operation of the ABS valve device 142 is estimated on the basis of the difference between the brake pressure $P_B$ and the actual supply pressure Pr, a difference between each of the four brake pressures $P_B$ and the actual supply pressure Pr is calculated, and where the difference between the actual supply pressure Pr and the brake pressure $P_B$ becomes equal to or lower than the set difference $P_1$ in at least one of the four brake pressures $P_B$, it is estimated that the operation of the ABS valve device 142 is soon to be completed. It is noted that the larger the number of the brake pressures $P_B$ in each of which the difference between the actual supply pressure Pr and the brake pressure $P_B$ is equal to or smaller than the set difference $P_1$ (hereinafter may be referred to as "requirement-satisfied number"), the higher the pressure reducing effect becomes in the dealing control. Specifically, the larger the requirement-satisfied number N, the smaller the pressure-reducing threshold-value determination additional value $P_{G2}$ is made in the dealing control depending on the pressure-reducing threshold-value determination additional value $P_G$. The pressure-reducing threshold-value determination additional value $P_{G2}$ is determined according to the requirement-satisfied number N and to the following formula:

$$P_{G2}=K_{N1} \cdot P_{G2}$$

Figure 9A:
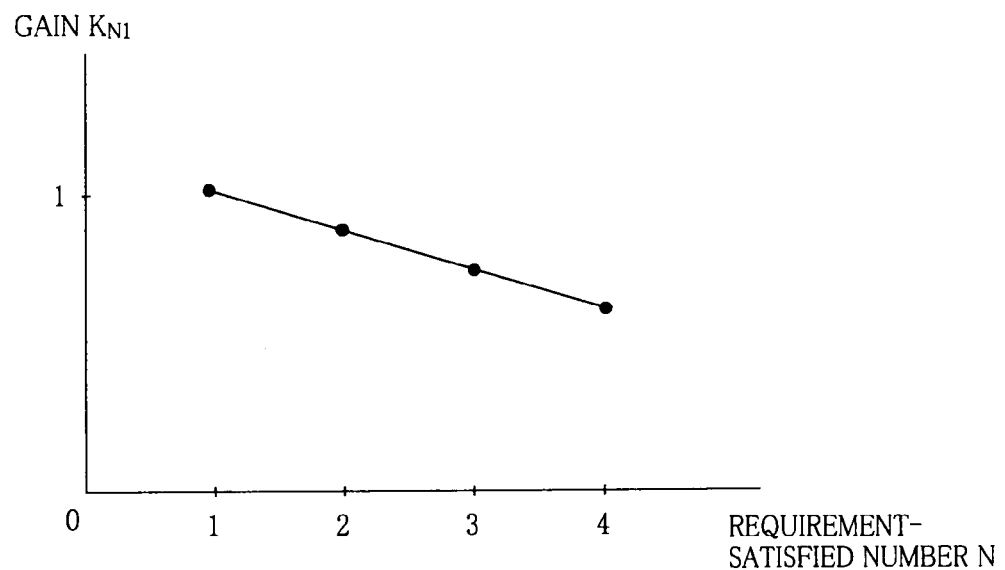
FIG. 9 is a schematic view showing a relationship between a requirement-satisfied number and a gain depending thereon.

Here, $K_{N1}$ represents a gain depending on the requirement-satisfied number N. As shown in FIG. 9A, when the requirement-satisfied number N is one, the gain is one, and the larger the requirement-satisfied number N, the lower the gain becomes. Further, the larger the requirement-satisfied number N, the smaller an upper-limit determining additional value $\alpha_2$ in the dealing control depending on the upper-limit determining additional value $\alpha$ is made. The upper-limit determining additional value $\alpha_2$ is determined according to the requirement-satisfied number N and to the following formula:

$$\alpha_2 = K_{N1} \cdot \alpha_2$$

In order to increase the target supply current $i^*_G$ in the dealing control depending on the target supply current $i^*_G$ of the pressure-reduce linear valve 172 with increase in the requirement-satisfied number N, the proportional gain $K_{G2}$ corresponding to the pressure-reduce linear valve 172 is made higher. The proportional gain $K_{G2}$ is determined according to the requirement-satisfied number N and to the following formula:

$$K_{G2}=K_{N2} \cdot K_{G2}$$

Figure 9B:
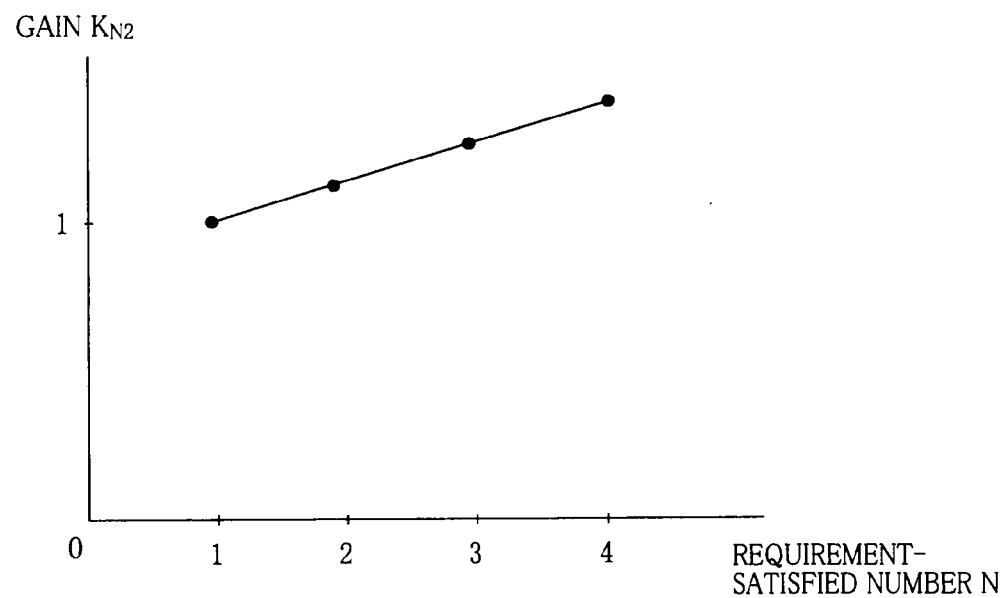

Here, $K_{N2}$ represents a gain depending on the requirement-satisfied number N. As shown in FIG. 9B, when the requirement-satisfied number N is one, the gain is one, and the larger the requirement-satisfied number N, the higher the gain becomes. Further, the target supply pressure P* in the dealing control depending on the target supply pressure P* is reduced with increase in the requirement-satisfied number N. The target supply pressure P* is determined according to the requirement-satisfied number N and to the following formula:

$$P^*=P^*-K_{N2} \gamma$$

b) Estimation of Completion of Operation of ABS Valve Device based on Change of Actual Supply Pressure The working fluid supplied to the liquid-pressure source device 144 is discharged to the reservoir 134 via the brake devices 126 with the operation of the ABS pressure-reduce valves 202, thereby lowering the actual supply pressure Pr. On the other hand, in order to increase the lowered actual supply pressure, the pressure-increase linear valve 170 is operated, thereby making the actual supply pressure Pr higher. Thus, during the operation of the ABS valve device 142, the actual supply pressure Pr unstably rises and lowers repeatedly. As a frequency of the operations of the ABS pressure-reduce valves 202 decreases, the actual supply pressure Pr becomes stable and is not fluctuated considerably. FIG. 10 shows changes of the target supply pressure P*, the actual supply pressure Pr, and the brake pressure $P_B$ with lapse of time. As shown in the figure, where the actual supply pressure Pr (a broken line) is fluctuated considerably, the brake pressure $P_B$ (a one-dot chain line) is lower than the actual supply pressure Pr in some degree, and thus it is estimated that the ABS pressure-reduce valves 202 are operated. Then, when the actual supply pressure Pr becomes stable and is not fluctuated greatly, the brake pressure $P_B$ and the actual supply pressure Pr generally coincide with each other, and thus it is estimated that the ABS pressure-reduce valves 202 are not operated mostly. Thus, in this system 100, when the actual supply pressure Pr has been stabilized, it is estimated that the operation of the ABS valve device 142 is soon to be completed.

c) Estimation of Completion of Operation of ABS Valve Device based on Change Rate of Each of Actual Supply Pressure and Target Supply Pressure When the target supply pressure P* is being made higher, the actual supply pressure Pr normally increases so as to follow the target supply pressure P. However, when the ABS valve device 142 is operated, the working fluid supplied to the liquid-pressure source device 144 is discharged to the reservoir 134 via the brake devices 126, whereby the actual supply pressure Pr is lowered in some cases even though the target supply pressure P* is increasing. That is, in the case where the actual supply pressure Pr is decreasing even though the target supply pressure P* is increasing, there is an extremely high possibility that the ABS valve device 142 is being operated. Further, in the case reverse to the case where the actual supply pressure Pr is decreasing even though the target supply pressure P* is increasing, that is, in the case where the actual supply pressure Pr is increasing even though the target supply pressure P* is not increasing, the working fluid supplied to the liquid-pressure source device 144 is not substantially discharged to the reservoir 134 via the brake devices 126, and thus there is an extremely low possibility that the ABS valve device 142 is being operated.

Figure 11:
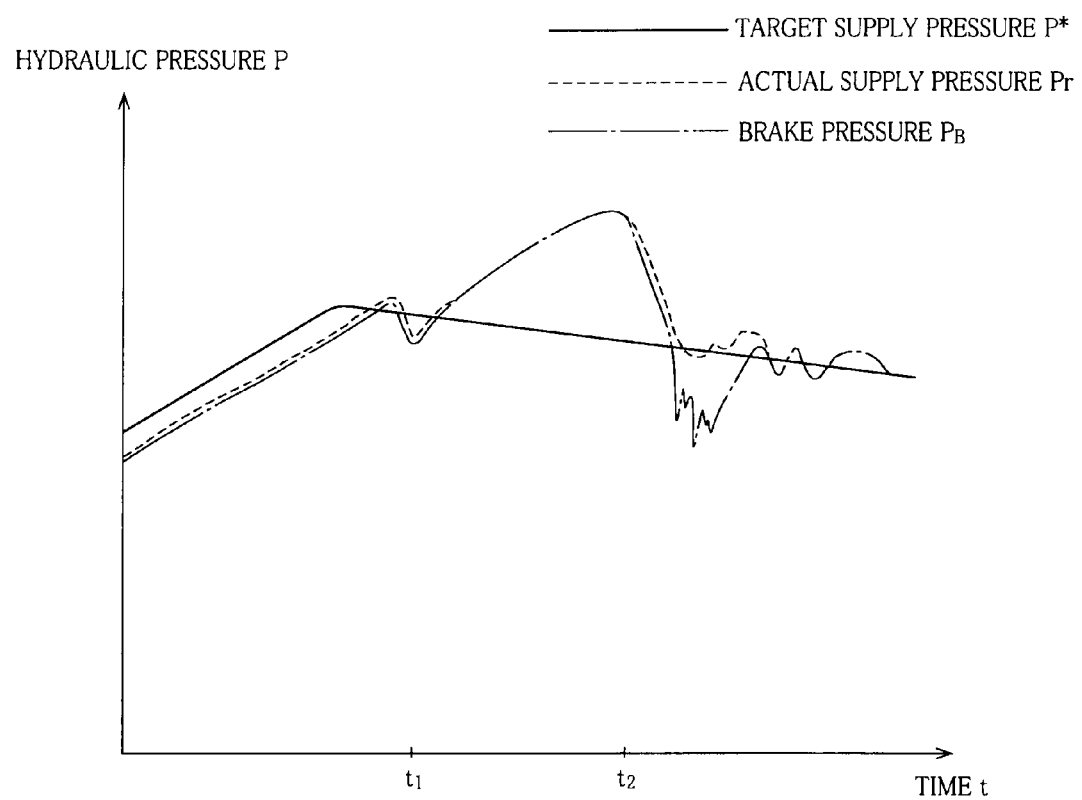
FIG. 11 is a chart generally showing changes of the target supply pressure, the actual supply pressure, and the brake pressure with lapse of time where the actual supply pressure increases even though the target supply pressure does not increase.

As shown in FIG. 11, where the actual supply pressure Pr (a broken line) is increasing even though the target supply pressure P* (a solid line) is not increasing ($t_1<t<t_2$), the actual supply pressure Pr and the brake pressure (a one-dot chain line) coincide with each other, and thus it is estimated that the ABS pressure-reduce valves 202 is not substantially operated. In this system 100, where the actual supply pressure Pr is increasing even though the target supply pressure P* is not increasing, that is, where a change rate dPr of the actual supply pressure Pr becomes a positive value even though a change rate dP* of the target supply pressure P* is not a positive value, it is estimated that the operation of the ABS valve device 142 is soon to be completed. However, where the change rate dPr of the actual supply pressure Pr is too large, specifically, where the change rate dPr of the actual supply pressure Pr has become equal to or larger than a set change rate $dPr_0$, there is a possibility that the actual supply pressure Pr is changed considerably with the operation of the ABS valve device 142, and accordingly it is not estimated that the operation of the ABS valve device 142 is soon to be completed.

d) Estimation of Completion of Operation of ABS Valve Device based on Braking Operation of Driver Where the amount of the operation of the brake pedal 110 by the driver is increasing, that is, where the target supply pressure P* is increasing or rising, the brake pressure $P_B$ also rises, resulting in a higher possibility of the lock of the wheel (s). On the other hand, where the operation of the driver on the brake pedal 110 is released, that is, where the target supply pressure P* is lowered, the brake pressure $P_B$ is also lowered, resulting in a low possibility of the lock of the wheel(s). Thus, in this system 100, where the target supply pressure P* has been lowered, it is estimated that the operation of the ABS valve device 142 is soon to be completed. However, where the target supply pressure P* is relatively high even though the target supply pressure P* has been lowered, the wheel(s) may be locked up. Thus, in this system 100, where the target supply pressure P* is lowering with a relatively large amount, it is estimated that the operation of the ABS valve device 142 is soon to be completed. Specifically, where a value ($P^*_{MAX}-P^*$) obtained by reducing the target supply pressure P* from a maximum target supply pressure $P^*_{MAX}$ that is the largest value of the target supply pressures P* in a single braking operation has become larger than a set deviation $\Delta P^*_0$, it is estimated that the operation of the ABS valve device 142 is soon to be completed.

e) Estimation of Completion of Operation of ABS Valve Device based on Target Supply Pressure When the target supply pressure P* is relatively high, the brake pressure $P_B$ is also high. Thus, there is a high possibility that the wheel(s) is locked up. However, when the target supply pressure P* is relatively low, the brake pressure $P_B$ is also low. Thus, there is a low possibility that the wheel(s) is locked up. Thus, in this system 100, where the target supply pressure P* has become equal to or lower than a set pressure $P^*_0$, it is estimated that the operation of the ABS valve device 142 is soon to be completed.

Further, the lower the target supply pressure P*, the higher the pressure reducing effect becomes in the dealing control. Specifically, the lower the target supply pressure P*, the smaller the pressure-reducing threshold-value determination additional value $P_{G2}$ in the dealing control depending on the pressure-reducing threshold-value determination additional value $P_G$ is made. The pressure-reducing threshold-value determination additional value $P_{G2}$ is determined according to the target supply pressure P* and to the following formula:

$$P_{G2}=K_{P1} \cdot P_G$$

Figure 12A:
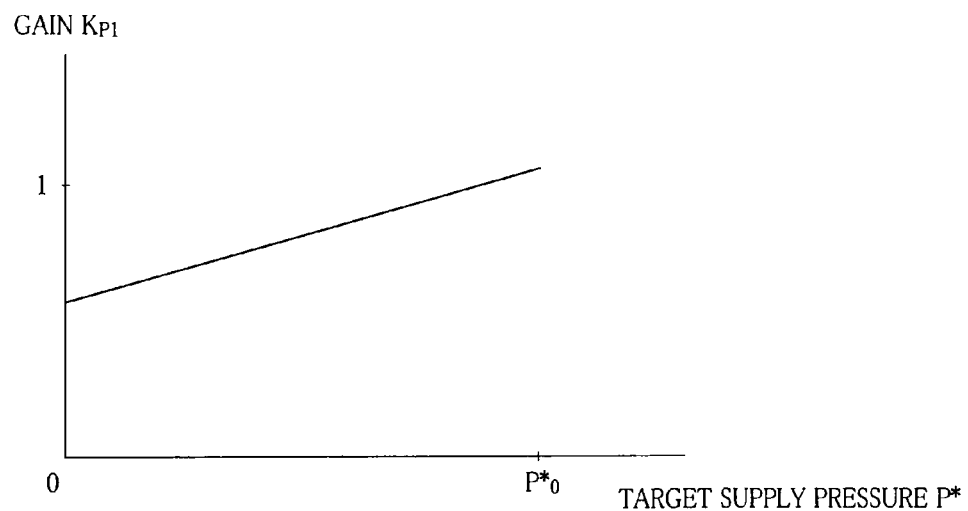
FIG. 12 is a schematic view showing a relationship between the target supply pressure and a gain depending thereon.

Here, $K_{P1}$ represents a gain depending on the target supply pressure P*. As shown in FIG. 12A, when the target supply pressure P* is the set pressure $P^*_0$, the gain is one, and the lower the target supply pressure P* than the set pressure $P^*_0$, the lower the gain becomes. Further, the lower the target supply pressure P*, the smaller the upper-limit determining additional value $\alpha_2$ in the dealing control depending on the upper-limit determining additional value $\alpha$ is made. The upper-limit determining additional value $\alpha_2$ is determined according to the target supply pressure P* and to the following formula:

$$\alpha_2=K_{P1} \cdot \alpha_2$$

Further, the lower the target supply pressure P*, the higher the proportional gain $K_{G2}$ in the dealing control depending on the target supply current $i^*_G$ of the pressure-reduce linear valve 172 is made. The proportional gain $K_{G2}$ is determined according to the target supply pressure P* and to the following formula:

$$K_{G2}=K_{P2} \cdot K_{G2}$$

Figure 12B:
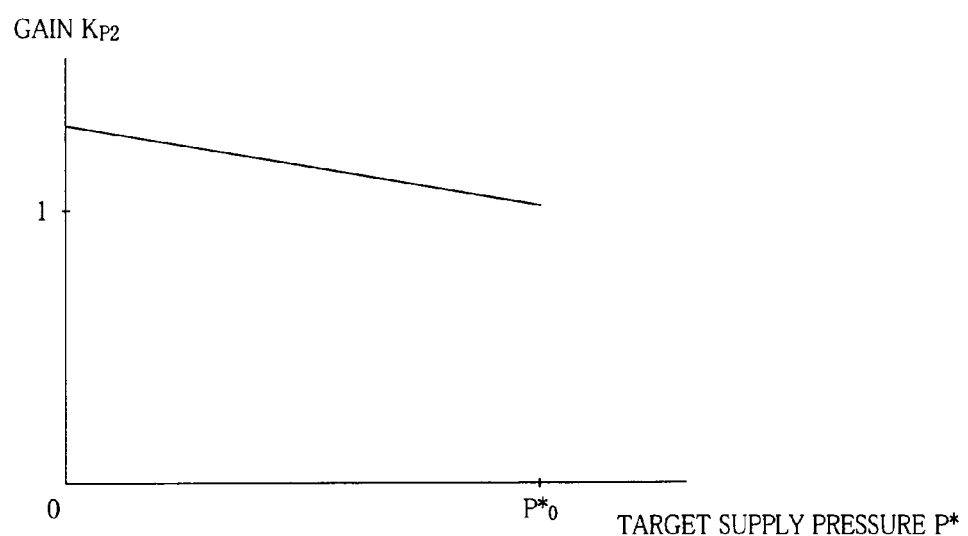

Here, $K_{P2}$ represents a gain depending on the target supply pressure P*. As shown in FIG. 12B, when the target supply pressure P* is the set pressure $P^*_0$, the gain is one, and the lower the target supply pressure P* than the set pressure $P^*_0$, the higher the gain becomes. Further, the lower the target supply pressure P*, the lower the target supply pressure P* in the dealing control depending on the target supply pressure P* becomes. The target supply pressure P* is determined according to the following formula:

$$P^*=P^*-K_{P2} \cdot \gamma$$

f) Estimation of Completion of Operation of ABS Valve Device Based on Running Velocity of Vehicle Where a running velocity V of the vehicle (hereinafter may be abbreviated as "vehicle velocity") is high, there is a high possibility that the skids of the wheel(s) occur. Further, where the vehicle velocity V is high, the brake pressure $P_B$ is high in order to control or brake the vehicle running at the high velocity, resulting in a high possibility of the lock of the wheel(s). On the other hand, where the vehicle velocity V is low, there is a low possibility that the skids and the lock of the wheel(s) occur. Thus, in this system 100, where the vehicle velocity V becomes equal to or lower than a set velocity $V_0$, it is estimated that the operation of the ABS valve device 142 is soon to be completed.

Further, the lower the vehicle velocity V, the higher the pressure reducing effect becomes in the dealing control. Specifically, the lower the vehicle velocity V, the smaller the pressure-reducing threshold-value determination additional value $P_{G2}$ in the dealing control depending on the pressure-reducing threshold-value determination additional value $P_G$ is made. The pressure-reducing threshold-value determination additional value $P_{G2}$ is determined according to the vehicle velocity V and to the following formula:

$$P_{G2}=K_{V1} \cdot P_G$$

Figure 13A:
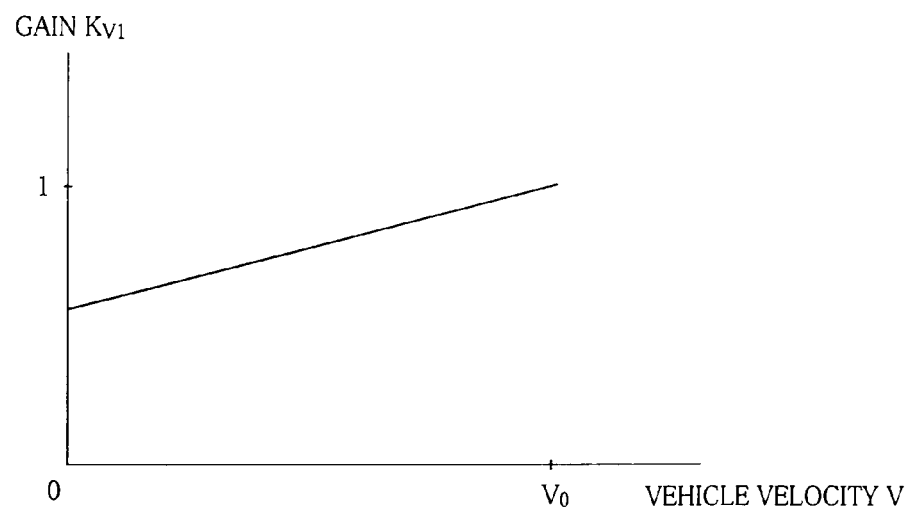
FIG. 13 is a schematic view showing a relationship between a running velocity of a vehicle and a gain depending thereon.

Here, $K_{V1}$ represents a gain depending on the vehicle velocity V. As shown in FIG. 13A, when the vehicle velocity V is the set velocity $V_0$, the gain is one, and the lower the vehicle velocity V than the set velocity $V_0$, the lower the gain becomes. Further, the lower the vehicle velocity V, the smaller the upper-limit determining additional value $\alpha_2$ in the dealing control depending on the upper-limit determining additional value $\alpha$ is made. The upper-limit determining additional value $\alpha_2$ is determined according to the vehicle velocity V and to the following formula:

$$\alpha_2=K_{V1} \cdot \alpha_2$$

Further, the lower the vehicle velocity V, the higher the proportional gain $K_{G2}$ in the dealing control depending on the target supply current $i^*_G$ of the pressure-reduce linear valve 172 is made. The proportional gain $K_{G2}$ is determined according to the vehicle velocity V and to the following formula:

$$K_{G2}=K_{V2}\cdot K_{G2}$$

Figure 13B:
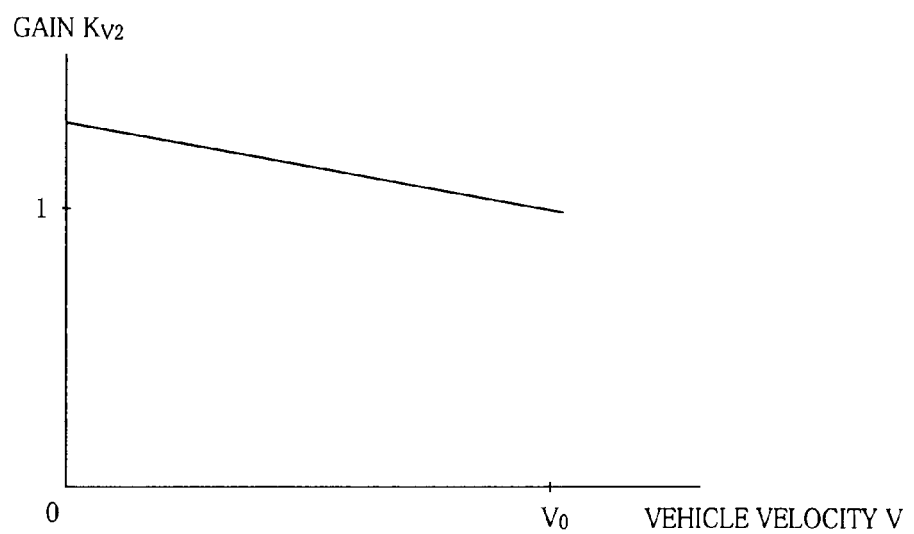

Here, $K_{V2}$ represents a gain depending on the vehicle velocity V. As shown in FIG. 13B, when the vehicle velocity V is the set velocity $V_0$, the gain is one, and the lower the vehicle velocity V than the set velocity $V_0$, the higher the gain becomes. Further, the lower the vehicle velocity V, the lower the target supply pressure P* in the dealing control depending on the target supply pressure P* is made. The target supply pressure P* is determined according to the vehicle velocity V and to the following formula:

$$P^*=P^*-K_{V2}\cdot\gamma$$

g) Estimation of Completion of Operation of ABS Valve Device based on Operation Duration Time of ABS Valve Device Each of the ABS control and the like is a control in which the brake pressure $P_B$ is momentarily lowered and then momentarily raised repeatedly, that is, lowering and raising the brake pressure $P_B$ are repeated, but each of the ABS control and the like seldom continues for a long time. Thus, in this system 100, where the ABS valve device 142 continues to be performed for some length of time, specifically, where an operation time T elapsed from the start of the operation of the ABS valve device 142 has become equal to or longer than the set time $T_0$, it is estimated that the operation of the ABS valve device 142 is soon to be completed.

<Control Program>

Figure 14:
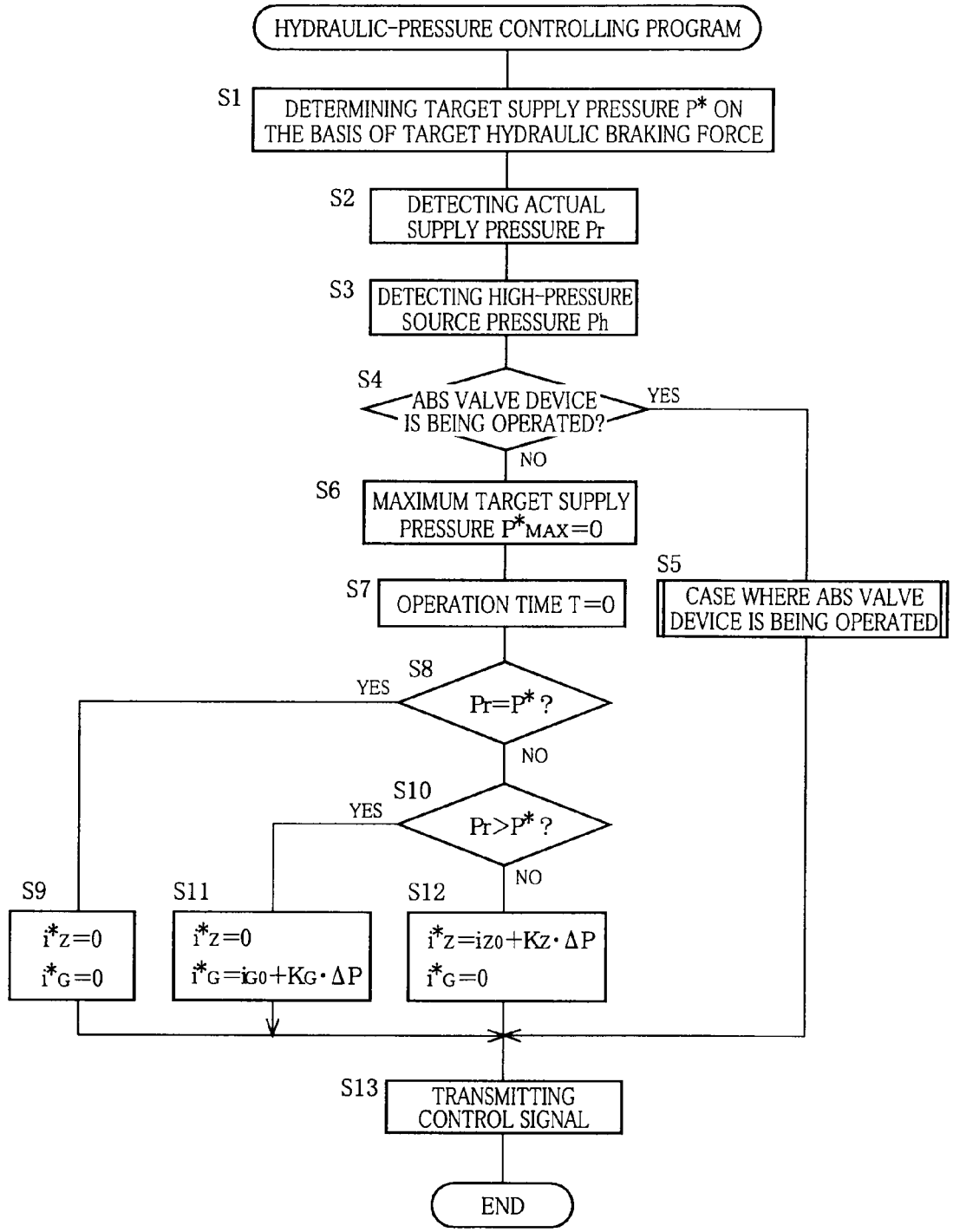
FIG. 14 is a flow-chart showing a hydraulic-pressure controlling program executed in a control of the hydraulic brake system.

In this system 100, the control of the supply pressure that is the hydraulic pressure of the working fluid produced by the liquid-pressure source device 144 is performed in the following manner. That is, a hydraulic-pressure controlling program indicated by a flow-chart in FIG. 14 is repeated by the controller 210 of the brake ECU 48 at set time intervals Δt during an ON state of an ignition switch. There will be simply explained a flow of a control processing by the hydraulic-pressure controlling program with reference to the flow-chart.

In the processing performed by the hydraulic-pressure controlling program, initially in step 1 (hereinafter simply called "S1", which applies to the other steps), the target supply pressure P* is determined on the basis of the target hydraulic braking force calculated by the above-described main ECU 40. In the controller 210 is stored map data related to the target supply pressure P* and using the target hydraulic braking force as a parameter. The target supply hydraulic-pressure P* is determined by referring to the map data. Then in S2, the actual supply pressure Pr is detected by the common-passage hydraulic sensor 192, and then in S3, the high-pressure source pressure Ph is detected by the high-pressure-source hydraulic sensor 190.

Figure 15:
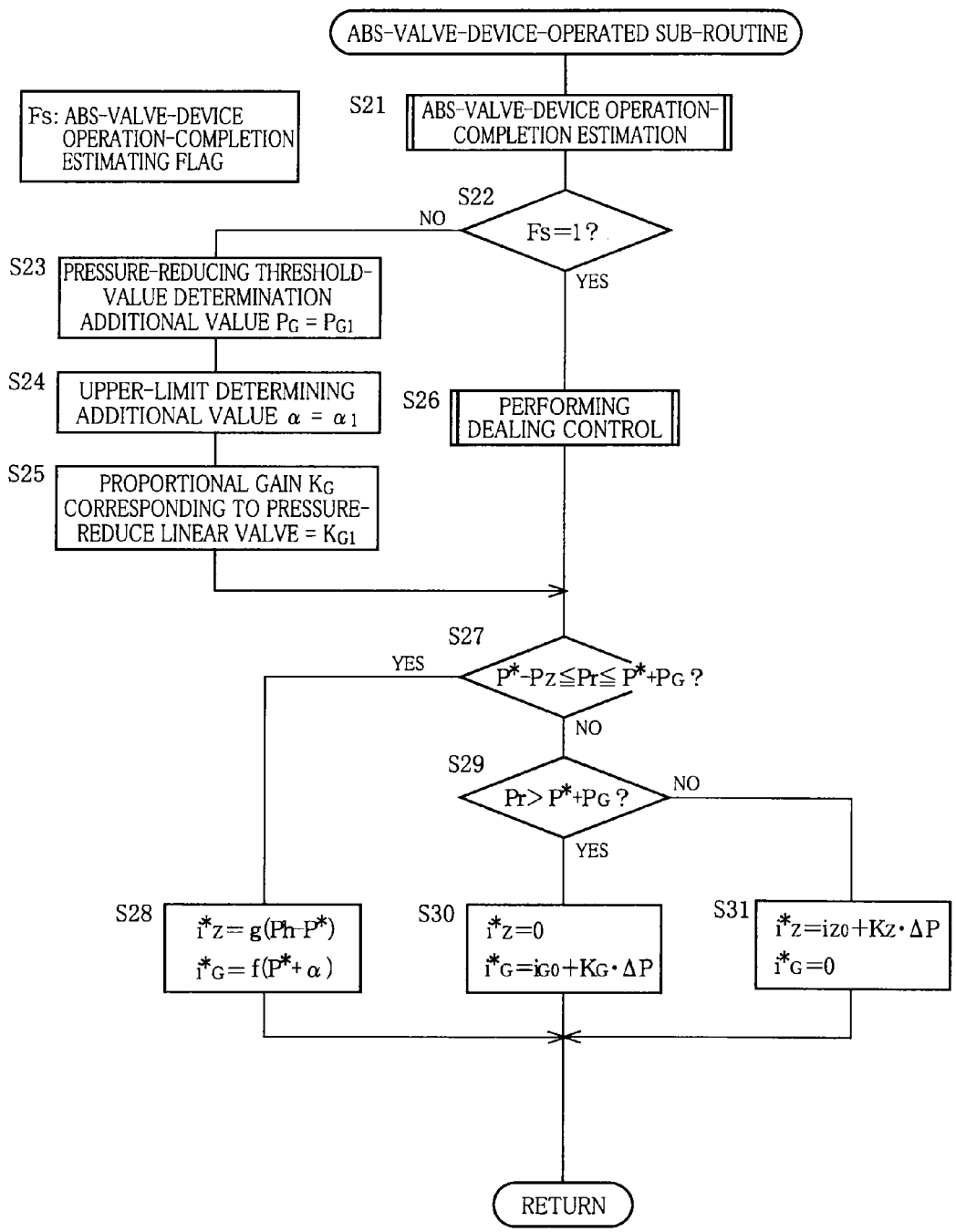
FIG. 15 is a flow-chart showing an ABS-valve-device-operated sub-routine executed in the hydraulic-pressure controlling program.
Figure 16:
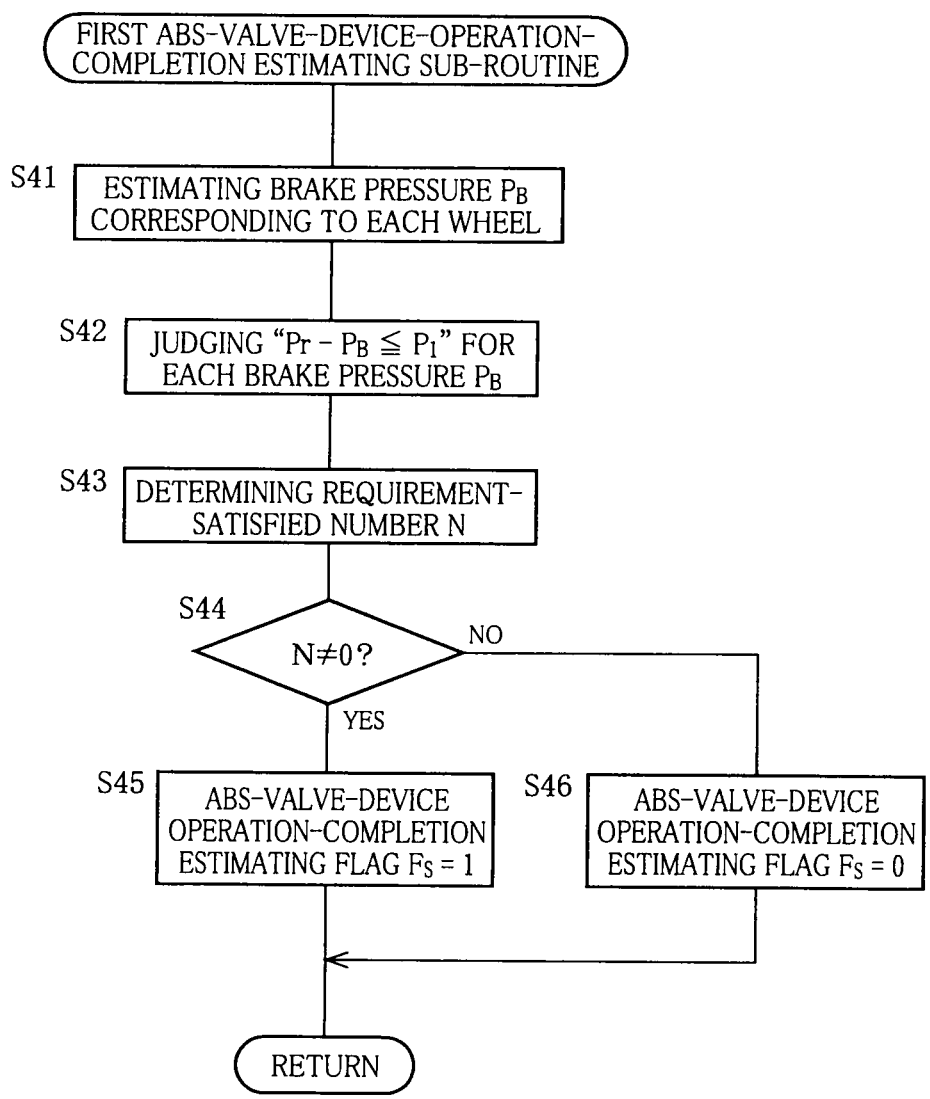
FIG. 16 is a flow-chart of a first ABS-valve-device-operation-completion estimating sub-routine executed in the hydraulic-pressure controlling program.
Figure 17:
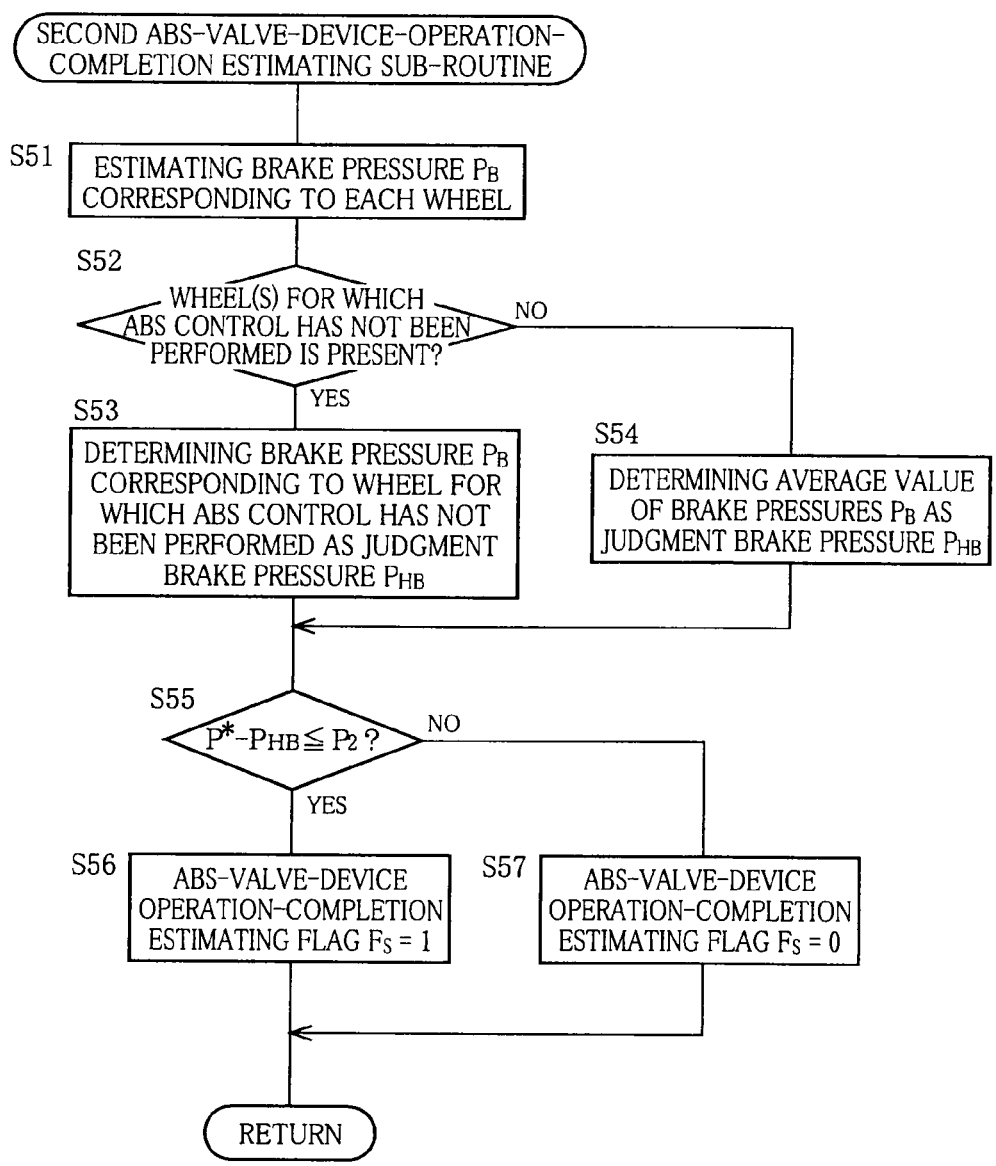
FIG. 17 is a flow-chart of a second ABS-valve-device-operation-completion estimating sub-routine executed in the hydraulic-pressure controlling program.
Figure 18:
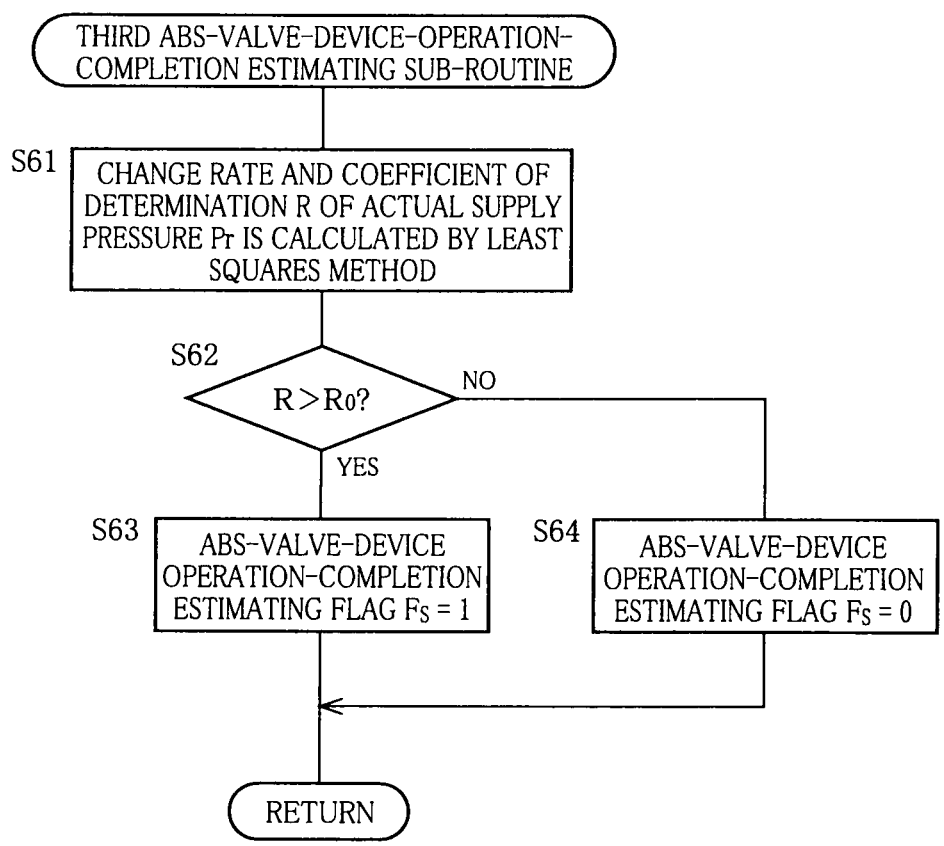
FIG. 18 is a flow-chart of a third ABS-valve-device-operation-completion estimating sub-routine executed in the hydraulic-pressure controlling program.
Figure 19:
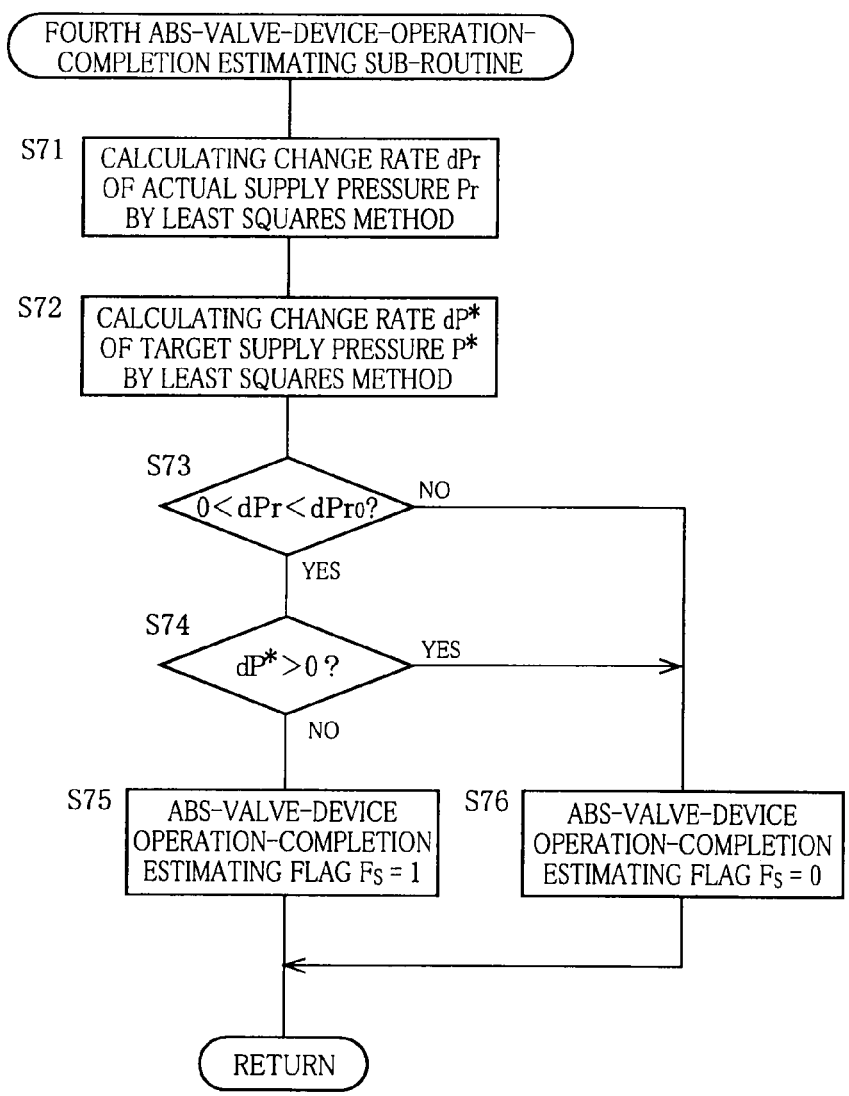
FIG. 19 is a flow-chart of a fourth ABS-valve-device-operation-completion estimating sub-routine executed in the hydraulic-pressure controlling program.
Figure 20:
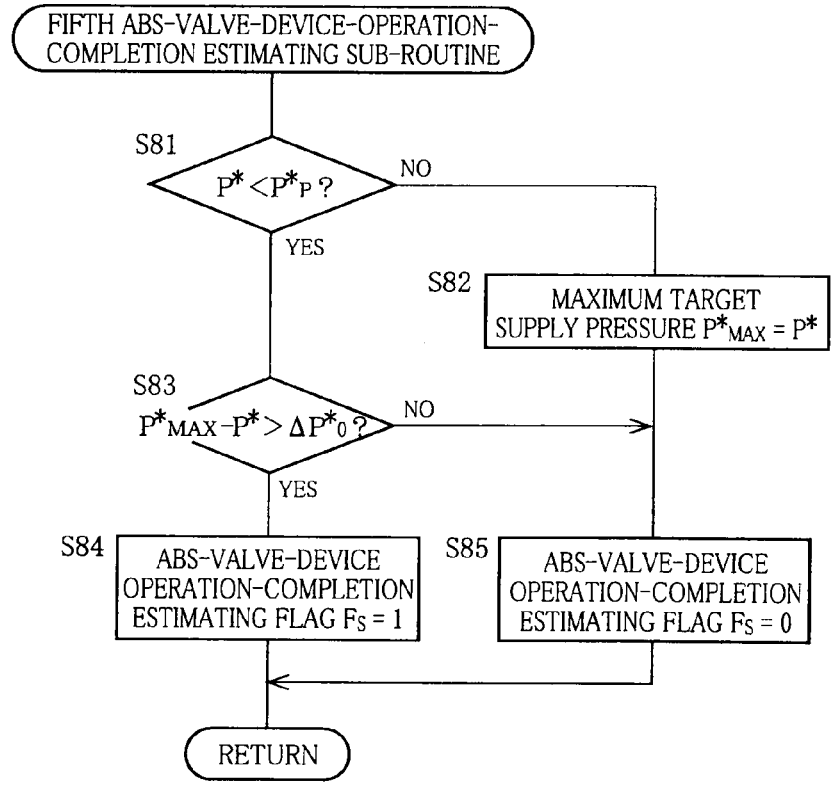
FIG. 20 is a flow-chart of a fifth ABS-valve-device-operation-completion estimating sub-routine executed in the hydraulic-pressure controlling program.
Figure 21:
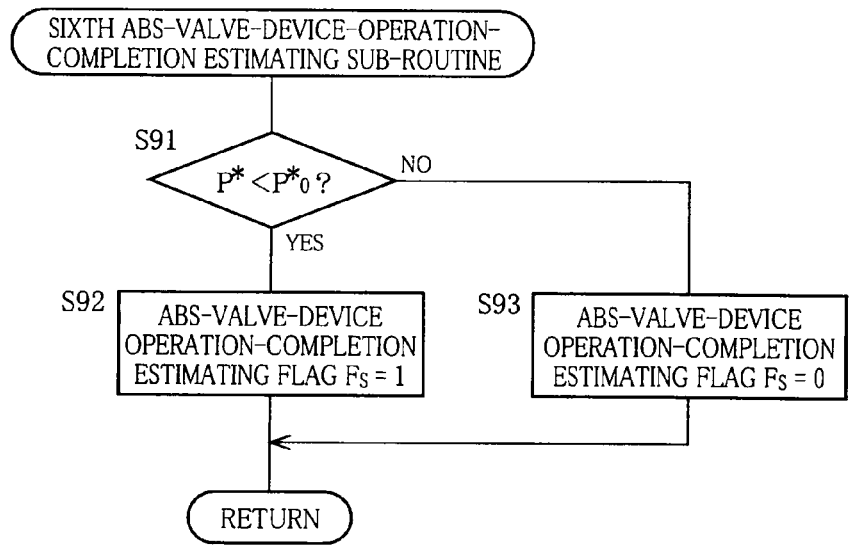
FIG. 21 is a flow-chart of a sixth ABS-valve-device-operation-completion estimating sub-routine executed in the hydraulic-pressure controlling program.
Figure 22:
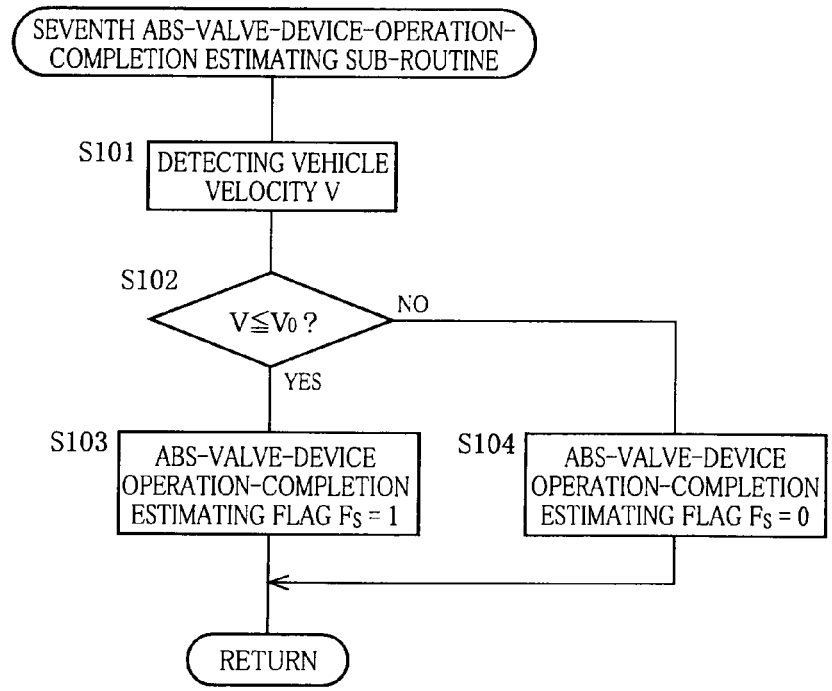
FIG. 22 is a flow-chart of a seventh ABS-valve-device-operation-completion estimating sub-routine executed in the hydraulic-pressure controlling program.
Figure 23:
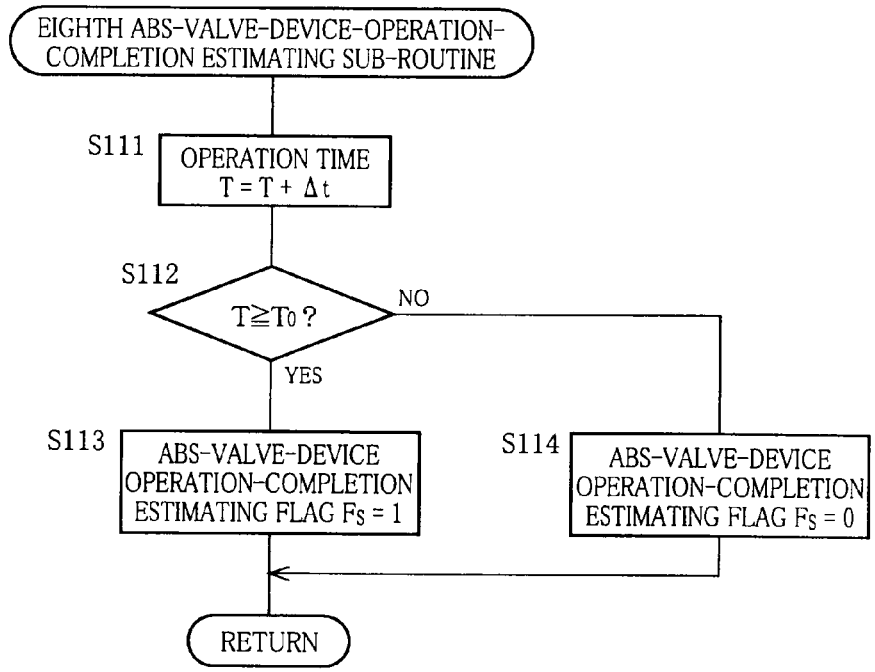
FIG. 23 is a flow-chart of an eighth ABS-valve-device-operation-completion estimating sub-routine executed in the hydraulic-pressure controlling program.
Figure 24:
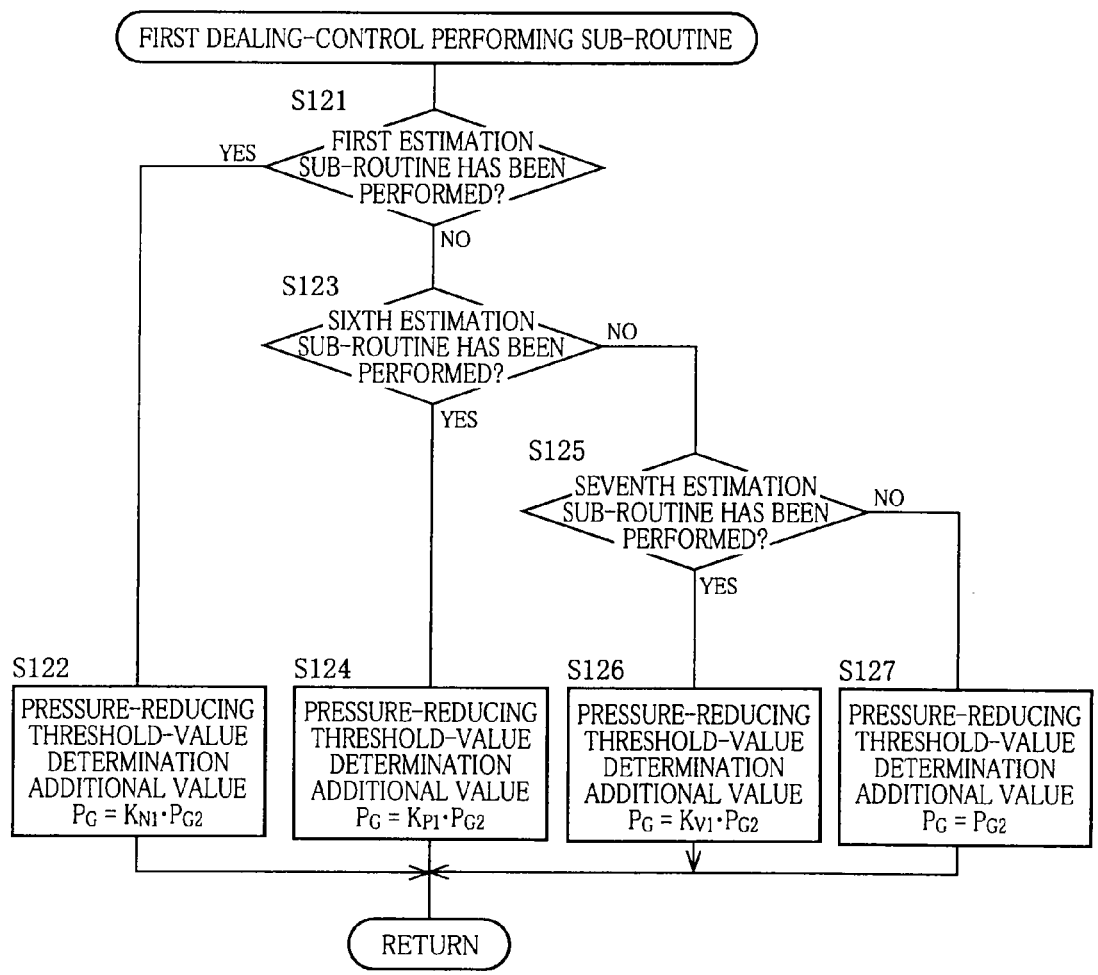
FIG. 24 is a flow-chart showing a first dealing control performing sub-routine executed in the hydraulic-pressure controlling program.
Figure 25:
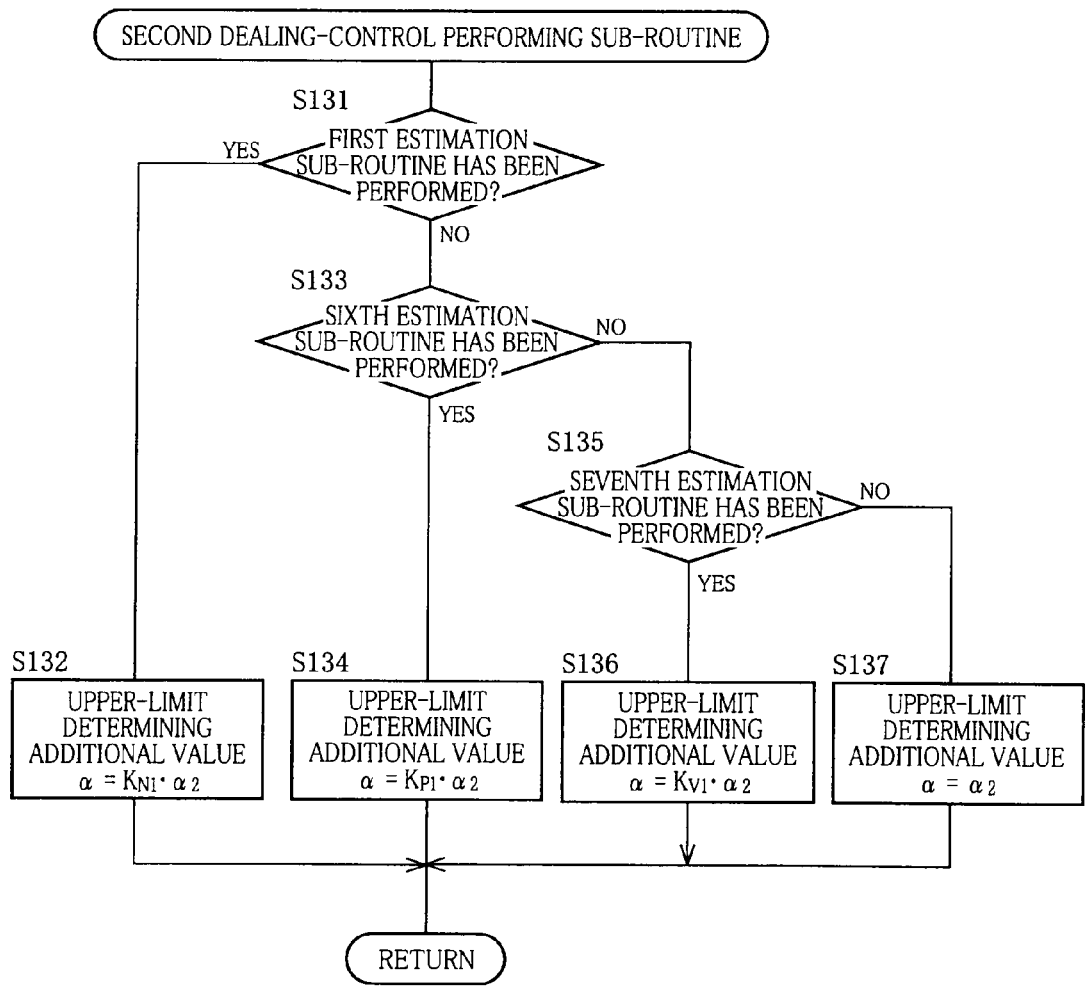
FIG. 25 is a flow-chart showing a second dealing control performing sub-routine executed in the hydraulic-pressure controlling program.
Figure 26:
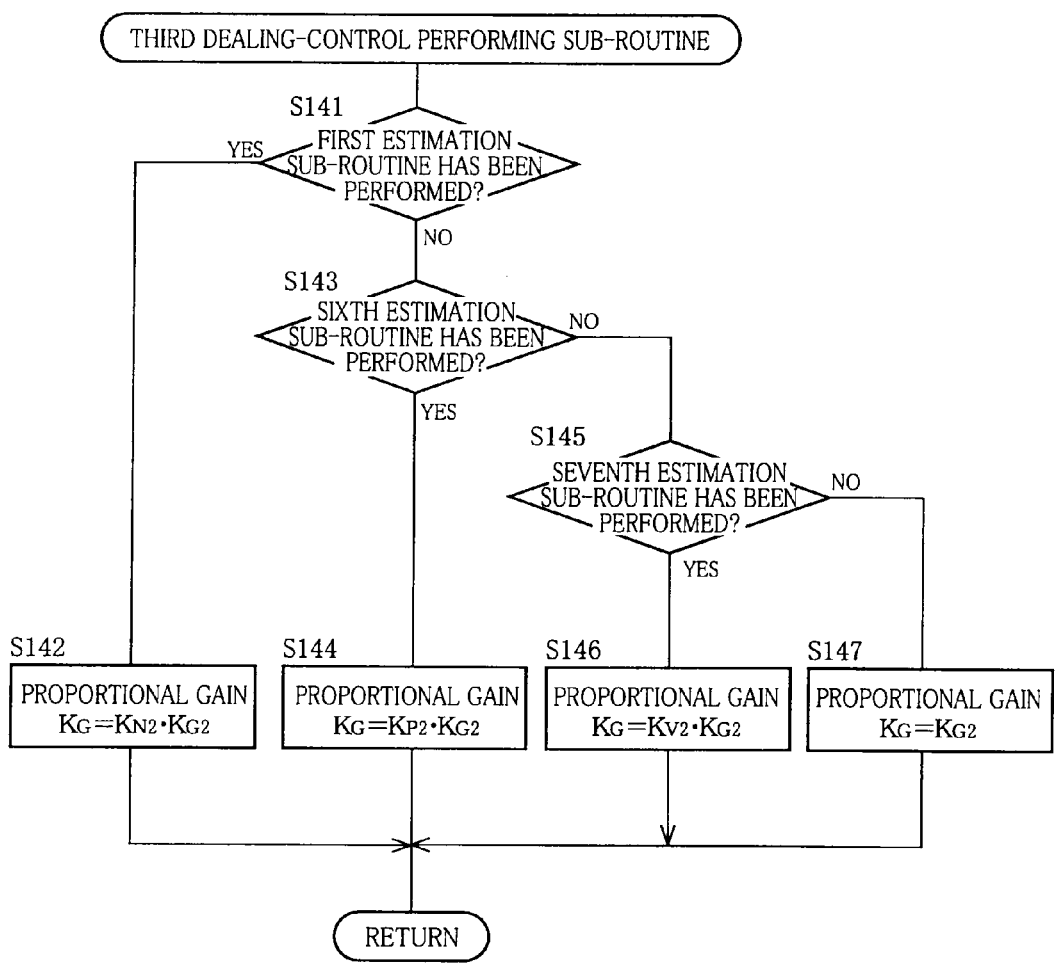
FIG. 26 is a flow-chart showing a third dealing control performing sub-routine executed in the hydraulic-pressure controlling program.
Figure 27:
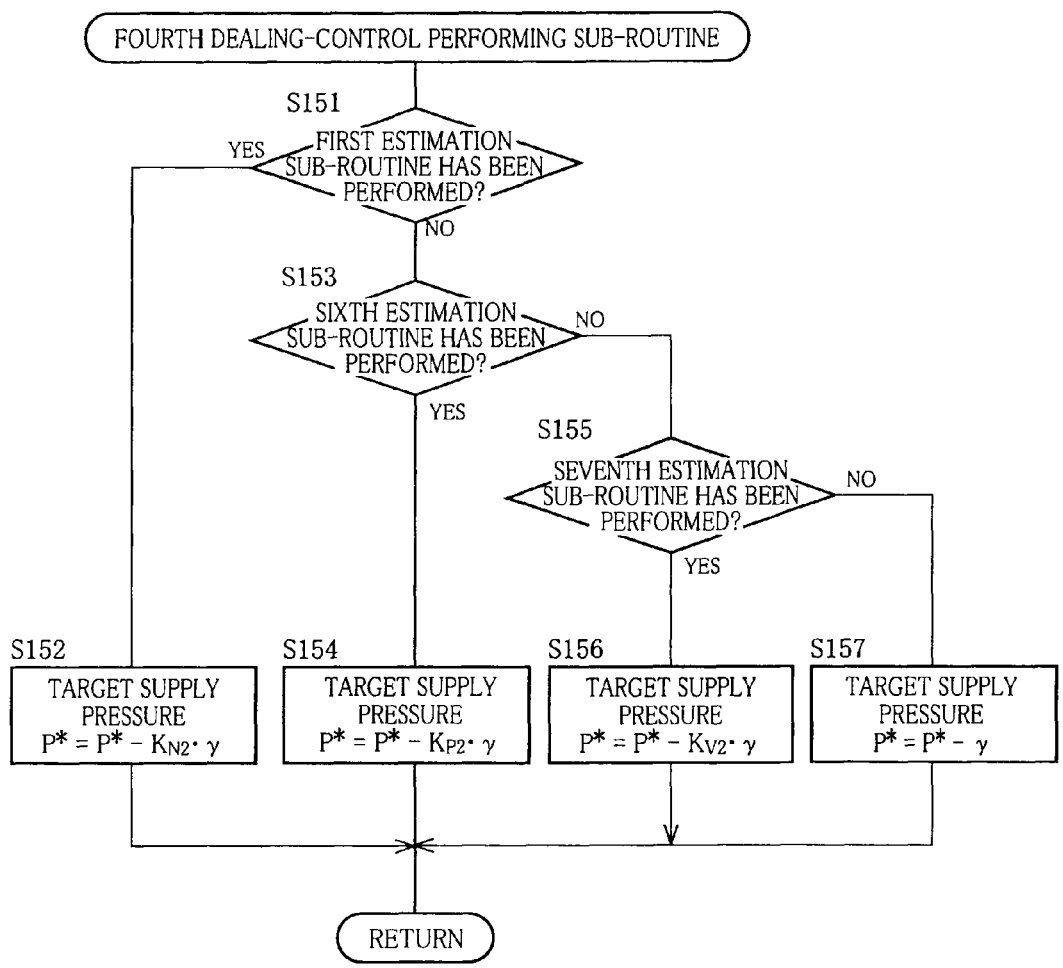
FIG. 27 is a flow-chart showing a fourth dealing control performing sub-routine executed in the hydraulic-pressure controlling program.

In S4, whether the ABS valve device 142 is being operated or not is judged. Where at least one of the four ABS holding valves 200 and the four ABS pressure-reduce valves 202 of the ABS valve device 142 is being operated, it is judged that the ABS valve device 142 is being operated. Where it has been judged that the ABS valve device 142 is being operated, a processing for performing an ABS-valve-device-operated sub-routine indicated by a flow-chart in FIG. 15 is performed in S5. In this ABS-valve-device-operated sub-routine, in S21, the processing for performing the ABS-valve-device-operation-completion estimating sub-routine is performed. This ABS-valve-device-operation-completion estimating sub-routine has eight sub-routines indicated by FIGS. 16-23, one of which is performed by the operation of the estimation-method selection switch 238 by the driver.

Where an estimation method of the completion of the operation of the ABS valve device based on the difference between the actual supply pressure Pr and the brake pressure $P_B$ has been selected by the estimation-method selection switch 238, a first ABS-valve-device-operation-completion estimating sub-routine indicated by a flow-chart in FIG. 16 is performed. In this sub-routine, initially in S41, the brake pressure $P_B$ corresponding to each wheel is estimated on the basis of the duty ratio of each ABS holding valve 200 and each ABS pressure-reduce valve 202. Then, in S42, whether a difference between each estimated brake pressure $P_B$ and the actual supply pressure Pr is equal to or smaller than the set difference $P_1$ is judged. Then in S43, the requirement-satisfied number N is determined that is the number of the brake pressures $P_B$ in each of which the difference between the estimated brake pressure $P_B$ and the actual supply pressure Pr is equal to or smaller than the set difference $P_1$. Then in S44, whether the requirement-satisfied number N is not zero or not is judged. Where it has been judged that the requirement-satisfied number N is not zero, a flag value of the ABS-valve-device operation-completion estimating flag $F_S$ is set at one in S45. The ABS-valve-device operation-completion estimating flag $F_S$ is a flag that indicates whether or not a current situation is the situation in which it is estimated that the operation of the ABS valve device 142 is completed. Where the flag value of the flag $F_S$ is one, the flag $F_S$ indicates that the current situation is the situation in which it is estimated that the operation of the ABS valve device 142 is completed. Where the flag value of the flag $F_S$ is zero, the flag $F_S$ indicates that the current situation is not the situation in which it is estimated that the operation of the ABS valve device 142 is completed. Further, where it has been judged that the requirement-satisfied number N is zero, the flag value of the ABS-valve-device operation-completion estimating flag $F_S$ is set at zero in S46. Where the flag value of the ABS-valve-device operation-completion estimating flag $F_S$ has been determined, this sub-routine is completed.

Where an estimation method of the completion of the operation of the ABS valve device based on the difference between the target supply pressure P* and the brake pressure $P_B$ has been selected by the estimation-method selection switch 238, a second ABS-valve-device-operation-completion estimating sub-routine indicated by a flow-chart in FIG. 17 is performed. In this sub-routine, in S51, the brake pressure $P_B$ corresponding to each wheel is estimated, and then in S52, whether a wheel(s) for which the ABS control and/or the like has not been performed is present or not is judged. Where it has been judged that the wheel(s) for which the ABS control and/or the like has not been performed is present, the brake pressure $P_B$ of the wheel(s) for which the ABS control and/or the like has not been performed is determined as a judgment brake pressure $P_{HB}$ used for a judgment in S53. On the other hand, where it has been judged that the wheel(s) for which the ABS control and/or the like has not been performed is not present, the average value of the four brake pressures $P_B$ is calculated in S54, and the calculated average value is determined as the judgment brake pressure $P_{HB}$. Where the judgment brake pressure $P_{HB}$ has been determined, whether a difference between the target supply pressure P* and the judgment brake pressure $P_{HB}$ is equal to or smaller than the set difference $P_2$ or not is judged in S55. Where it has been judged that the difference is equal to or smaller than the set difference $P_2$, the flag value of the ABS-valve-device operation-completion estimating flag $F_S$ is changed to one in S56. On the other hand, where it has been judged that the difference is not equal to or smaller than the set difference $P_2$, the flag value is set at zero in S57. Where the flag value of the ABS-valve-device operation-completion estimating flag $F_S$ has been determined, this sub-routine is completed.

Where an estimation method of the completion of the operation of the ABS valve device based on the change of the actual supply pressure Pr has been selected by the estimation-method selection switch 238, a third ABS-valve-device-operation-completion estimating sub-routine indicated by a flow-chart in FIG. 18 is performed. In this sub-routine, initially in S61, the change rate dPr and a coefficient of determination R of the actual supply pressure Pr is calculated on the basis of a least squares method. Then in S62, whether the calculated coefficient of determination R is larger than a set value $R_0$ or not is judged. The larger the coefficient of determination R, the stabler the actual supply pressure Pr is. Thus, where it has been judged that the coefficient of determination R is larger than the set value $R_0$, it is estimated that the actual supply pressure Pr is stable, and in S63, the flag value of the ABS-valve-device operation-completion estimating flag $F_S$ is set at one. On the other hand, where it has been judged that the coefficient of determination R is equal to or smaller than the set value $R_0$, it is estimated that the actual supply pressure Pr is not stable, and in S64, the flag value is set at zero. Where the flag value of the ABS-valve-device operation-completion estimating flag $F_S$ has been determined, this sub-routine is completed.

Where an estimation method of the completion of the operation of the ABS valve device based on the change rate of each of the actual supply pressure Pr and the target supply pressure P* has been selected by the estimation-method selection switch 238, a fourth ABS-valve-device-operation-completion estimating sub-routine indicated by a flow-chart in FIG. 19 is performed. In this sub-routine, in S71, the change rate dPr of the actual supply pressure Pr is calculated on the basis of the least squares method, and in S72, the change rate dP* of the target supply pressure P* is calculated on the basis of the least squares method. Then in S73, whether or not the change rate dPr of the actual supply pressure Pr is larger than zero and smaller than the set change rate $dPr_0$ is judged. Where it has been judged that the change rate dPr of the actual supply pressure Pr is larger than zero and smaller than the set change rate $dPr_0$, whether the change rate dP* of the target supply pressure P* is larger than zero or not is judged in S74. Where it has been judged that the change rate dP* of the target supply pressure P* is equal to or smaller than zero, the flag value of the ABS-valve-device operation-completion estimating flag $F_S$ is set at one in S75. On the other hand, where it has not been judged that the change rate dPr of the actual supply pressure Pr is larger than zero and smaller than the set change rate $dPr_0$, or where it has been judged that the change rate dP* of the target supply pressure P* is larger than zero, the flag value of the ABS-valve-device operation-completion estimating flag $F_S$ is set at zero in S76. Where the flag value of the ABS-valve-device operation-completion estimating flag $F_S$ has been determined, this sub-routine is completed.

Where an estimation method of the completion of the operation of the ABS valve device based on the braking operation of the driver has been selected by the estimation-method selection switch 238, a fifth ABS-valve-device-operation-completion estimating sub-routine indicated by a flow-chart in FIG. 20 is performed. In this sub-routine, in S81, whether the target supply pressure P* has been lowered or not is judged. Specifically, whether or not a target supply pressure P* determined in a current performance of this program is lower than a previous target supply pressure P*p determined in a previous performance of this program is judged. Where it has been judged that the target supply pressure P* is not lower than the previous target supply pressure $P^*_P$, that is, where the target supply pressure P* has not been lowered, the maximum target supply pressure $P^*_{MAX}$ that is the largest one of the target supply pressures P* in a single braking operation is determined in S82 as the target supply pressure P* determined in the current performance of the program. On the other hand, where it has been judged that the target supply pressure P* has been lowered, whether a value obtained by reducing the target supply pressure P* from the maximum target supply pressure $P^*_{MAX}$ is larger than the set deviation $\Delta P^*_0$ or not is judged in S83. Where it has been judged that the value obtained by reducing the target supply pressure P* from the maximum target supply pressure $P^*_{MAX}$ is larger than the set deviation $\Delta P^*_0$, the flag value of the ABS-valve-device operation-completion estimating flag $F_S$ is set at one in S84. Further, after the maximum target supply pressure $P^*_{MAX}$ has been determined to the target supply pressure P*, or where it has been judged that the value obtained by reducing the target supply pressure P* from the maximum target supply pressure $P^*_{MAX}$ is equal to or smaller than the set deviation $\Delta P^*_0$, the flag value of the ABS-valve-device operation-completion estimating flag $F_S$ is set at zero in S85. Where the flag value of the ABS-valve-device operation-completion estimating flag $F_S$ has been determined, this sub-routine is completed.

Where an estimation method of the completion of the operation of the ABS valve device based on the target supply pressure P* has been selected by the estimation-method selection switch 238, a sixth ABS-valve-device-operation-completion estimating sub-routine indicated by a flow-chart in FIG. 21 is performed. In this sub-routine, in S91, whether the target supply pressure V is equal to or lower than the set pressure $P^*_0$ or not is judged. Where it has been judged that the target supply pressure V is equal to or lower than the set pressure $P^*_0$, the flag value of the ABS-valve-device operation-completion estimating flag $F_S$ is set at one in S92. On the other hand, where it has been judged that the target supply pressure P* is not equal to or lower than the set pressure $P^*_0$, the flag value is set at zero in S93. Where the flag value of the ABS-valve-device operation-completion estimating flag $F_S$ has been determined, this sub-routine is completed.

Where the estimation method of the completion of the operation of the ABS valve device based on the vehicle velocity V has been selected by the estimation-method selection switch 238, a seventh ABS-valve-device-operation-completion estimating sub-routine indicated by a flow-chart in FIG. 22 is performed. In this sub-routine, initially, in S101, the vehicle velocity V is detected by the wheel speed sensors 234, and then in S102, whether the detected vehicle velocity V is equal to or lower than the set velocity $V_0$ or not is judged. Where it has been judged that the vehicle velocity V is equal to or lower than the set velocity $V_0$, the flag value of the ABS-valve-device operation-completion estimating flag $F_S$ is set at one in S103. On the other hand, where it has been judged that the vehicle velocity V is not equal to or lower than the set velocity $V_0$, the flag value is set at zero in S104. Where the flag value of the ABS-valve-device operation-completion estimating flag $F_S$ has been determined, this sub-routine is completed.

Where the estimation method of the completion of the operation of the ABS valve device based on the operation duration time of the ABS valve device has been selected by the estimation-method selection switch 238, an eighth ABS-valve-device-operation-completion estimating sub-routine indicated by a flow-chart in FIG. 23 is performed. In this sub-routine, in S111, in order to measure the operation time T elapsed from the start of the operation of the ABS valve device 142, the time interval $\Delta t$ are added to the operation time T. Then in S112, whether the operation time T is equal to or longer than the set time $T_0$ or not is judged. Where it has been judged that the operation time T is equal to or longer than the set time $T_0$, the flag value of the ABS-valve-device operation-completion estimating flag $F_S$ is set at one in S113. On the other hand, where it has been judged that the operation time T is not equal to or longer than the set time $T_0$, the flag value is set at zero in S114. Where the flag value of the ABS-valve-device operation-completion estimating flag $F_S$ has been determined, this sub-routine is completed.

Where one of the above-described eight ABS-valve-device-operation-completion estimating sub-routines has been completed, whether the flag value of the ABS-valve-device operation-completion estimating flag $F_S$ is one or not is judged in S22 of the ABS-valve-device-operated sub-routine. Where it has been judged that the flag value is not one, the pressure-reducing threshold-value determination additional value $P_G$ is determined at $P_{G1}$ in S23, and then in S24, the upper-limit determining additional value α is determined at $α_1$. Then in S25, the proportional gain $K_G$ corresponding to the pressure-reduce linear valve 172 is determined at $K_{G1}$. Where it has been judged that the flag value is one, a processing for performing a dealing-control performing sub-routine is performed in S26. This dealing-control performing sub-routine has four sub-routines indicated by FIGS. 24-27, and one of the four sub-routines is performed by the operation of the dealing-method selection switch 236 by the driver.

Where the dealing control depending on the pressure-reducing threshold-value determination additional value $P_G$ has been selected by the dealing-method selection switch 236, a first dealing-control performing sub-routine indicated by a flow-chart in FIG. 24 is performed. In this sub-routine, in S121, whether the estimation method of the completion of the operation of the ABS valve device based on the difference between the actual supply pressure Pr and the brake pressure $P_B$ has been selected by the estimation-method selection switch 238 or not is judged. That is, whether the first ABS-valve-device-operation-completion estimating sub-routine (hereinafter may be abbreviated as "first estimation sub-routine") has been performed or not is judged. Where it has been judged that the first estimation sub-routine has been performed, the pressure-reducing threshold-value determination additional value $P_G$ is determined in S122 as described above on the basis of the requirement-satisfied number N by referring to the map data set as shown in FIG. 9A. Where it has been judged that the first estimation sub-routine has not been performed, whether the estimation method of the completion of the operation of the ABS valve device based on the target supply pressure P* has been selected by the estimation-method selection switch 238 or not is judged in S123. That is, whether the sixth ABS-valve-device-operation-completion estimating sub-routine (hereinafter may be abbreviated as "sixth estimation sub-routine") has been performed or not is judged. Where it has been judged that the sixth estimation sub-routine has been performed, the pressure-reducing threshold-value determination additional value $P_G$ is determined in S124 as described above on the basis of the target supply pressure P* by referring to the map data set as shown in FIG. 12A. On the other hand, where it has been judged that the sixth estimation sub-routine has not been performed, whether the estimation method of the completion of the operation of the ABS valve device based on the vehicle velocity V has been selected by the estimation-method selection switch 238 or not is judged in S125. That is, whether a seventh ABS-valve-device-operation-completion estimating sub-routine (hereinafter may be abbreviated as "seventh estimation sub-routine") has been performed or not is judged. Where it has been judged that the seventh estimation sub-routine has been performed, the pressure-reducing threshold-value determination additional value $P_G$ is determined in S126 as described above on the basis of the vehicle velocity V by referring to the map data set as shown in FIG. 13A. On the other hand, where it has been judged that the seventh estimation sub-routine has not been performed, the pressure-reducing threshold-value determination additional value $P_G$ is determined at $P_{G2}$ in S127. Where the pressure-reducing threshold-value determination additional value $P_G$ has been determined at any value, this sub-routine is completed.

Where the dealing control depending on the upper-limit determining additional value α has been selected by the dealing-method selection switch 236, a second dealing-control performing sub-routine indicated by a flow-chart in FIG. 25 is performed. In this sub-routine, in S131, whether the first estimation sub-routine has been performed or not is judged. Where it has been judged that the first estimation sub-routine has been performed, the upper-limit determining additional value α is determined in S132 as described above on the basis of the requirement-satisfied number N by referring to the map data set as shown in FIG. 9A. On the other hand, where it has been judged that the first estimation sub-routine has not been performed, whether the sixth estimation sub-routine has been performed or not is judged in S133. Where it has been judged that the sixth estimation sub-routine has been performed, the upper-limit determining additional value α is determined in S134 as described above on the basis of the target supply pressure P* by referring to the map data set as shown in FIG. 12A. On the other hand, where it has been judged that the sixth estimation sub-routine has not been performed, whether the seventh estimation sub-routine has been performed or not is judged in S135. Where it has been judged that the seventh estimation sub-routine has been performed, the upper-limit determining additional value α is determined in S136 as described above on the basis of the vehicle velocity V by referring to the map data set as shown in FIG. 13A. On the other hand, where it has been judged that the seventh estimation sub-routine has not been performed, the upper-limit determining additional value α is determined at $α_2$ in S137. Where the upper-limit determining additional value α has been determined at any value, this sub-routine is completed.

Where the dealing control depending on the target supply current $i^*_G$ has been selected by the dealing-method selection switch 236, a third dealing-control performing sub-routine indicated by a flow-chart in FIG. 26 is performed. In this sub-routine, in S141, whether the first estimation sub-routine has been performed or not is judged. Where it has been judged that the first estimation sub-routine has been performed, the proportional gain $K_G$ corresponding to the pressure-reduce linear valve 172 is determined in S142 as described above on the basis of the requirement-satisfied number N by referring to the map data set as shown in FIG. 9B. Where it has been judged that the first estimation sub-routine has not been performed, whether the sixth estimation sub-routine has been performed or not is judged in S143. Where it has been judged that the sixth estimation sub-routine has been performed, the proportional gain $K_G$ is determined in S144 as described above on the basis of the target supply pressure P* by referring to the map data set as shown in FIG. 12B. On the other hand, where it has been judged that the sixth estimation sub-routine has not been performed, whether the seventh estimation sub-routine has been performed or not is judged in S145. Where it has been judged that the seventh estimation sub-routine has been performed, the proportional gain $K_G$ is determined in S146 as described above on the basis of the vehicle velocity V by referring to the map data set as shown in FIG. 13B. Where it has been judged that the seventh estimation sub-routine has not been performed, the proportional gain $K_G$ is determined at $K_{G2}$ in S147. Where the proportional gain $K_G$ has been determined at any value, this sub-routine is completed.

Where the dealing control depending on the target supply pressure P* has been selected by the dealing-method selection switch 236, a fourth dealing-control performing sub-routine indicated by a flow-chart in FIG. 27 is performed. In this sub-routine, in 5151, whether the first estimation sub-routine has been performed or not is judged. Where it has been judged that the first estimation sub-routine has been performed, the target supply pressure P* is determined in S152 as described above on the basis of the requirement-satisfied number N by referring to the map data set as shown in FIG. 9B. On the other hand, where it has been judged that the first estimation sub-routine has not been performed, whether the sixth estimation sub-routine has been performed or not is judged in S153. Where it has been judged that the sixth estimation sub-routine has been performed, the target supply pressure P* is determined in S154 as described above on the basis of the target supply pressure P* by referring to the map data set as shown in FIG. 12B. On the other hand, where it has been judged that the sixth estimation sub-routine has not been performed, whether the seventh estimation sub-routine has been performed or not is judged in S155. Where it has been judged that the seventh estimation sub-routine has been performed, the target supply pressure P* is determined in S156 as described above on the basis of the vehicle velocity V by referring to the map data set as shown in FIG. 13B. On the other hand, where it has been judged that the seventh estimation sub-routine has not been performed, a value obtained by reducing the set reduction value γ from the target supply pressure P* is determined as the target supply pressure P* in S157. Where the target supply pressure P* has been determined at any value, this sub-routine is completed.

After one of the above-described four dealing-control performing sub-routines has been completed, or after the processing of S26 of the ABS-valve-device-operated sub-routine has been completed, whether the actual supply pressure Pr is equal to or higher than a pressure obtained by reducing the pressurizing threshold-value determination reduction value $P_z$ from the target supply pressure P* and is equal to or lower than a pressure obtained by adding the pressure-reducing threshold-value determination additional value $P_G$ to the target supply pressure P* or not is judged in S27. That is, whether the actual supply pressure Pr is equal to or larger than the pressurizing threshold value and equal to or smaller than the pressure-reducing threshold value or not is judged. Where it has been judged that the actual supply pressure Pr is equal to or larger than the pressurizing threshold value and equal to or smaller than the pressure-reducing threshold value, the target supply current $i^*_G$ of the pressure-reduce linear valve 172 is determined by referring to the map data set as shown in FIG. 4, and the target supply current $i^*_G$ of the pressure-increase linear valve 170 is determined by referring to the map data set as shown in FIG. 5 in S28 in order to perform the target range control.

On the other hand, where it has not been judged that the actual supply pressure Pr is equal to or larger than the pressurizing threshold value and equal to or smaller than the pressure-reducing threshold value, whether the actual supply pressure Pr is larger than the pressure-reducing threshold value (P*+$P_G$) or not is judged in S29. Where it has been judged that the actual supply pressure Pr is larger than the pressure-reducing threshold value, the target supply current $i^*_Z$ of the pressure-increase linear valve 170 is determined at zero, and the target supply current $i^*_G$ of the pressure-reduce linear valve 172 is determined according to the above-described formula using the feedback control in S30 in order to lower the supply pressure in the target-supply-pressure control. On the other hand, where it has been judged that the actual supply pressure Pr is equal to or smaller than the pressure-reducing threshold value, the target supply current $i^*_G$ of the pressure-reduce linear valve 172 is determined at zero, and the target supply current $i^*_Z$ of the pressure-increase linear valve 170 is determined according to the above-described formula using the feedback control in S31 in order to increase the supply pressure in the target-supply-pressure control. Where the target supply current $i^*_G$ of the pressure-reduce linear valve 172 and the target supply current $i^*_Z$ of the pressure-increase linear valve 170 have been determined, the ABS-valve-device-operated sub-routine is completed.

Where it has been judged that the ABS valve device 142 is not being operated in S4 of the main routine, the maximum target supply pressure $P^*_{MAX}$ is zeroed in S6, and in S7 the operation time T is also zeroed. Then in S8, whether the actual supply pressure Pr and the target supply pressure P* generally coincide with each other or not is judged. Where it has been judged that the actual supply pressure Pr and the target supply pressure P* generally coincide with each other, each of the target supply current $i^*_G$ of the pressure-reduce linear valve 172 and the target supply current $i^*_Z$ of the pressure-increase linear valve 170 is determined at zero in S9. On the other hand, where it has been judged that the actual supply pressure Pr and the target supply pressure P* generally coincide with each other, whether the actual supply pressure Pr is higher than the target supply pressure P* or not is judged in S10. Where it has been judged that the actual supply pressure Pr is higher than the target supply pressure P*, the target supply current $i^*_Z$ of the pressure-increase linear valve 170 is determined at zero, and the target supply current $i^*_G$ of the pressure-reduce linear valve 172 is determined according to the above-described formula using the feedback control in S11. On the other hand, where the actual supply pressure Pr is lower than the target supply pressure P*, the target supply current $i^*_G$ of the pressure-reduce linear valve 172 is determined at zero, and the target supply current $i^*_Z$ of the pressure-increase linear valve 170 is determined according to the above-described formula using the feedback control in S12. Then in S13, a control signal based on the determined target supply current $i^*_G$ of the pressure-reduce linear valve 172 is transmitted to the drive circuit 222, and then a control signal based on the target supply current $i^*_Z$ of the pressure-increase linear valve 170 is transmitted to the drive circuit 220, and a single performance or execution of this program is completed.

<Functional Configuration of Controller>

The controller 210 of the brake ECU 48 for performing the hydraulic-pressure controlling program can be considered to have a functional configuration as shown in FIG. 28, in view of the processings carried out by the execution of the controlling program. As is understood from the figure, the controller 210 includes: a target-supply-pressure determining section 250 as a functional section configured to perform the processing according to S1, namely, as a functional section configured to determine the target supply pressure P* that is the hydraulic pressure of the working fluid to be supplied by the liquid-pressure source device 144; a supply-pressure-control executing section 252 as a functional section configured to perform the processings according to S9, S11-S13, S28, S30, and S31, namely, as a functional section configured to selectively perform the target-supply-pressure control and the target range control; a control selecting section 254 as a functional section configured to perform the processings according to S4, S27, and S29, namely, as a functional section configured to select one of the target-supply-pressure control and the target range control to be performed; and an ABS-valve-device-operation-completion dealing section 256 as a functional section configured to perform the processings according to S21 and S26, namely, as a functional section configured to deal with a situation in the situation in which it is estimated that the operation of the ABS valve device 142 is completed. Further, the ABS-valve-device-operation-completion dealing section 256 includes an ABS-valve-device-operation-completion estimating section 258 as a functional section configured to perform the processing according to S21, namely, as a functional section configured to estimate the completion of the operation of the ABS valve device. The ABS-valve-device-operation-completion estimating section 258 includes a brake-pressure estimating section 260 as a functional section configured to perform the processings according to S41 and S51, namely, as a functional section configured to estimate the brake pressure $P_B$.

<Other Variations of Dealing Control and Estimation Method of Completion of Operation of ABS Valve Device>

In the above-described hydraulic brake system 100, the dealing control depending on the pressure-reducing threshold-value determination additional value $P_G$, the dealing control depending on the upper-limit determining additional value α, the dealing control depending on the target supply current $i^*_G$ of the pressure-reduce linear valve 172, and the dealing control depending on the target supply pressure P* can be selectively performed alone, but two or more dealing controls of the four dealing controls can be performed simultaneously. That is, for example, where it has been estimated that the operation of the ABS valve device 142 is completed, both of the pressure-reducing threshold-value determination additional value $P_G$ and the upper-limit determining additional value α can be made smaller. Specifically, the above-described second dealing-control performing sub-routine may be performed after the above-described first dealing-control performing sub-routine has been performed, whereby the pressure-reducing threshold-value determination additional value $P_G$ and the upper-limit determining additional value α can be made smaller. Further, a system in which a portion of the four dealing controls can be performed may be employed. That is, for example, a system in which only the dealing control depending on the target supply current $i^*_G$ of the pressure-reduce linear valve 172 can be performed may be employed, and a system in which only the dealing control depending on the pressure-reducing threshold-value determination additional value $P_G$ and the dealing control depending on the target supply pressure P* can be performed may be employed.

Further, in the above-described hydraulic brake system 100, as shown in FIGS. 16-23, the eight estimation methods are employed as the methods for estimating the completion of the operation of the ABS valve device 142, the eight estimation methods can be selectively performed alone. That is, where conditions of one of the first eighth ABS-valve-device-operation-completion estimating sub-routines have been satisfied, it is estimated that the operation of the ABS valve device 142 is completed. The completion of the operation of the ABS valve device 142 may be estimated in this manner, but it may be estimated that the operation of the ABS valve device 142 is completed where conditions of two or more of the first-eighth ABS-valve-device-operation-completion estimating sub-routines have been satisfied. Specifically, for example, it may be estimated that the operation of the ABS valve device 142 is completed where the condition in S91 has been satisfied in the execution of the sixth ABS-valve-device-operation-completion estimating sub-routine, and the condition in S102 has been satisfied in the execution of the seventh ABS-valve-device-operation-completion estimating sub-routine. Further, a system in which a portion of the eight estimation methods can be performed may be employed. That is, for example, a system in which only the estimation method based on the vehicle velocity can be performed may be employed, and a system in which only the estimation method based on the operation duration time of the ABS valve device and the estimation method based on the target supply pressure can be performed may be employed.

The invention claimed is:

1. A hydraulic brake system for a vehicle, comprising:
a braking operation member operable by a driver;
a brake device provided on a wheel and configured to generate a braking force according to a pressure supplied to the brake device;
a liquid-pressure source device including:
an electromagnetic pressure-increase linear valve configured to increase a pressure of working fluid in accordance with electric power supplied to the pressure-increase linear valve, and
an electromagnetic pressure-reduce linear valve configured to reduce the pressure of the working fluid in accordance with electric power supplied to the pressure-reduce linear valve, the liquid-pressure source device being configured to supply the working fluid, the pressure of which has been regulated by the pressure-increase linear valve and the pressure-reduce linear valve;
an ABS valve device disposed between the liquid-pressure source device and the brake device; and
a controller configured to control the electric power supplied to the pressure-increase linear valve to control an operation of the pressure-increase linear valve and configured to control the electric power supplied to the pressure-reduce linear valve to control an operation of the pressure-reduce linear valve,
wherein the controller includes:
a target-supply-pressure determining section configured to based on an operation of the braking operation member, determine a target supply pressure as a target of a supply pressure that is a hydraulic pressure of the working fluid supplied by the liquid-pressure source device;
a supply-pressure-control executing section configured to selectively perform
(a) a first control for making the supply pressure equal to the target supply pressure determined by the target-supply-pressure determining section, by supplying electric power according to a difference between the supply pressure and the target supply pressure to the pressure-reduce linear valve where the supply pressure is higher than the target supply pressure and by supplying electric power according to the difference between the supply pressure and the target supply pressure to the pressure-increase linear valve, where the supply pressure is lower than the target supply pressure, and
(b) a second control for making the supply pressure fall within a target range having an upper limit value that is determined to be a value obtained by adding an upper-limit determining additional value to the target supply pressure and having a lower limit that is determined to be a value obtained by reducing a lower-limit determining reduction value from the target supply pressure, by continuing to supply electric power for opening the pressure-reduce linear valve to the pressure-reduce linear valve where the supply pressure is equal to or higher than the upper limit value, and by continuing to supply electric power for opening the pressure-increase linear valve to the pressure-increase linear valve where the supply pressure is equal to or lower than the lower limit; and a control selecting section configured to
  (i) where the ABS valve device is not being operated, select the first control as the control to be performed by the supply-pressure-control executing section, and
  (ii) where the ABS valve device is being operated, select the second control as the control to be performed by the supply-pressure-control executing section where the supply pressure is equal to or higher than the target supply pressure and is equal to or lower than the pressure obtained by adding a pressure-reducing threshold-value determination additional value greater than the upper-limit determining additional value to the target supply pressure, and select the first control as the control to be performed by the supply-pressure-control executing section where the supply pressure is higher than the pressure obtained by adding the pressure-reducing threshold-value determination additional value to the target supply pressure, wherein the controller further includes an ABS-valve-device operation-completion dealing section configured to perform a dealing control for dealing with a situation in which the completion of the operation of the ABS valve device is estimated, and wherein the ABS-valve-device operation-completion dealing section is configured to perform, as the dealing control, at least one of:
  (A) reducing the pressure-reducing threshold-value determination additional value;
  (B) reducing the upper-limit determining additional value;
  (C) increasing the electric power being supplied to the pressure-reduce linear valve where the first control is being performed at a point in time when the completion of the operation of the ABS valve device has been estimated; and
  (D) reducing the target supply pressure determined by the target-supply-pressure determining section.

2. The hydraulic brake system according to claim 1, wherein the ABS-valve-device operation-completion dealing section is configured to:
  (A) where the pressure-reducing threshold-value determination additional value is reduced as the dealing control, use one of a running velocity of the vehicle equipped with the hydraulic brake system and the target supply pressure as a parameter, and the lower the parameter, the smaller the pressure-reducing threshold-value determination additional value is made;
  (B) where the upper-limit determining additional value is reduced as the dealing control, use one of the running velocity and the target supply pressure as the parameter, and the lower the parameter, the smaller the upper-limit determining additional value is made;
  (C) where the electric power being supplied to the pressure-reduce linear valve is increased where the first control is being performed at the point in time when the completion of the operation of the ABS valve device has been estimated as the dealing control, use one o the running velocity and the target supply pressure as the parameter, and the lower the parameter, the greater amount the electric power being supplied to the pressure-reduce linear valve is increased by; and
  (D) where the target supply pressure determined by the target-supply-pressure determining section is reduced as the dealing control, use one of the running velocity and the target supply pressure as the parameter, and the lower the parameter, the greater amount the target supply pressure is reduced by.

3. The hydraulic brake system according to claim 1,
wherein the ABS-valve-device operation-completion dealing section includes an ABS-valve-device operation-completion estimating section configured to estimate the completion of the operation of the ABS valve device, the ABS-valve-device operation-completion dealing section being configured to perform the dealing control on the basis of the estimation of the ABS-valve-device operation-completion estimating section, and
wherein the ABS-valve-device operation-completion estimating section is configured to estimate the completion of the operation of the ABS valve device when the supply pressure has been stabilized.

4. The hydraulic brake system according to claim 1,
wherein the ABS-valve-device operation-completion dealing section includes an ABS-valve-device operation-completion estimating section configured to estimate the completion of the operation of the ABS valve device, the ABS-valve-device operation-completion dealing section being configured to perform the dealing control on the basis of the estimation of the ABS-valve-device operation-completion estimating section, and
wherein the ABS-valve-device operation-completion estimating section is configured to estimate the completion of the operation of the ABS valve device when the supply pressure has increased even though the target supply pressure has not increased.

5. The hydraulic brake system according to claim 1,
wherein the ABS-valve-device operation-completion dealing section includes an ABS-valve-device operation-completion estimating section configured to estimate the completion of the operation of the ABS valve device, the ABS-valve-device operation-completion dealing section being configured to perform the dealing control on the basis of the estimation of the ABS-valve-device operation-completion estimating section, and
wherein the ABS-valve-device operation-completion estimating section is configured to estimate the completion of the operation of the ABS valve device when the target supply pressure has lowered.

6. The hydraulic brake system according to claim 1,
wherein the ABS-valve-device operation-completion dealing section includes an ABS-valve-device operation-completion estimating section configured to estimate the completion of the operation of the ABS valve device, the ABS-valve-device operation-completion dealing section being configured to perform the dealing control on the basis of the estimation of the ABS-valve-device operation-completion estimating section, and
wherein the ABS-valve-device operation-completion estimating section is configured to estimate the completion of the operation of the ABS valve device when the target supply pressure has become equal to or lower than a set pressure.

7. The hydraulic brake system according to claim 1,
wherein the ABS-valve-device operation-completion dealing section includes an ABS-valve-device operation-completion estimating section configured to estimate the completion of the operation of the ABS valve device, the ABS-valve-device operation-completion dealing section being configured to perform the dealing control on the basis of the estimation of the ABS-valve-device operation-completion estimating section, and wherein the ABS-valve-device operation-completion estimating section is configured to estimate the completion of the operation of the ABS valve device when a running velocity of the vehicle equipped with the hydraulic brake system has become equal to or lower than a set velocity.

8. The hydraulic brake system according to claim 1, wherein the ABS-valve-device operation-completion dealing section includes an ABS-valve-device operation-completion estimating section configured to estimate the completion of the operation of the ABS valve device, the ABS-valve-device operation-completion dealing section being configured to perform the dealing control on the basis of the estimation of the ABS-valve-device operation-completion estimating section, and wherein the ABS-valve-device operation-completion estimating section is configured to estimate the completion of the operation of the ABS valve device when the operation of the ABS valve device has been continued for equal to or longer than a set time.

9. The hydraulic brake system according to claim 1, wherein the ABS-valve-device operation-completion dealing section includes an ABS-valve-device operation-completion estimating section configured to estimate the completion of the operation of the ABS valve device, the ABS-valve-device operation-completion dealing section being configured to perform the dealing control on the basis of the estimation of the ABS-valve-device operation-completion estimating section, and wherein the ABS-valve-device operation-completion estimating section is configured to estimate the completion of the operation of the ABS valve device where a difference between a judgment pressure as one of the supply pressure and the target supply pressure and a brake pressure that is a pressure of the working fluid being supplied to the brake device has become equal to or smaller than a set difference.

10. The hydraulic brake system according to claim 9, further comprising four brake devices each as the brake device and respectively corresponding to four wheels, wherein the ABS-valve-device operation-completion estimating section is configured to determine a single brake pressure, on the basis of the brake pressure of each of at least one of the four brake devices, for judging a difference between the judgment pressure and the single brake pressure, and is configured to estimate the completion of the operation of the ABS valve device when a difference between the determined single brake pressure and the judgment pressure has become equal to or smaller than the set difference.

11. The hydraulic brake system according to claim 9, further comprising four brake devices each as the brake device and respectively corresponding to four wheels, wherein the ABS-valve-device operation-completion estimating section is configured to judge a difference between the judgment pressure and the brake pressure of each of the four brake devices, and is configured to estimate the completion of the operation of the ABS valve device when the difference between the brake pressure of even one of the four brake devices and the judgment pressure has become equal to or smaller than the set difference.

12. The hydraulic brake system according to claim 11, wherein the ABS-valve-device operation-completion dealing section is configured to perform, as the dealing control, at least one of:
(A) reducing the pressure-reducing threshold-value determination additional value;
(B) reducing the upper-limit determining additional value;
(C) increasing the electric power being supplied to the pressure-reduce linear valve where the first control is being performed at a point in time when the completion of the operation of the ABS valve device has been estimated; and
(D) reducing the target supply pressure determined by the target-supply-pressure determining section, and wherein the ABS-valve-device operation-completion dealing section is configured to:
(A) where the pressure-reducing threshold-value determination additional value is reduced as the dealing control, perform a control in which the larger the number of brake devices in each of which the difference between the brake pressure and the judgment pressure is equal to or smaller than the set difference among the four brake devices, the smaller the pressure-reducing threshold-value determination additional value is made;
(B) where the upper-limit determining additional value is reduced as the dealing control, perform the control in which the larger the number of brake devices in each of which the difference between the brake pressure and the judgment pressure is equal to or smaller than the set difference among the four brake devices, the smaller the upper-limit determining additional value is made;
(C) where the electric power being supplied to the pressure-reduce linear valve is increased where the first control is being performed at the point in time when the completion of the operation of the ABS valve device has been estimated as the dealing control, perform the control in which the larger the number of brake devices in each of which the difference between the brake pressure and the judgment pressure is equal to or smaller than the set difference among the four brake devices, the larger amount the electric power being supplied to the pressure-reduce linear valve is increased by; and
(D) where the target supply pressure determined by the target-supply-pressure determining section is reduced as the dealing control, perform the control in which the larger the number of brake devices in each of which the difference between the brake pressure and the judgment pressure is equal to or smaller than the set difference among the four brake devices, the larger amount the target supply pressure is reduced by.

13. The hydraulic brake system according to claim 9, wherein the ABS-valve-device operation-completion estimating section includes a brake-pressure estimating section configured to estimate the brake pressure on the basis of an operational condition of the ABS valve device after a start of the operation of the ABS valve device, the ABS-valve-device operation-completion estimating section being configured to estimate the completion of the operation of the ABS valve device on the basis of the brake pressure estimated by the brake-pressure estimating section.

* * * * *